US012754420B2

(12) United States Patent
Kitahara et al.

(10) Patent No.: US 12,754,420 B2
(45) **Date of Patent: *Oct. 6, 2026**

(54) LIGHT SOURCE UNIT AND IMAGE DISPLAY DEVICE

(71) Applicant: NICHIA CORPORATION, Anan (JP)

(72) Inventors: Wataru Kitahara, Kamiina-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 134 days.

This patent is subject to a terminal disclaimer.

(21) Appl. No.: 18/691,498

(22) PCT Filed: Mar. 31, 2022

(86) PCT No.: PCT/JP2022/016758
§ 371 (c)(1),
(2) Date: Mar. 13, 2024

(87) PCT Pub. No.: WO2023/047678
PCT Pub. Date: Mar. 30, 2023

(65) Prior Publication Data

US 2024/0385433 A1 Nov. 21, 2024

(30) Foreign Application Priority Data

Sep. 22, 2021 (JP) ................................ 2021-154371
Nov. 22, 2021 (JP) ................................ 2021-189574

(51) Int. Cl.
*G02B 27/01* (2006.01)
*B60K 35/10* (2024.01)
(Continued)

(52) U.S. Cl.
CPC .......... *G02B 27/0101* (2013.01); *B60K 35/10* (2024.01); *B60K 35/22* (2024.01);
(Continued)

(58) Field of Classification Search
CPC ............ G02B 27/0101; G02B 27/0977; G02B 27/283; G02B 27/286; G02B 2027/0118;
(Continued)

(56) References Cited

U.S. PATENT DOCUMENTS 5,729,242 A 3/1998 Margerum et al.
5,764,407 A 6/1998 Nanba
(Continued)

FOREIGN PATENT DOCUMENTS

JP H03-273943 A 12/1991
JP H06-347708 A 12/1994
(Continued)

OTHER PUBLICATIONS

Notice of Allowance in U.S. Appl. No. 18/513,895 Dtd Aug. 6, 2024.
(Continued)

*Primary Examiner* — Marin Pichler
(74) *Attorney, Agent, or Firm* — Foley & Lardner LLP

(57) ABSTRACT

A light source unit includes: a display device configured to emit light having a substantially Lambertian light distribution and to display an image; and an imaging optical system including: an input element on which light emitted from the display device is incident, and an output element on which light traveling via the input element is incident, the output element being configured to emit light forming a first image corresponding to the image. The imaging optical system is substantially telecentric at the first image side.

18 Claims, 41 Drawing Sheets

(51) Int. Cl.

| | |
|---|---|
| ***B60K 35/22*** | (2024.01) |
| ***B60K 35/60*** | (2024.01) |
| ***B60K 37/20*** | (2024.01) |
| ***G02B 27/09*** | (2006.01) |
| ***G02B 27/28*** | (2006.01) |

(52) U.S. Cl.
CPC .............. *B60K 35/60* (2024.01); *B60K 37/20* (2024.01); *G02B 27/0977* (2013.01); *G02B 27/283* (2013.01)

(58) Field of Classification Search
CPC .. G02B 27/01; G02B 27/026; G02B 27/0916; G02B 27/0983; G02B 2027/0107; G02B 2027/0112; G02B 2027/013; B60K 35/10; B60K 35/22; B60K 35/60; B60K 37/20; B60K 35/23; G03B 21/00; G03B 21/28; G09F 9/00; G09F 9/33
See application file for complete search history.

(56) References Cited

U.S. PATENT DOCUMENTS

| | | | |
|---|---|---|---|
| 10,606,075 | B2 | 3/2020 | Choi et al. |
| 11,169,377 | B1 | 11/2021 | Chen |
| 11,287,649 | B2 | 3/2022 | Hong |
| 2003/0035232 | A1 | 2/2003 | Sasaki |
| 2003/0107716 | A1 | 6/2003 | Ogawa |
| 2004/0145814 | A1 | 7/2004 | Rogers |
| 2005/0007593 | A1 | 1/2005 | Lebens |
| 2005/0052617 | A1 | 3/2005 | Fujikawa et al. |
| 2007/0024977 | A1 | 2/2007 | Kawamura et al. |
| 2007/0146242 | A1 | 6/2007 | Miller et al. |
| 2008/0316606 | A1 | 12/2008 | Inoguchi et al. |
| 2009/0040588 | A1 | 2/2009 | Tonar et al. |
| 2009/0167989 | A1 | 7/2009 | Ito et al. |
| 2010/0109977 | A1 | 5/2010 | Yamazaki et al. |
| 2010/0271396 | A1 | 10/2010 | Nemeth et al. |
| 2011/0164311 | A1 | 7/2011 | Morikuni |
| 2012/0020092 | A1 | 1/2012 | Bailey |
| 2015/0253469 | A1 | 9/2015 | Le Gros et al. |
| 2015/0378104 | A1 | 12/2015 | Takahashi |
| 2017/0146803 | A1 | 5/2017 | Kishigami et al. |
| 2017/0146809 | A1 | 5/2017 | Furuya |
| 2018/0024335 | A1 | 1/2018 | Uehara |
| 2018/0039077 | A1 | 2/2018 | Kuzuhara et al. |
| 2018/0352204 | A1 | 12/2018 | Fujita |
| 2018/0358339 | A1 | 12/2018 | Iguchi |
| 2019/0011712 | A1 | 1/2019 | Nagano et al. |
| 2019/0049725 | A1 | 2/2019 | Kondo et al. |
| 2019/0061525 | A1 | 2/2019 | Ji |
| 2019/0061638 | A1 | 2/2019 | Hisatsugu et al. |
| 2019/0071014 | A1 | 3/2019 | Misu |
| 2019/0072764 | A1 | 3/2019 | Lee et al. |
| 2019/0072799 | A1 | 3/2019 | Narushima |
| 2019/0073828 | A1 | 3/2019 | Oiwa |
| 2019/0235240 | A1 | 8/2019 | Nagano et al. |
| 2020/0050005 | A1 | 2/2020 | Kojima et al. |
| 2020/0201036 | A1 | 6/2020 | Hong |
| 2020/0271927 | A1 | 8/2020 | Kawana |
| 2020/0319456 | A1 | 10/2020 | Yatsu et al. |
| 2020/0333608 | A1 | 10/2020 | Katagiri et al. |
| 2021/0239989 | A1 | 8/2021 | Ide et al. |
| 2021/0325700 | A1 | 10/2021 | Chen |
| 2021/0373331 | A1 | 12/2021 | Gu et al. |
| 2021/0382304 | A1 | 12/2021 | You et al. |
| 2022/0035165 | A1 | 2/2022 | Takeda et al. |
| 2022/0046212 | A1 | 2/2022 | Xu et al. |
| 2022/0138916 | A1 | 5/2022 | Takagi et al. |
| 2022/0350139 | A1 | 11/2022 | Tsuda et al. |
| 2022/0365266 | A1 | 11/2022 | Cheng et al. |
| 2022/0365345 | A1 | 11/2022 | Hamada |
| 2023/0026137 | A1 | 1/2023 | Kusafuka et al. |
| 2023/0034288 | A1 | 2/2023 | Hong et al. |
| 2023/0118416 | A1 | 4/2023 | Hirata et al. |
| 2023/0206795 | A1 | 6/2023 | Lyou et al. |
| 2023/0207606 | A1* | 6/2023 | Mezouari ............. H10H 20/856 257/79 |
| 2023/0415576 | A1 | 12/2023 | Zozgornik |
| 2024/0061240 | A1 | 2/2024 | Hirata et al. |
| 2024/0210684 | A1 | 6/2024 | Kitahara et al. |
| 2024/0241421 | A1 | 7/2024 | Marchewka et al. |

FOREIGN PATENT DOCUMENTS

| | | | |
|---|---|---|---|
| JP | H07-140918 | A | 6/1995 |
| JP | H07-306377 | A | 11/1995 |
| JP | H09-200651 | A | 7/1997 |
| JP | H10-274740 | A | 10/1998 |
| JP | 2003-005073 | A | 1/2003 |
| JP | 2003-043360 | A | 2/2003 |
| JP | 2003-177320 | A | 6/2003 |
| JP | 2004-045718 | A | 2/2004 |
| JP | 2004-527801 | A | 9/2004 |
| JP | 2005-070255 | A | 3/2005 |
| JP | 2007-058163 | A | 3/2007 |
| JP | 2009-003128 | A | 1/2009 |
| JP | 2009-251194 | A | 10/2009 |
| JP | 2010-107873 | A | 5/2010 |
| JP | 2011-138086 | A | 7/2011 |
| JP | 2013-183042 | A | 9/2013 |
| JP | 2014-183192 | A | 9/2014 |
| JP | 2016-033867 | A | 3/2016 |
| JP | 2016-102810 | A | 6/2016 |
| JP | 2016-148829 | A | 8/2016 |
| JP | 2017-037304 | A | 2/2017 |
| JP | 2017-049371 | A | 3/2017 |
| JP | 2019-073272 | A | 5/2019 |
| JP | 2019-095690 | A | 6/2019 |
| JP | 2020-012986 | A | 1/2020 |
| JP | 2020-074005 | A | 5/2020 |
| JP | 2020-144184 | A | 9/2020 |
| JP | 6809441 | B2 | 1/2021 |
| JP | 2021-124527 | A | 8/2021 |
| JP | 2021-162801 | A | 10/2021 |
| JP | 2021-529332 | A | 10/2021 |
| JP | 2022-025889 | A | 2/2022 |
| JP | 2022-073094 | A | 5/2022 |
| JP | 2022-129223 | A | 9/2022 |
| WO | WO-2014/207457 | A1 | 12/2014 |
| WO | WO-2015/190157 | A1 | 12/2015 |
| WO | WO-2016/103418 | A1 | 6/2016 |
| WO | WO-2016/208195 | A1 | 12/2016 |
| WO | WO-2017/138242 | A1 | 8/2017 |
| WO | WO-2017/154360 | A1 | 9/2017 |
| WO | WO-2017/170702 | A1 | 10/2017 |
| WO | WO-2019/008684 | A1 | 1/2019 |
| WO | WO-2019/130860 | A1 | 7/2019 |
| WO | WO-2019/130944 | A1 | 7/2019 |
| WO | WO-2021/054277 | A1 | 3/2021 |
| WO | WO-2021/065820 | A1 | 4/2021 |
| WO | WO-2021/106689 | A1 | 6/2021 |

OTHER PUBLICATIONS

Non-Final Office Action in U.S. Appl. No. 18/496,594 Dtd Jul. 11, 2024.
U.S. Appl. No. 18/390,954, filed Dec. 20, 2023, Kitahara et al.
U.S. Appl. No. 18/496,594, filed Oct. 27, 2023, Kitahara et al.
U.S. Appl. No. 18/511,505, filed Nov. 16, 2023, Kitahara et al.
U.S. Appl. No. 18/513,895, filed Nov. 20, 2023, Kitahara et al.
U.S. Appl. No. 18/538,112, filed Dec. 13, 2023, Aruga et al.
U.S. Appl. No. 18/543,762, filed Dec. 18, 2023, Kitahara et al.
International Search Report and Written Opinion of the International Searching Authority with English language translations issued in the corresponding International Patent Application No. PCT/JP2022/016758, dated Jun. 28, 2022.
Non-Final Office Action on U.S. Appl. No. 18/390,954 dated Dec. 4, 2025.
Final Office Action in U.S. Appl. No. 18/538,112 dated Jul. 22, 2025.

(56) References Cited

OTHER PUBLICATIONS

Non-Final Office Action in U.S. Appl. No. 18/538,112 dated Mar. 19, 2025.
Non-Final Office Action in U.S. Appl. No. 18/538,112 dated Nov. 5, 2024.
U.S. Appl. No. 18/691,498, filed Mar. 13, 2024, Kitahara et al.
U.S. Appl. No. 18/867,745, filed Nov. 20, 2024, Kitahara et al.
U.S. Appl. No. 18/870,981, filed Dec. 2, 2024, Kitahara et al.
U.S. Appl. No. 18/956,890, filed Nov. 22, 2024, Kitahara et al.
Notice of Allowance in U.S. Appl. No. 18/496,594 dated Dec. 4, 2024.
Non-Final Office Action in U.S. Appl. No. 18/511,505 dated Feb. 13, 2026.
Notice of Allowance in U.S. Appl. No. 18/511,505 dated May 14, 2026.
Notice of Allowance in U.S. Appl. No. 18/543,762 dated Jun. 16, 2026.
Notice of Allowance in U.S. Appl. No. 18/956,890 dated Jul. 2, 2026.
Non-Final Office Action in U.S. Appl. No. 18/867,745 dated Aug. 3, 2026.
Non-Final Office Action in U.S. Appl. No. 18/870,981 dated Aug. 10, 2026.
Notice of Allowance in U.S. Appl. No. 18/978,166 dated Aug. 14, 2026.
Notice of Reasons for Refusal issued in Japanese Appl. No. 2022-182313 dated Sep. 2, 2026.
Notice of Reasons for Refusal issued in Japanese Appl. No. 2024-524176 dated Aug. 26, 2026.
Notice of Reasons for Refusal issued in Japanese Appl. No. 2024-526238 dated Aug. 26, 2026.

* cited by examiner

LIGHT SOURCE UNIT AND IMAGE DISPLAY DEVICE

CROSS-REFERENCE TO RELATED APPLICATIONS

This is a national stage application of PCT Application No. PCT/JP2022/016758, filed on Mar. 31, 2022, which claims priority to Japanese Patent Application No. 2021-154371, filed on Sep. 22, 2021 and Japanese Patent Application No. 2021-189574, filed on Nov. 22, 2021.

BACKGROUND

The invention relates to a light source unit and an image display device.

PCT Publication No. 2016/208195 discusses technology in which light emitted from a display device configured to display an image is sequentially reflected by multiple mirrors, and the light reflected by the final mirror is further reflected toward a user by a reflecting member such as a windshield or the like, so that the user views a virtual image corresponding to the image displayed by the display device.

SUMMARY

An embodiment of the invention is directed to provide a light source unit and an image display device that are small and can display a high-quality image.

A light source unit according to an embodiment of the invention includes a display device configured to display an image, and an imaging optical system including an input element and an output element; light emitted from the display device is incident on the input element; light traveling via the input element is incident on the output element; and light emitted from the output element forms a first image corresponding to the image. The imaging optical system is substantially telecentric at the first image side. The light emitted from the display device has a substantially Lambertian light distribution.

An image display device according to an embodiment of the invention includes the light source unit, and a reflection unit that is separated from the light source unit and reflects light emitted from the imaging optical system. The first image is formed between the light source unit and the reflection unit.

According to an embodiment of the invention, a light source unit and an image display device that are small and can display a high-quality image can be provided.

DETAILED DESCRIPTION

Figure 1:
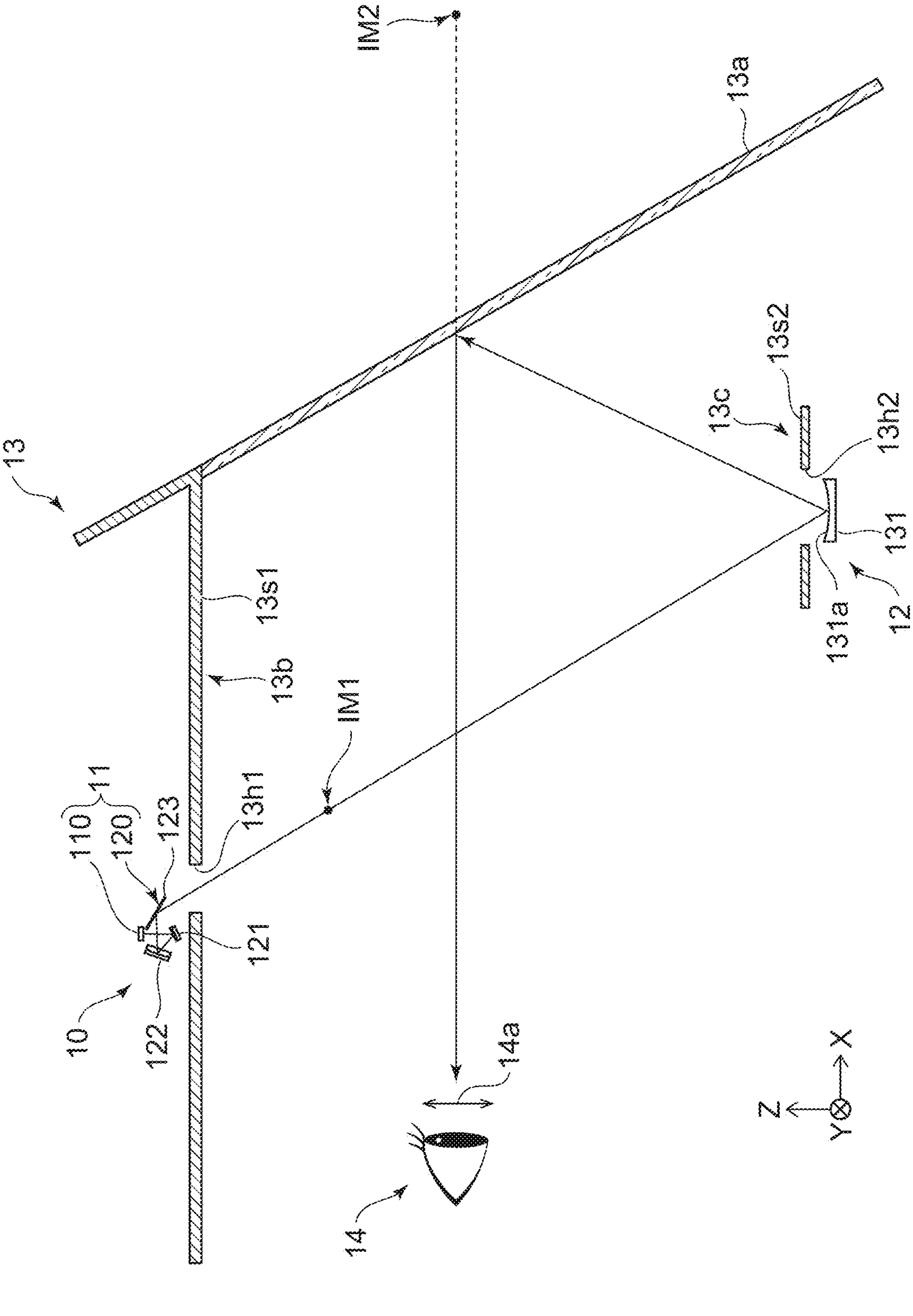
FIG. 1 is a cross-sectional view showing a head-up display in which an image display device according to a first embodiment is applied.

Embodiments will now be described with reference to the drawings. The drawings are schematic or conceptual, and the relationships between the thickness and width of portions, the proportions of sizes among portions, etc., are not necessarily the same as the actual values. Also, the dimensions and proportions may be illustrated differently among drawings, even when the same portion is illustrated. Furthermore, in the specification and the drawings, components similar to those described in regard to an antecedent drawing are marked with the same reference numerals, and a detailed description is omitted as appropriate.

First Embodiment

First, a first embodiment will be described.

FIG. 1 is a cross-sectional view showing a head-up display in which an image display device according to the embodiment is applied.

Figure 2:
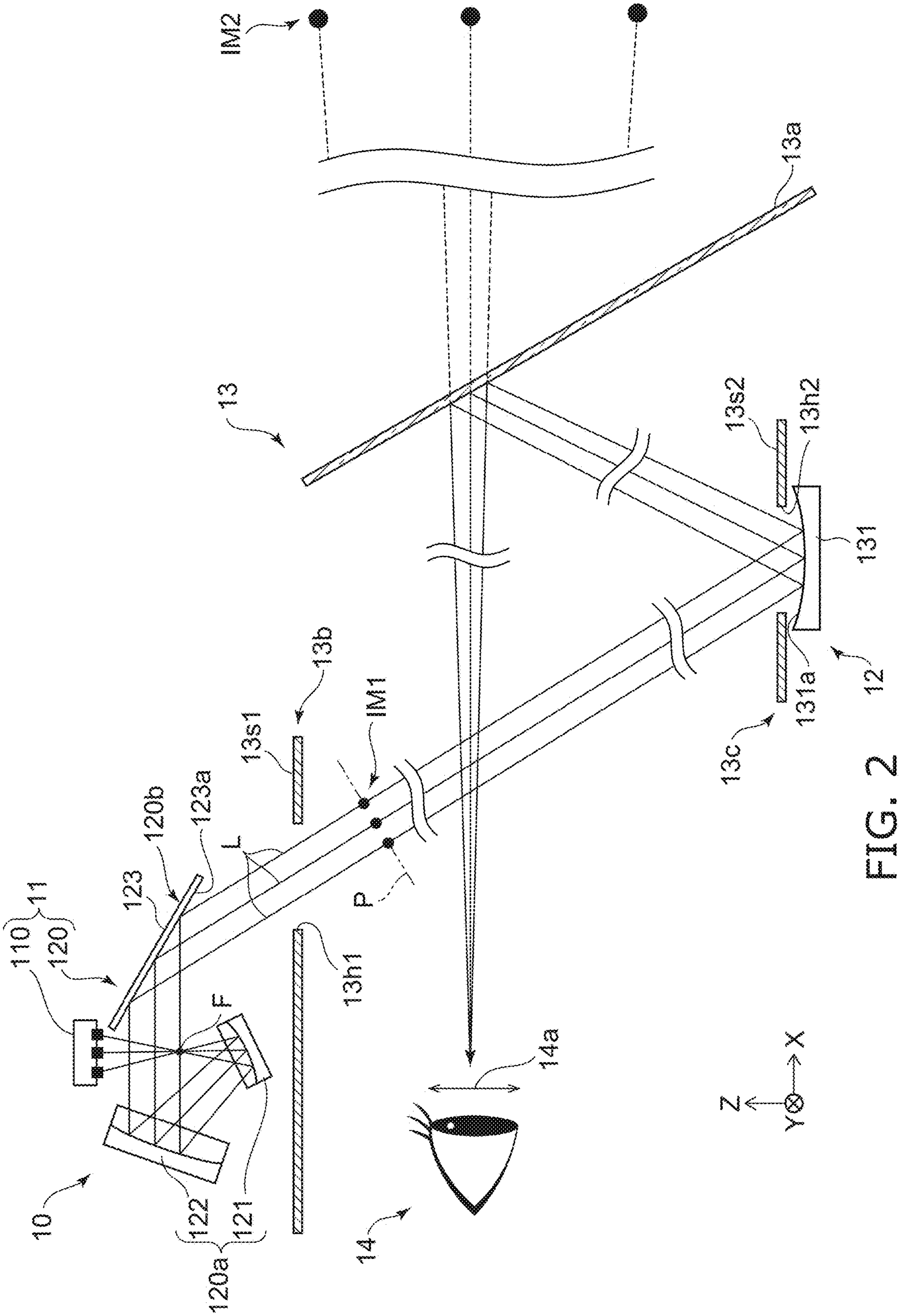
FIG. 2 is an enlarged cross-sectional view showing components of FIG. 1.

FIG. 2 is an enlarged cross-sectional view showing components of FIG. 1.

Generally speaking, as shown in FIGS. 1 and 2, the image display device 10 according to the embodiment includes a light source unit 11 and a reflection unit 12. The light source unit 11 includes a display device 110 configured to display an image, and an imaging optical system 120, light emitted from the display device 110 is incident on the imaging optical system 120, and the imaging optical system 120 forms a first image IM1 corresponding to the image displayed by the display device 110. The reflection unit 12 reflects light emitted from the light source unit 11. The first image IM1 is formed between the light source unit 11 and the reflection unit 12. The first image IM1 is a real image and is an intermediate image. In the drawings, the position at which the first image IM1 is formed is shown by circular marks for easier understanding of the description. Also, the emission positions in the display device 110 of chief rays L that reach the marks of the first image IM1 are shown by quadrilateral marks. Thus, although different marks are used to show the emission positions on the display device 110 and the arrival positions at the first image IM1 of the chief rays L for easier understanding of the description, the first image IM1 and the image displayed on the display device 110 have substantially similar shapes.

For example, the image display device 10 is mounted in a vehicle 13 of an automobile or the like and is applied to a HUD (Head Up Display). Specifically, the greater part of the light reflected by the reflection unit 12 is reflected by a surface of a front windshield 13*a* of the vehicle 13 facing a user 14 inside the vehicle, i.e., the inner surface of the front windshield 13*a*, and enters an eyebox 14*a* of the user 14 that is a driver of the vehicle 13, etc. In other words, the inner surface of the front windshield 13*a* of the vehicle 13 functions as a reflecting surface. However, instead of the front windshield, the reflecting surface may be a surface of a combiner facing the user. As a result, the user 14 can view a second image IM2 corresponding to the image displayed by the display device 110. The second image IM2 is a virtual image that is larger than the first image IM1. In the specification, "eyebox" means the area of space in front of the eyes of the user where the virtual image is visible. In the drawings, similarly to the first image IM1, the position at which the second image IM2 is formed is shown by circular marks for easier understanding of the description. Similarly to the first image IM1, although the emission positions on the display device 110 and the arrival positions at the second image IM2 of the chief rays L are shown by marks of different shapes, the second image IM2 and the image displayed on the display device 110 have substantially similar shapes.

Components of the image display device 10 will now be elaborated. For easier understanding of the following description, the arrangements and configurations of the components are described using an XYZ orthogonal coordinate system. Hereinbelow, the direction in which an X-axis extends is called an "X-direction," the direction in which a Y-axis extends is called a "Y-direction," and the direction in which a Z-axis extends is called a "Z-direction." According to the embodiment, an example is described in which the longitudinal direction of the vehicle 13 is along the "X-direction," the lateral direction of the vehicle 13 is along the "Y-direction," and the vertical direction of the vehicle 13 is along the "Z-direction." In other words, in the following example, the XY-plane is the horizontal plane of the vehicle 13.

Also, hereinbelow, the X-direction in the direction of the arrow is called the "+X direction," and the opposite direction also is called the "−X direction". Also, the Y-direction in the direction of the arrow is called the "+Y direction," and the opposite direction also is called the "−Y direction". Also, the Z-direction in the direction of the arrow is called the "+Z direction," and the opposite direction also is called the "−Z direction". Also, a member A and a member B being arranged in this order in the +X direction is referred to as "the member B being positioned at the +X side of the member A" or "the member A being positioned at the −X side of the member B." This is similar for the +Y direction and the +Z direction as well.

(Light Source Unit)

Figure 3A:
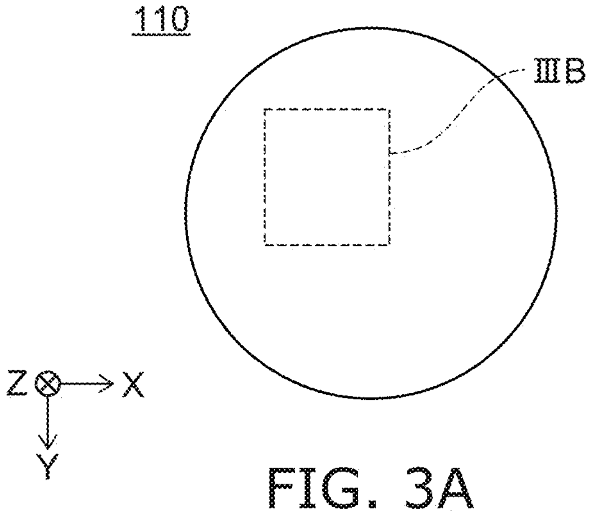
FIG. 3A is a bottom view showing a display device of the image display device according to the first embodiment.

FIG. 3A is a bottom view showing the display device of the image display device according to the embodiment.

Figure 3B:
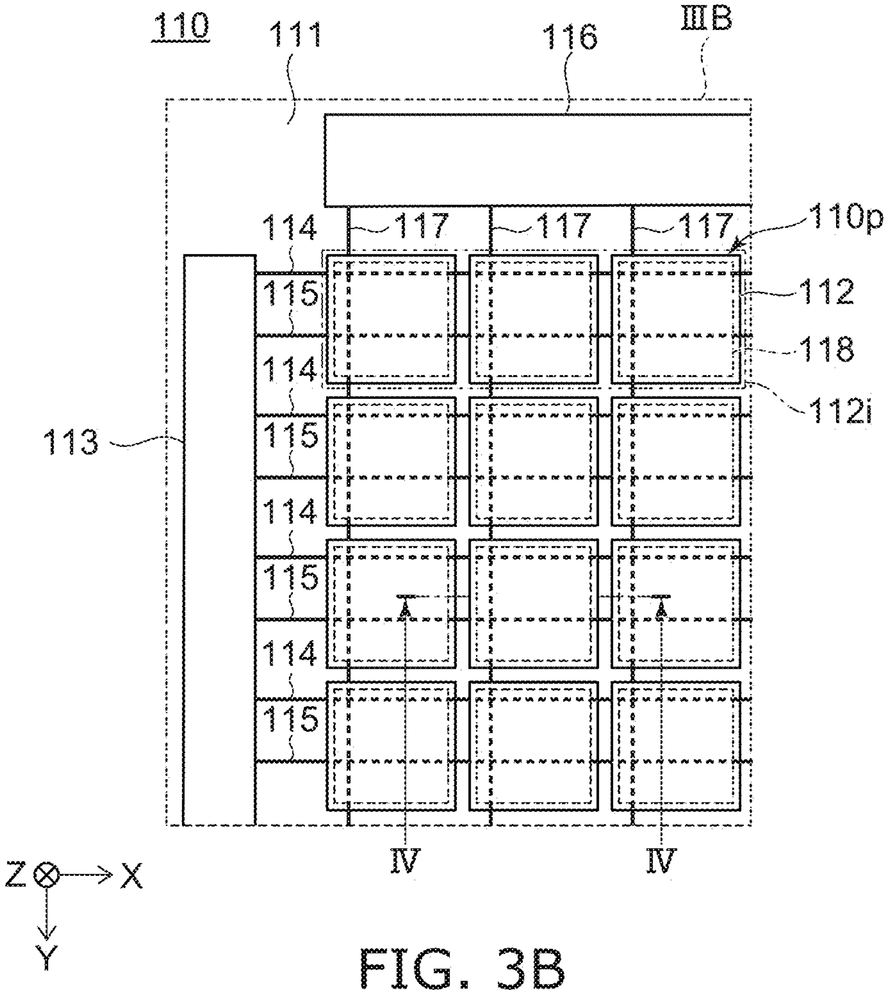
FIG. 3B is an enlarged view showing the part surrounded with broken line IIIB of FIG. 3A.

FIG. 3B is an enlarged view showing the part surrounded with broken line IIIB of FIG. 3A.

Figure 4:
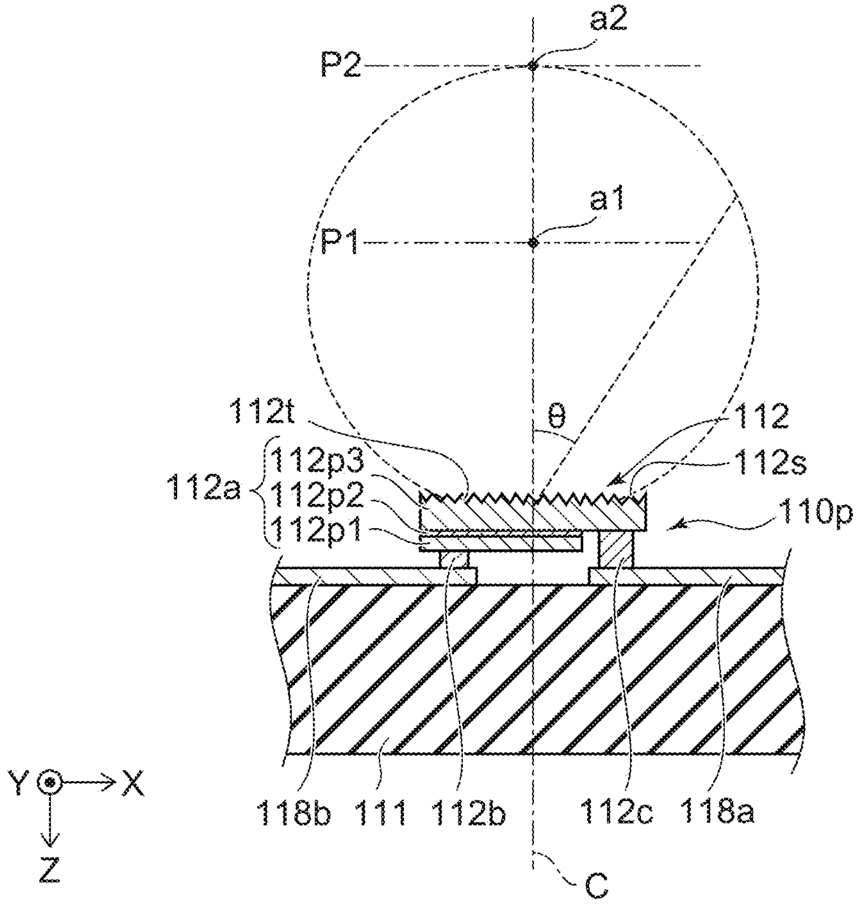
FIG. 4 is a cross-sectional view along line IV-IV of FIG. 3B.

FIG. 4 is a cross-sectional view along line IV-IV of FIG. 3B.

Figure 5:
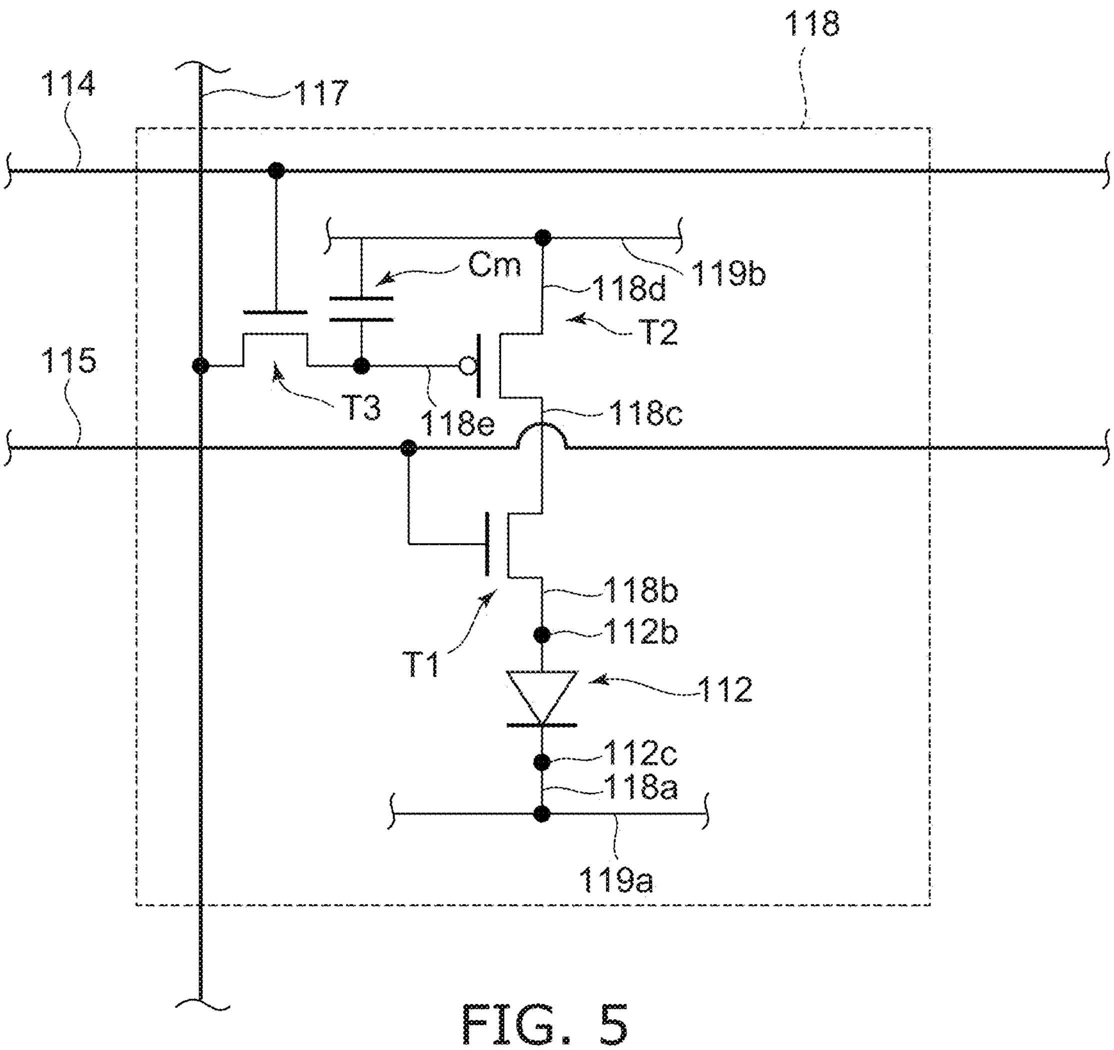
FIG. 5 is a circuit diagram showing the relationship of an LED element, a scanning line, a lighting control line, a signal line, and an individual circuit of FIG. 3B.

FIG. 5 is a circuit diagram showing the relationship of an LED element, a scanning line, a lighting control line, a signal line, and an individual circuit of FIG. 3B.

For example, the display device 110 of the light source unit 11 includes multiple pixels 110*p*, and is an LED display in which LED (Light Emitting Diode) elements 112 are located in the pixels 110*p*. For example, the display device 110 is electrically connected to a controller (not illustrated) mounted in the vehicle 13, and displays an image corresponding to the state of the vehicle 13.

As shown in FIGS. 3B and 4, the display device 110 includes, for example, a substrate 111, the multiple LED elements 112, a scanning circuit 113, multiple scanning lines 114, multiple lighting control lines 115, a driver circuit 116, multiple signal lines 117, and multiple individual circuits 118. FIG. 3B simply shows the scanning circuit 113, the driver circuit 116, and the individual circuit 118 as quadrilaterals.

For example, the substrate 111 has a flat plate shape. The substrate 111 can include, for example, glass or a resin such as polyimide, etc. As shown in FIG. 3B, the multiple LED elements 112 are arranged in a matrix configuration on the substrate 111. Hereinbelow, the multiple LED elements 112 arranged in one row in the X-direction are called a "row 112*i*".

As shown in FIG. 4, each LED element 112 is mounted face-down on the substrate 111. However, each LED element may be mounted face-up on the substrate. Each LED element 112 includes a semiconductor stacked body 112*a*, an anode electrode 112*b*, and a cathode electrode 112*c*.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_XAl_YGa_{1-X-Y}N$ ($0 \le X$, $0 \le Y$, and $X+Y<1$). According to the embodiment, the light that is emitted by the LED element 112 is visible light.

The anode electrode 112*b* is electrically connected to the p-type semiconductor layer 112*p*1. Also, the anode electrode 112*b* is electrically connected to a wiring part 118*a* of the individual circuit 118 described below. The cathode electrode 112*c* is electrically connected to the n-type semiconductor layer 112*p*3. Also, the cathode electrode 112*c* is electrically connected to another wiring part 118*a* of the individual circuit 118 described below. The electrodes 112*b* and 112*c* can include, for example, a metal material.

According to the embodiment, multiple recesses 112*t* are provided in a light-emitting surface 112*s* of each LED element 112. In the specification, "the light-emitting surface of the LED element" means the surface of the LED element that mainly emits the light that is incident on the imaging optical system 120. According to the embodiment, the surface of the n-type semiconductor layer 112*p*3 that is positioned at the side opposite to the surface facing the active layer 112*p*2 corresponds to the light-emitting surface 112*s*. Examples of methods for providing the multiple recesses 112*t* in the surface of the n-type semiconductor layer 112*p*3 positioned at the side opposite to the surface facing the active layer 112*p*2 include, for example, a method in which multiple protrusions are formed in the upper surface of a growth substrate, and then the n-type semiconductor layer 112*p*3, the active layer 112*p*2, and the p-type semiconductor layer 112*p*1 are grown in this order on the growth substrate, and the n-type semiconductor layer 112*p*3 and the growth substrate are detached by LLO (Laser Lift Off) or the like, a method of performing surface roughening of the surface of the n-type semiconductor layer 112*p*3 to form the multiple recesses 112*t* after detaching the growth substrate, etc. Methods of surface roughening include anisotropic etching, etc.

Hereinbelow, the optical axis of the light emitted from each pixel 110*p* is called simply an "optical axis C." As shown in FIG. 4, the optical axis C is, for example, a straight line that connects a point a1 in a first plane P1 and a point a2 in a second plane P2, wherein the first plane P1 is positioned at the light-emitting side of the display device 110 and is parallel to the XY-plane in which the multiple pixels 110*p* are arranged, the luminance is a maximum at the point a1 in the range in which the light is irradiated from one pixel 110*p*, the second plane P2 is parallel to the XY-plane and separated from the first plane P1, and the luminance is a maximum at the point a2 in the range in which the light is irradiated from the one pixel 110*p*. For example, if the luminance has maxima at multiple points, the center of the points may be used as the maximum luminance point. From the perspective of productivity, it is desirable for the optical axis C to be parallel to the Z-axis.

Thus, by providing the multiple recesses 112*t* in the light-emitting surface 112*s* of each LED element 112, the light that is emitted from each LED element 112, i.e., the light that is emitted from each pixel 110*p*, has a substantially Lambertian light distribution as shown by the broken line in FIG. 4. Here, "the light emitted from each pixel has a substantially Lambertian light distribution" means a light distribution pattern in which the luminous intensity in the direction of an angle θ with respect to the optical axis C of each pixel can be approximated by $\cos^n \theta$ times the luminous intensity at the optical axis C, wherein n is a value greater than 0. Here, it is favorable for n to be not more than 11, and more favorably 1. Although many planes including the optical axis C of the light emitted from one pixel 110*p* exist, the light distribution pattern of the light emitted from the one pixel 110*p* has a substantially Lambertian light distribution in each plane, and the numerical values of n are substantially equal.

However, the configuration of each LED element is not limited to that described above. For example, multiple protrusions instead of multiple recesses may be provided in the light-emitting surface of each LED element, or both multiple recesses and multiple protrusions may be provided. Also, when the growth substrate is light-transmissive, the growth substrate may not be detached from the semiconductor stacked body, and multiple recesses and/or multiple protrusions may be provided in the surface of the growth substrate corresponding to the light-emitting surface. In such configurations as well, the light that is emitted from each LED element has a substantially Lambertian light distribution. Also, in each LED element, an n-type semiconductor layer may be provided to face the substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element. Also, as described in other embodiments described below, it is sufficient for the light finally emitted from each pixel to have a substantially Lambertian light distribution, and the light that is emitted from each LED element may not have a substantially Lambertian light distribution.

For example, the scanning circuit 113, the scanning lines 114, the lighting control lines 115, the driver circuit 116, the signal lines 117, and the individual circuits 118 are formed by a low-temperature polysilicon (LTPS: Low Temperature Polycrystalline Silicon) process on the substrate 111.

As shown in FIG. 3B, for example, the scanning circuit 113 is located in the substrate 111 to be adjacent in the X-direction to the multiple LED elements 112 arranged in a matrix configuration when viewed in plan. The scanning circuit 113 is a circuit configured to sequentially switch the row 112*i* to be driven in the Y-direction. The multiple scanning lines 114 extend in the X-direction from the scanning circuit 113. Also, the multiple lighting control lines 115 extend in the X-direction from the scanning circuit 113. The multiple scanning lines 114 and the multiple lighting control lines 115 are alternately arranged in the Y-direction.

The driver circuit 116 is located in the substrate 111 to be adjacent in the Y-direction to the multiple LED elements 112 arranged in the matrix configuration when viewed in plan. The driver circuit 116 is a circuit configured to control the output of each LED element 112 belonging to the row 112*i* to be driven. The multiple signal lines 117 extend in the Y-direction from the driver circuit 116. The multiple signal lines 117 are arranged in the X-direction. The driver circuit 116 may include an IC chip, and the IC chip may be mounted on the substrate 111.

According to the embodiment, one individual circuit 118 corresponds to one LED element 112. However, multiple LED elements may be located in one pixel; in such a case, one individual circuit may correspond to the multiple LED elements in the one pixel. As shown in FIG. 5, each individual circuit 118 includes a first transistor T1, a second transistor T2, a third transistor T3, a capacitor Cm, and multiple wiring parts 118*a* to 118*e*.

As shown in FIGS. 4 and 5, the cathode electrode 112*c* of the LED element 112 is electrically connected to a ground line 119*a* via the wiring part 118*a*. The ground line 119*a* is connected to a reference potential. The anode electrode 112*b* of the LED element 112 is electrically connected to the source electrode of the first transistor T1 via the wiring part 118*b*.

The gate electrode of the first transistor T1 is electrically connected to the lighting control line 115. The drain electrode of the first transistor T1 is electrically connected to the drain electrode of the second transistor T2 via the wiring part 118*c*. The source electrode of the second transistor T2 is electrically connected to a power supply line 119*b* via the wiring part 118*d*. The power supply line 119*b* is connected to a power supply (not illustrated).

The gate electrode of the second transistor T2 is electrically connected to the drain electrode of the third transistor T3 via the wiring part 118*e*. The source electrode of the third transistor T3 is electrically connected to the signal line 117. The gate electrode of the third transistor T3 is electrically connected to the scanning line 114.

The wiring part 118*e* is electrically connected to one terminal of the capacitor Cm. The other terminal of the capacitor Cm is electrically connected to the power supply line 119*b*.

The scanning circuit 113 selects one row among the multiple rows 112*i* and transmits an on-signal to the scanning line 114 electrically connected to the row 112*i*. As a result, the third transistors T3 of the individual circuits 118 corresponding to the row 112*i* are in a state in which the third transistors T3 can be switched on. Also, the driver circuit 116 transmits, to the signal lines 117, drive signals corresponding to the setting outputs of the LED elements 112 belonging to the row 112*i*. The drive signal voltages are thereby stored in the capacitors Cm. Also, the drive signal voltages set the second transistors T2 of the individual circuits 118 corresponding to the row 112*i* to a state in which the second transistors T2 can be switched on.

Also, the scanning circuit 113 transmits, to the lighting control line 115 electrically connected to the row 112*i*, a control signal that sequentially switches the first transistors T1 of the row 112*i* on and off. When the first transistors T1 are in the on-state, the light emission luminances of the LED elements are controlled by currents corresponding to the drive signal voltages stored in the capacitors Cm flowing in the LED elements 112 belonging to the row 112*i*. Also, the light emission periods of the LED elements 112 are controlled for each row 112*i* by switching the first transistors T1 on and off.

The scanning circuit 113 sequentially switches, in the Y-direction, the scanning line 114 transmitting the on-signal and the lighting control line 115 transmitting the control signal. Accordingly, the row 112*i* that is driven is sequentially switched in the Y-direction.

The configuration of the drive circuit including the scanning circuit, the multiple scanning lines, the multiple lighting control lines, the driver circuit, the multiple signal lines, the multiple individual circuits, etc., is not limited to the configuration described above. For example, the individual circuit may include a second transistor, a third transistor, a capacitor, and wiring parts without including a first transistor, only multiple scanning lines may extend from the scanning circuit, and a lighting control line may not be included. Also, the scanning lines, the lighting control lines, the signal lines, the wiring parts of the individual circuits, etc., may not be on the surface of the substrate, and may be provided in the substrate. Also, the electrical elements such as the transistors, capacitors, and the like included in the drive circuit may be separately manufactured and then mounted on the substrate instead of being formed on the substrate. Also, instead of separately manufacturing the LED elements and then mounting to the substrate, the LED elements may be formed on the substrate by using a semiconductor material such as silicon (Si) or the like as the substrate. Also, the configuration of the display device may not be an LED display as long as the emitted light has a substantially Lambertian light distribution.

Figure 6:
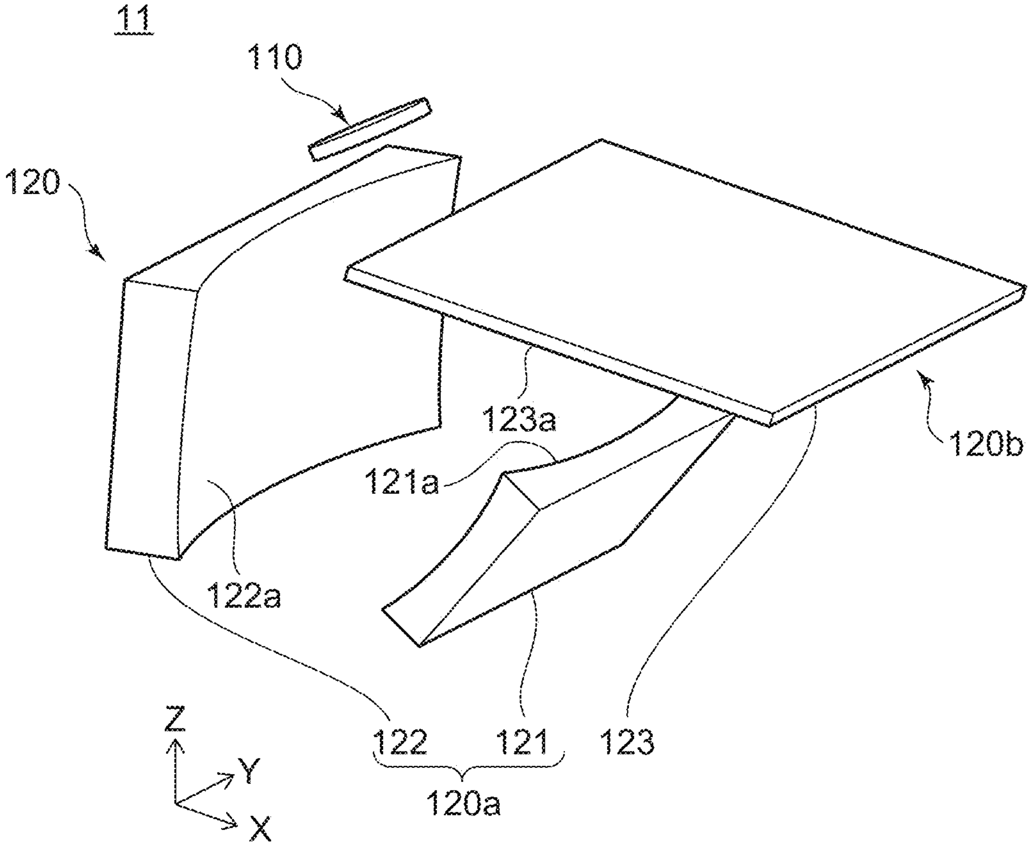
FIG. 6 is a perspective view showing the display device and an imaging optical system of the image display device according to the first embodiment.

FIG. 6 is a perspective view showing the display device and an imaging optical system of the image display device according to the embodiment.

The imaging optical system 120 of the light source unit 11 is an optical system that includes all of the optical elements necessary for forming the first image IM1 at the prescribed position. The embodiment includes an input element 121 on which the light emitted from the display device 110 is incident, and an output element 123 on which the light traveling via the input element 121 is incident. The imaging optical system 120 further includes an intermediate element 122 located between the input element 121 and the output element 123. The imaging optical system may not include an intermediate element. As shown in FIG. 2, the light emitted from the output element 123 forms the first image IM1.

The imaging optical system 120 is substantially telecentric at the first image IM1 side. Here, "the imaging optical system 120 is substantially telecentric at the first image IM1 side" means that the multiple chief rays L that are emitted from mutually-different positions of the display device 110, travel via the imaging optical system 120, and reach the first image IM1 are substantially parallel to each other before and after the first image IM1 as shown in FIG. 2. Different positions refers to, for example, different pixels 110*p*. "The multiple chief rays L being substantially parallel to each other" means being substantially parallel in a practical range that permits errors such as the manufacturing accuracy, assembly accuracy, etc., of the components of the light source unit 11. When "the multiple chief rays L are substantially parallel to each other", for example, the angle between the chief rays L is not more than 10 degrees.

When the imaging optical system 120 is substantially telecentric at the first image IM1 side, the multiple chief rays L cross each other before being incident on the input element 121. Hereinbelow, the point at which the multiple chief rays L cross each other is called a "focal point F". Therefore, for example, whether or not the imaging optical system 120 is substantially telecentric at the first image IM1 side can be confirmed by utilizing the backward propagation of light by the following method. First, a light source that can emit parallel light such as a laser light source or the like is provided at the vicinity of the position at which the first image IM1 is formed. The light that is emitted from the light source is irradiated on the output element 123 of the imaging optical system 120. The light that is emitted from the light source and travels via the output element 123 is incident on the input element 121. Then, if the light that is emitted from the input element 121 condenses at a point, i.e., the focal point F, before reaching the display device 110, then the imaging optical system 120 can be determined to be substantially telecentric at the first image IM1 side.

Because the imaging optical system 120 is substantially telecentric at the first image IM1 side, the light emitted from each pixel 110*p* that is mainly incident on the imaging optical system 120 is the light that passes through the focal point F and the vicinity of the focal point F. Optical elements included in the imaging optical system 120 will now be described.

The input element 121 is positioned at the −Z side of the display device 110 and arranged to face the display device 110. The input element 121 is a mirror that includes a concave mirror surface 121*a*. The input element 121 reflects the light emitted from the display device 110.

The intermediate element 122 is positioned at the −X side of the display device 110 and the input element 121 and arranged to face the input element 121. The intermediate element 122 is a mirror that includes a concave mirror surface 122*a*. The intermediate element 122 further reflects the light reflected by the input element 121.

The input element 121 and the intermediate element 122 are included in a bending part 120*a* that bends the multiple chief rays L so that the multiple chief rays L emitted from mutually-different positions of the display device 110 are substantially parallel to each other. According to the embodiment, the mirror surfaces 121*a* and 122*a* are biconic surfaces. However, the mirror surfaces may be portions of spherical surfaces or may be freeform surfaces.

The output element 123 is positioned at the +X side of the display device 110 and the input element 121 and arranged to face the intermediate element 122. The output element 123 is a mirror that includes a flat mirror surface 123*a*. The output element 123 reflects the light traveling via the input element 121 and the intermediate element 122 toward the formation position of the first image IM1. Specifically, the multiple chief rays L that are substantially parallel due to the bending part 120*a* are incident on the output element 123. The mirror surface 123*a* is tilted in the +X direction toward the −Z direction with respect to the XY-plane, i.e., the horizontal plane of the vehicle 13. As a result, the light that is reflected by the intermediate element 122 is reflected by the output element 123 in a direction tilted in the +X direction toward the −Z direction with respect to the Z-direction. Thus, as shown in FIG. 2, the output element 123 is included in a direction modifying part 120*b* that modifies the directions of the multiple chief rays L so that the multiple chief rays L caused to be substantially parallel by the bending part 120*a* are directed toward a formation position P of the first image IM1.

According to the embodiment, the optical path between the input element 121 and the intermediate element 122 extends in a direction crossing the XY-plane. Also, the optical path between the intermediate element 122 and the output element 123 extends in a direction along the XY-plane. Because a portion of the optical path inside the imaging optical system 120 extends in a direction crossing the XY-plane, the light source unit 11 can be somewhat smaller in directions along the XY-plane. Also, because another portion of the optical path inside the imaging optical system 120 extends in a direction along the XY-plane, the light source unit 11 can be somewhat smaller in the Z-direction.

Also, the optical path between the display device 110 and the input element 121 crosses the optical path between the intermediate element 122 and the output element 123. Thus, by causing the optical paths to cross each other inside the light source unit 11, the light source unit 11 can be downsized.

However, the optical paths inside the light source unit are not limited to those described above. For example, all of the optical paths inside the imaging optical system may extend in directions along the XY-plane or may extend in directions crossing the XY-plane. Also, the optical paths inside the light source unit may not cross each other.

The input element 121, the intermediate element 122, and the output element 123 each may include a main member made of glass, a resin material, or the like and a reflective film such as a metal film, a dielectric multilayer film, or the like forming the mirror surfaces 121*a*, 122*a*, and 123*a* located at the surface of the main member. Also, the input element 121, the intermediate element 122, and the output element 123 each may be entirely formed of a metal material.

According to the embodiment as shown in FIGS. 1 and 2, the light source unit 11 is located at a ceiling part 13*b* of the vehicle 13. For example, the light source unit 11 is located at the inner side of a wall 13*s*1 of the ceiling part 13*b* exposed inside the vehicle. A through-hole 13*h*1 through which the light emitted from the output element 123 of the light source unit 11 can pass is provided in the wall 13*s*1. The light that is emitted from the output element 123 passes through the through-hole 13*h*1 and is irradiated on the space between the user 14 and the front windshield 13*a*. However, the light source unit may be mounted to the ceiling surface. A transparent or semi-transparent cover having a small haze (Haze) value may be located in the through-hole 13*h*1. It is favorable for the haze value to be not more than 50%, and more favorably not more than 20%.

Although the imaging optical system 120 is described above, the configuration and position of the coupling optical system are not limited to those described above as long as the coupling optical system is substantially telecentric at the first image side. For example, the number of optical elements included in the direction modifying part may be two or more.

(Reflection Unit)

Figure 7:
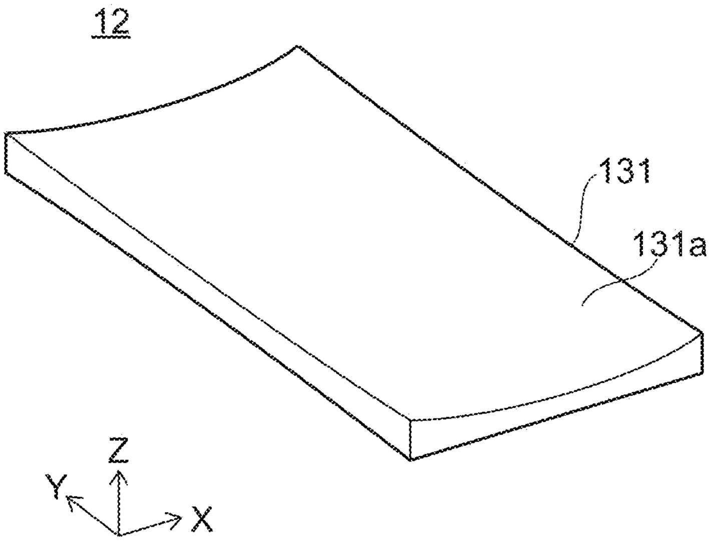
FIG. 7 is a perspective view showing a reflection unit of the image display device according to the first embodiment.

FIG. 7 is a perspective view showing the reflection unit of the image display device according to the embodiment.

According to the embodiment, the reflection unit 12 includes a mirror 131 that includes a concave mirror surface 131*a*. According to the embodiment, the mirror surface 131*a* is a biconic surface. However, the mirror surface may be a portion of a spherical surface or may be a freeform surface. As shown in FIGS. 1 and 2, the mirror 131 is arranged to face the front windshield 13*a*. The mirror 131 reflects the light emitted from the output element 123 and irradiates the light on the front windshield 13*a*. The light that is irradiated on the front windshield 13*a* is reflected by the inner surface of the front windshield 13*a* and enters the eyebox 14*a* of the user 14. As a result, the user 14 views the second image IM2 corresponding to the image displayed by the display device 110 at the +X side of the front windshield 13*a*.

The mirror 131 may include a main member made of glass, a resin material, or the like and a reflective film such as a metal film, a dielectric multilayer film, or the like forming the mirror surface 131*a* located at the surface of the main member. Also, the mirror 131 may be entirely formed of a metal material.

According to the embodiment, the reflection unit 12 is located at a dashboard part 13*c* of the vehicle 13. For example, the reflection unit 12 is located at the inner side of a wall 13*s*2 of the dashboard part 13*c* of the vehicle 13 exposed inside the vehicle. A through-hole 13*h*2 through which the light emitted from the output element 123 of the light source unit 11 can pass is provided in the wall 13*s*2. The light that is emitted from the output element 123 passes through the through-hole 13*h*1, forms the first image IM1, subsequently passes through the through-hole 13*h*2, and is irradiated on the reflection unit 12. However, the reflection unit may be mounted to the upper surface of the dashboard part. Also, the reflection unit may be located at the ceiling part, and the light source unit may be located at the dashboard part.

The X-direction in which the eyebox 14*a* and the inner surface of the front windshield 13*a* face each other is taken as a first direction, and the Z-direction orthogonal to the first direction is taken as a second direction. As shown in FIG. 1, the light that travels from the inner surface of the front windshield 13*a* toward the eyebox 14*a* is positioned at the XY-plane orthogonal to the second direction (the Z-direction). Here, "the light that travels from the inner surface of the front windshield 13*a* toward the eyebox 14*a* is positioned at the XY-plane" means that a portion of the light traveling from the inner surface of the front windshield 13*a* toward the eyebox 14*a* is positioned at the XY-plane. Also, with this XY-plane as a boundary, the light source unit 11 is located in a region at one side (the +Z side) in the second direction. In other words, the light source unit 11 is separated in the +Z direction from the XY-plane. Also, with the plane XY as a boundary, the reflection unit 12 is located in a region at the other side (the −Z side) in the second direction. In other words, the reflection unit 12 is separated in the −Z direction from the XY-plane. However, as described in a ninth embodiment described below, the arrangement of the light source unit and the reflection unit is not limited to that described above.

Although the reflection unit 12 is described above, the configuration and position of the reflection unit are not limited to those described above. For example, the number of optical elements such as mirrors and the like included in the reflection unit may be two or more. It goes without saying that the reflection unit 12 must be arranged so that, for example, sunlight that is irradiated from outside the vehicle via the front windshield 13*a* is not reflected toward the eyebox 14*a*.

Effects of the embodiment will now be described.

Figure 8A:
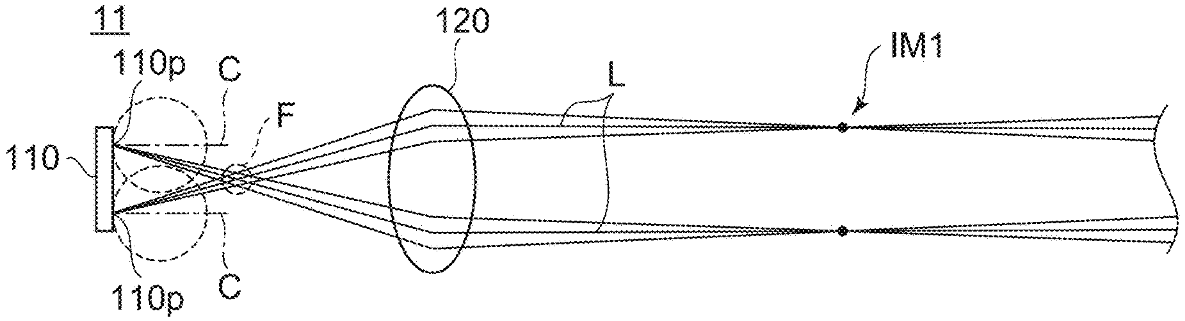
FIG. 8A is a schematic view showing the principle of the light source unit according to the first embodiment.

FIG. 8A is a schematic view showing the principle of the light source unit according to the embodiment.

Figure 8B:
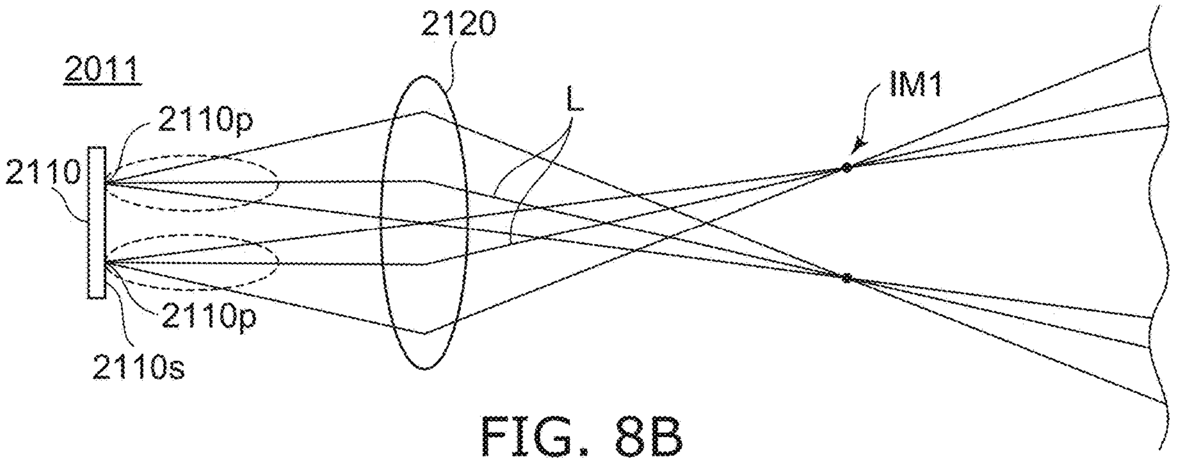
FIG. 8B is a schematic view showing the principle of a light source unit according to a reference example.

FIG. 8B is a schematic view showing the principle of a light source unit according to a reference example.

In the light source unit 2011 according to the reference example, a display device 2110 is an LCD (Liquid Crystal Display) that includes multiple pixels 2110*p*. In FIG. 8A, the light distribution patterns of the light emitted from two pixels 110*p* among the multiple pixels 110*p* of the display device 110 according to the embodiment are illustrated by broken lines. Similarly, in FIG. 8B, the light distribution patterns of the light emitted from two pixels 2110*p* among the multiple pixels 2110*p* of the display device 2110 according to the reference example are illustrated by broken lines. Also, the illustrations of the imaging optical systems 120 and 2120 are simplified in FIGS. 8A and 8B.

In the display device 2110 of the reference example as shown in FIG. 8B, the light that is emitted from each pixel 2110*p* is mainly distributed in the normal direction of a light-emitting surface 2110*s*. Also, although many planes that include the optical axis of the light emitted from one pixel 2110*p* exist, in the display device 2110 which is an LCD, the light distribution patterns of the light emitted from one pixel 2110*p* are different from each other between the planes. Also, in one plane among the multiple planes, the light that is emitted from the pixels 2110*p* has a light distribution pattern in which the luminous intensity in the direction of the angle θ with respect to the optical axis is approximated by $\cos^{20}\theta$ times the luminous intensity at the optical axis.

In such a display device 2110, the luminous intensity and/or chromaticity changes according to the viewing angle of the user, even when the light is emitted from the same position of the display device 2110. Accordingly, even when the luminance of the light emitted from all of the pixels is uniform, the luminance and/or chromaticity of the first image IM1 fluctuate if the imaging optical system 2120 receives the light emitted from the display device 2110 from directions other than the normal direction. In other words, the quality of the first image IM1 degrades. Accordingly, to prevent degradation of the quality of the first image IM1, it is necessary to receive the light emitted from each pixel 2110*p* of the display device 2110 from the normal direction. As a result, the imaging optical system 2120 is larger.

In contrast, in the light source unit 11 according to the embodiment, the imaging optical system 120 is substantially telecentric at the first image IM1 side, and the light emitted from the display device 110 has a substantially Lambertian light distribution. Therefore, the quality of the first image IM1 can be improved while downsizing the light source unit 11. Specifically, because the light emitted from the display device 110 has a substantially Lambertian light distribution, the dependence on the angle of the luminous intensity and/or chromaticity of the light emitted from the pixels 110*p* of the display device 110 is less than the dependence on the angle of the luminous intensity and/or chromaticity of the light emitted from the pixels 2110*p* of the display device 2110 according to the reference example. In particular, as an exact Lambertian light distribution is approached, that is, as the approximation formula of the light distribution pattern approaches $\cos^n\theta$ in which n is 1, the luminous intensity and/or chromaticity of the light emitted from each pixel 110*p* of the display device 110 is substantially uniform regardless of the angle. Therefore, as shown in FIG. 8A, even when the imaging optical system 120 receives light passing through the focal point F, that is, light from a direction other than the normal direction, the fluctuation of the luminance and/or chromaticity of the first image IM1 can be suppressed, and the quality of the first image IM1 can be improved. Also, because the imaging optical system 120 forms the first image IM1 mainly with light passing through the focal point F, an increase of the light diameter of the light incident on the imaging optical system 120 can be suppressed. The input element 121 can be smaller thereby. Furthermore, multiple chief rays L that are emitted from the output element 123 are substantially parallel to each other. The multiple chief rays L emitted from the output element 123 being substantially parallel to each other means that the irradiation range of the light of the output element 123 contributing to the image formation is substantially equal to the size of the first image IM1. Therefore, the output element 123 of the imaging optical system 120 can be smaller. Thus, the light source unit 11 that is small and can form a high-quality first image IM1 can be provided.

Also, the image display device 10 according to the embodiment includes the light source unit 11, and the reflection unit 12 that is separated from the light source unit 11 and reflects the light emitted from the imaging optical system 120. The first image IM1 is formed between the light source unit 11 and the reflection unit 12. In such a case, the light that is emitted from one point of the display device 110 is condensed at the formation position of the first image IM1 after traveling via the output element 123. On the other hand, when the first image IM1 is not formed between the light source unit 11 and the reflection unit 12, the light diameter of the light emitted from one point of the display device 110 gradually spreads from the input element 121 toward the reflection unit 12. Accordingly, in the output element 123 according to the embodiment, the range in which the light emitted from one point of the display device 110 is irradiated can be less than when the first image IM1 is not formed. Therefore, the output element 123 can be smaller.

Also, because the light source unit 11 according to the embodiment is small, the light source unit 11 can be easily arranged in the limited space inside the vehicle 13 when the light source unit 11 is mounted in the vehicle 13 and used as a head-up display.

Also, according to the embodiment, the imaging optical system 120 includes the bending part 120*a* and the direction modifying part 120*b*. Thus, the design of the imaging optical system 120 is easier because the part of the imaging optical system 120 having the function of making the chief rays L parallel to each other and the part of the imaging optical system 120 forming the first image IM1 at the desired position are separate.

Also, a portion of the optical path inside the imaging optical system 120 extends in a direction crossing the XY-plane orthogonal to the Z-direction. Therefore, the imaging optical system 120 can be somewhat smaller in directions along the XY-plane.

Also, another portion of the optical path inside the imaging optical system 120 extends in directions along the XY-plane orthogonal to the Z-direction. Therefore, the imaging optical system 120 can be somewhat smaller in the Z-direction.

EXAMPLES

Light source units according to examples and a reference example will now be described.

Figure 9A:
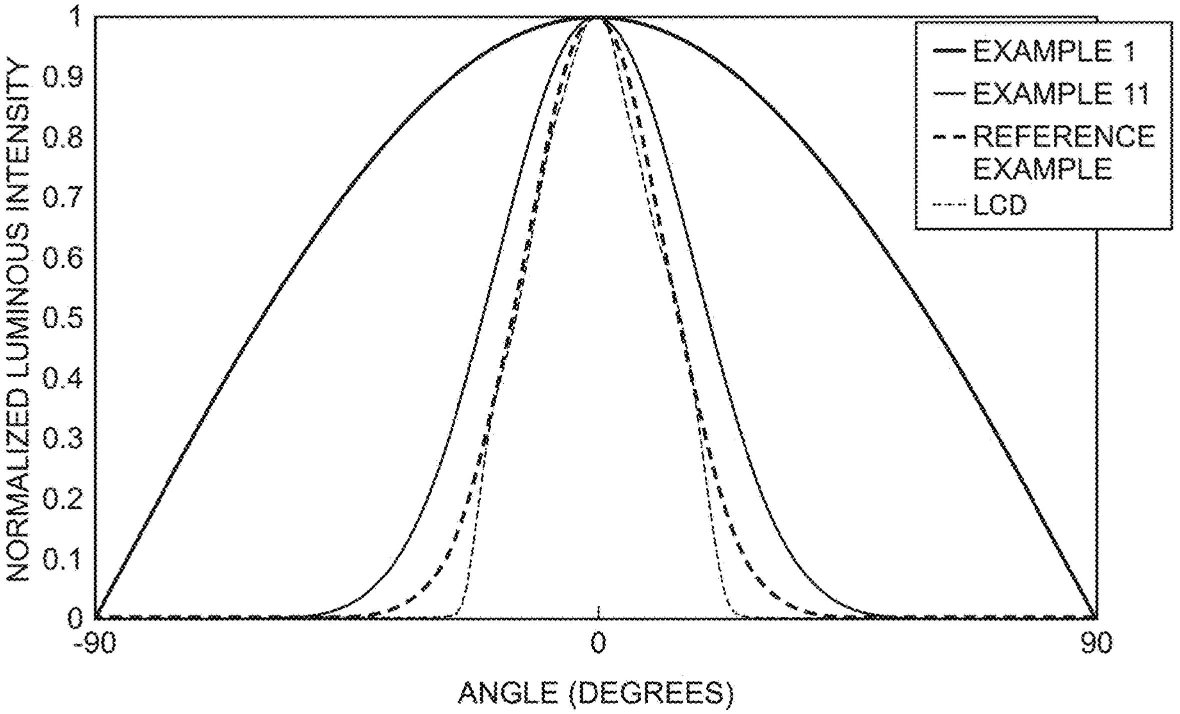
FIG. 9A is a graph showing a light distribution pattern of light emitted from one light-emitting area for examples 1 and 11 and the reference example.

FIG. 9A is a graph showing a light distribution pattern of light emitted from one light-emitting area for examples 1 and 11 and the reference example.

Figure 9B:
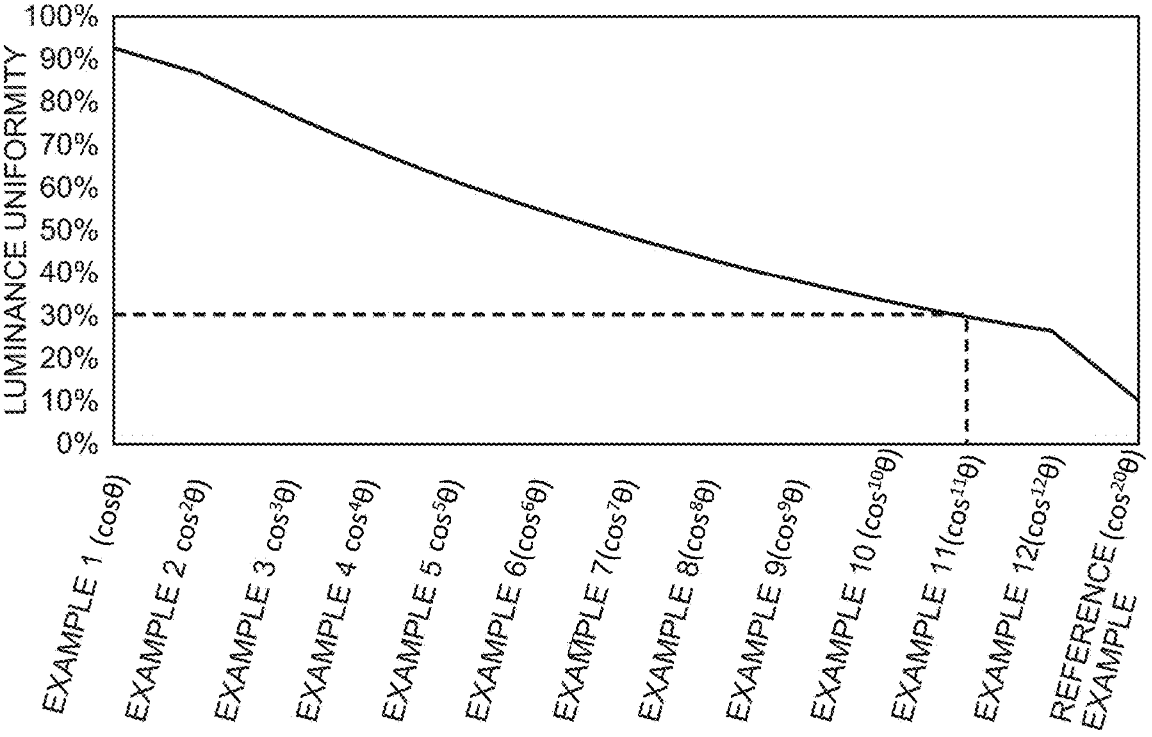
FIG. 9B is a graph showing the uniformity of the luminance of a second image for the examples 1 to 12 and the reference example.

FIG. 9B is a graph showing the uniformity of the luminance of the second image for the examples 1 to 12 and the reference example.

Figure 10A:
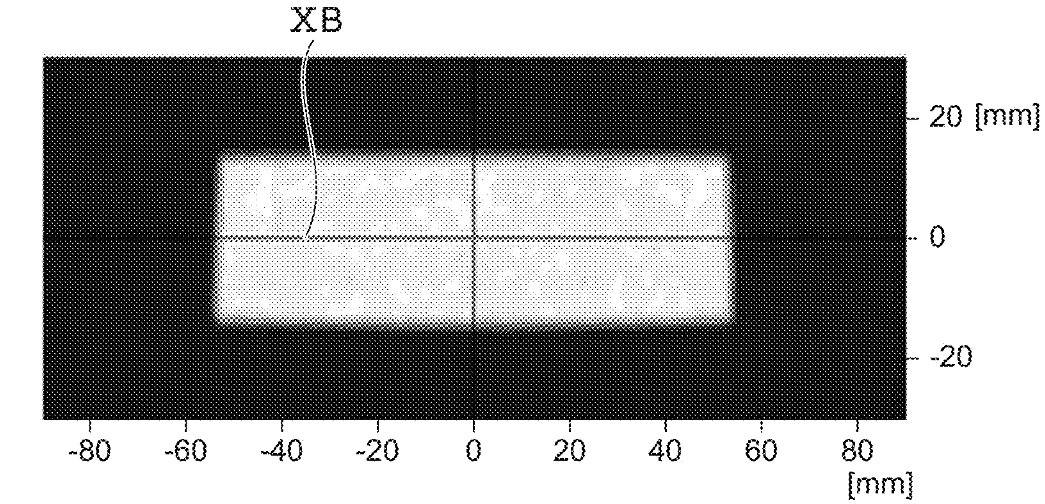
FIG. 10A is a graph showing a simulation of the luminance distribution of the second image of the example 1.

FIG. 10A is a graph showing a simulation of the luminance distribution of the second image of the example 1.

Figure 10B:
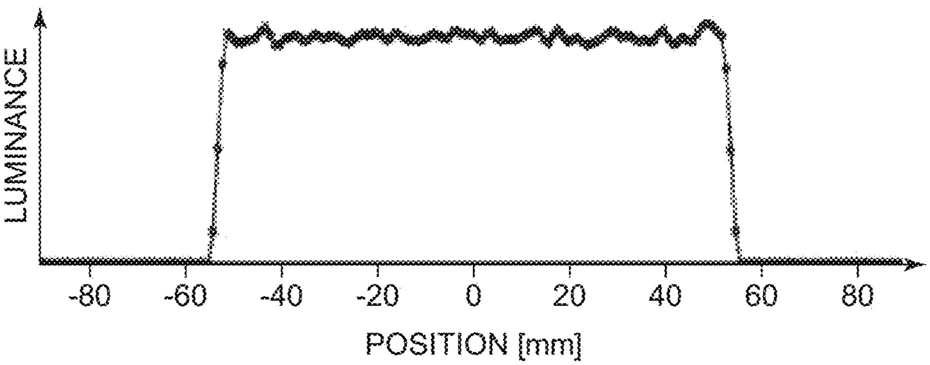
FIG. 10B is a graph showing the luminance distribution along line XB of FIG. 10A.

FIG. 10B is a graph showing the luminance distribution along line XB of FIG. 10A.

Figure 11A:
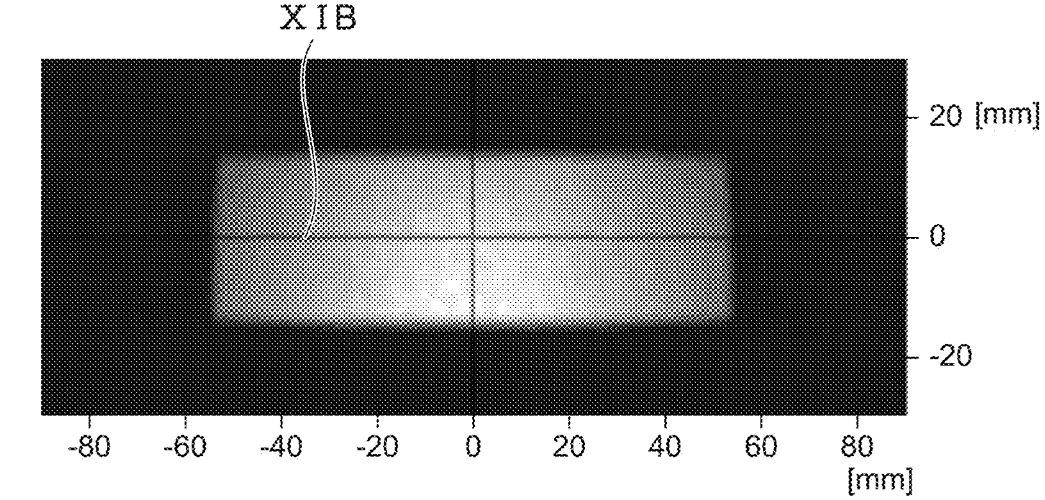
FIG. 11A is a graph showing a simulation of the luminance distribution of the second image of the example 11.

FIG. 11A is a graph showing a simulation of the luminance distribution of the second image of the example 11.

Figure 11B:
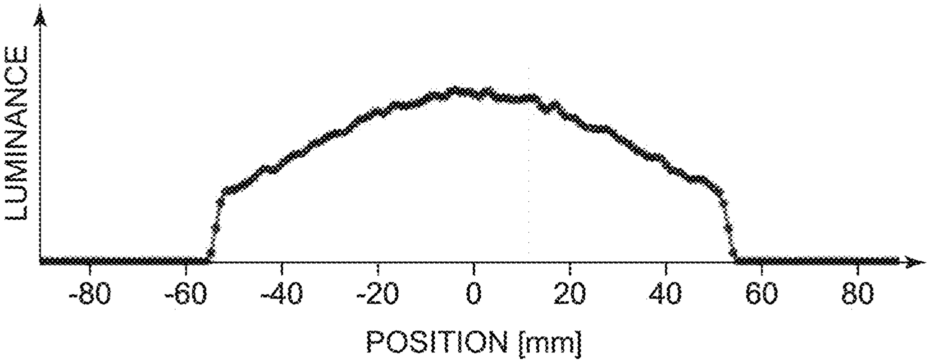
FIG. 11B is a graph showing the luminance distribution along line XIB of FIG. 11A.

FIG. 11B is a graph showing the luminance distribution along line XIB of FIG. 11A.

Figure 12A:
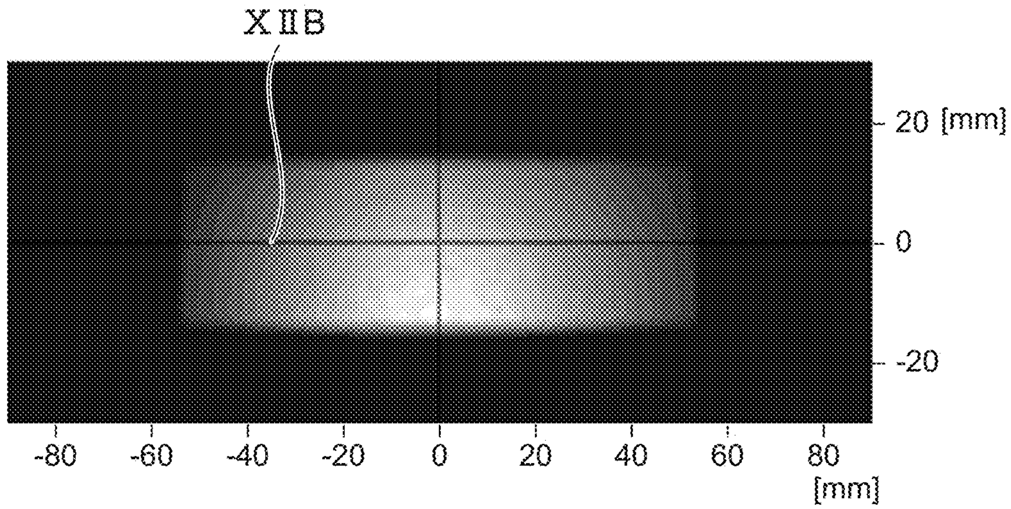
FIG. 12A is a graph showing a simulation of the luminance distribution of the second image of the reference example.

FIG. 12A is a graph showing a simulation of the luminance distribution of the second image of the reference example.

Figure 12B:
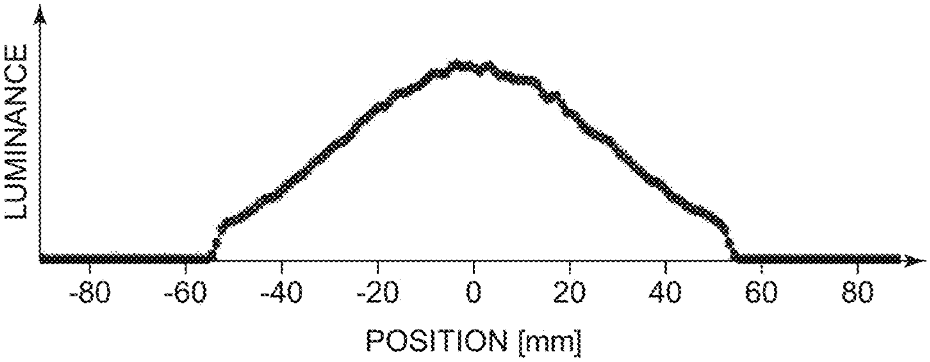
FIG. 12B is a graph showing the luminance distribution along line XIIB of FIG. 12A.

FIG. 12B is a graph showing the luminance distribution along line XIIB of FIG. 12A.

The image display devices according to the examples 1 to 12 and the reference example were set in simulation software to include a light source unit and a reflection unit, wherein the light source unit included multiple light-emitting areas arranged in a matrix configuration and an imaging optical system. The light-emitting areas correspond to the pixels 110*p* of the display device 110 according to the embodiment described above.

In FIG. 9A, the horizontal axis is the angle with respect to the optical axis of the light-emitting area, and the vertical axis is the luminous intensity at the angle, normalized by dividing by the luminous intensity at the optical axis. As shown in FIG. 9A, the display device according to the example 1 was set in the simulation software so that the light emitted from each light-emitting area had a light distribution pattern in which the luminous intensity in the direction of the angle θ with respect to the optical axis was represented by cos θ times the luminous intensity at the optical axis. In other words, according to the example 1, the light that was emitted from each light-emitting area had an exact Lambertian light distribution.

In the examples 2 to 12, the light that was emitted from each light-emitting area was set in the simulation software to have a light distribution pattern in which the luminous intensity in the direction of the angle θ with respect to the optical axis was represented by $\cos^n \theta$ times the luminous intensity at the optical axis. In the example 2, n=2, and n was set to increase by one in order from the example 2 to the example 12.

Also, by investigating the light distribution pattern in one plane of the light emitted from the pixels of an LCD, the light distribution pattern was found to be a light distribution pattern such as that illustrated by the fine broken line of FIG. 9A. Also, as described above, it was found that the luminous intensity in the direction of the angle θ with respect to the optical axis in the light distribution pattern can be approximated by a light distribution pattern represented by $\cos^{20} \theta$ times the luminous intensity at the optical axis. Therefore, in the reference example, the luminous intensity in the direction of the angle θ with respect to the optical axis of each light-emitting area was set in the simulation software to have the light distribution pattern represented by $\cos^{20} \theta$ times the luminous intensity at the optical axis.

The imaging optical systems of the examples 1 to 12 and the reference example each were set to be telecentric at the first image side.

Then, the luminance distribution of the second image formed when the luminance was constant for all light-emitting areas was simulated for the examples 1 to 12 and the reference example. In this case, the second image was a rectangle having a long side of 111.2 mm and a short side of 27.8 mm. Also, in this case, the plane in which the second image was formed was divided into square areas having sides of 1 mm, and the luminance value of each area is simulated. Some of the results are shown in FIGS. 10A to 12B. FIGS. 10A, 11A, and 12A show simulation results of the luminance including not only the second image but also the periphery of the second image. Also, in each of FIGS. 10B, 11B, and 12B, the horizontal axis is the position, and the vertical axis is the luminance.

Also, the uniformity of the luminance of the second image was evaluated for this case. Herein, "the uniformity of the luminance" is the value of the ratio of the minimum value to the maximum value of the luminance inside the second image expressed in percent. The results are shown in FIG. 9B. In FIG. 9B, the horizontal axis is the examples and the reference example, and the vertical axis is the uniformity of the luminance.

As shown in FIG. 9B, it was found that the uniformity of the luminance degraded as n increased. This was because the luminance at positions separated from the center of the second image decreased as n increased as shown in FIGS. 10A to 12B. In particular, it was found that the uniformity of the luminance was 30% for the example 11, that is, when n=11. It is considered that it is sufficient for the uniformity of the luminance of the second image to be not less than 30% so that the user can easily discriminate between the second image and the regions at which the second image was not formed.

Accordingly, it was found that when the imaging optical system is configured to be substantially telecentric, it is favorable for the light emitted from the display device to have a substantially Lambertian light distribution to suppress the uneven luminance of the first and second images. Specifically, it was found that it is favorable for n of $\cos^n \theta$ which is the approximation formula of the light distribution pattern to be not more than 11, and more favorably 1. Although the uniformity of the luminance of the second image IM2 degrades as n deviates from 1 as described above, a prescribed luminance distribution can be pre-provided in the display luminance of the display device 110 to remedy such nonuniformity of the luminance. For example, when the luminance at the outer edge portion of the second image IM2 tends to be less than the luminance at the central portion due to the light emitted from the pixels 110*p* of the display device 110 traveling via the imaging optical system 120, the display device 110 may be controlled so that the outputs of the LED elements 112 of the pixels 110*p* at the outer edge vicinity of the display device 110 to be greater than the outputs of the LED elements 112 of the pixels 110*p* at the center.

Second Embodiment

A second embodiment will now be described.

Figure 13A:
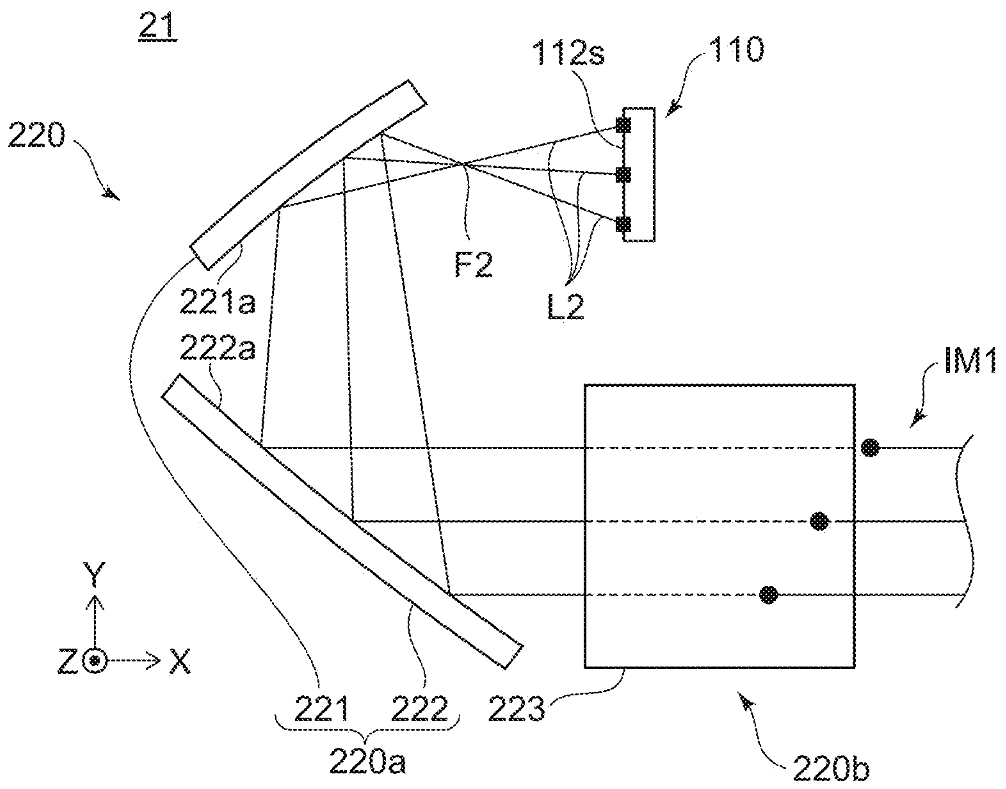
FIG. 13A is a top view showing a light source unit according to a second embodiment.

FIG. 13A is a top view showing a light source unit according to the embodiment.

Figure 13B:
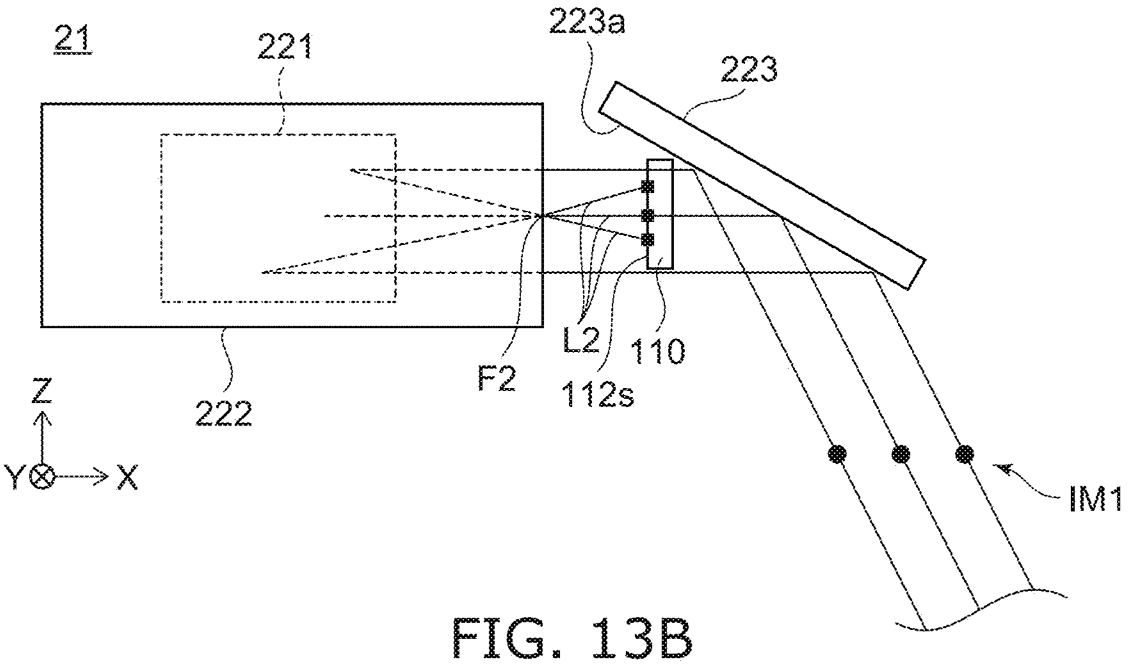
FIG. 13B is a side view showing the light source unit according to the second embodiment.

FIG. 13B is a side view showing the light source unit according to the embodiment.

The orientation of the display device 110 and the configuration of an imaging optical system 220 of the light source unit 21 according to the embodiment are different from those of the light source unit 11 according to the first embodiment.

As a general rule in the following description, only the differences with the first embodiment are described. Other than the items described below, the embodiment is similar to the first embodiment. This is similar for the other embodiments described below as well.

In the display device 110 according to the embodiment, the light-emitting surface 112*s* of the display device 110 is arranged to face the −X direction. However, the orientation of the display device is not limited to such an orientation.

The imaging optical system 220 includes an input element 221, an intermediate element 222, and an output element 223. The input element 221 and the intermediate element 222 are included in a bending part 220*a*, and the output element 223 is included in a direction modifying part 220*b*. A focal point F2 of the imaging optical system 220 is positioned between the display device 110 and the input element 221. In other words, the imaging optical system 220 is substantially telecentric at the first image IM1 side.

The input element 221 is a mirror that includes a concave mirror surface 221*a*. The input element 221 is located at the −X side of the display device 110 and faces the display device 110. The light that is emitted from the display device 110 is reflected by the input element 221. The intermediate element 222 is a mirror that includes a concave mirror surface 222*a*. The intermediate element 222 is located adjacent to the input element 221 in the Y-direction and faces the input element 221. The light that is reflected by the input element 221 is further reflected by the intermediate element 222. Multiple chief rays L2 that are emitted from mutually-different positions of the display device 110 and pass through the focal point F2 are bent to become substantially parallel to each other by being sequentially reflected by the input element 221 and the intermediate element 222.

The output element 223 is a mirror that includes a flat mirror surface 223*a*. The output element 223 is located at the +X side of the intermediate element 222 and faces the intermediate element 222. Similarly to the mirror surface 123*a* of the output element 123 according to the first embodiment, the mirror surface 223*a* is tilted in the +X direction toward the −Z direction with respect to the XY-plane. As a result, the output element 223 reflects the light reflected by the intermediate element 222 in a direction tilted with respect to the Z-direction to be in the +X direction toward the −Z direction.

The optical path between the input element 221 and the intermediate element 222 and the optical path between the intermediate element 222 and the output element 223 extend in directions along the XY-plane. As a result, the imaging optical system 220 can be smaller in the Z-direction.

Third Embodiment

A third embodiment will now be described.

Figure 14:
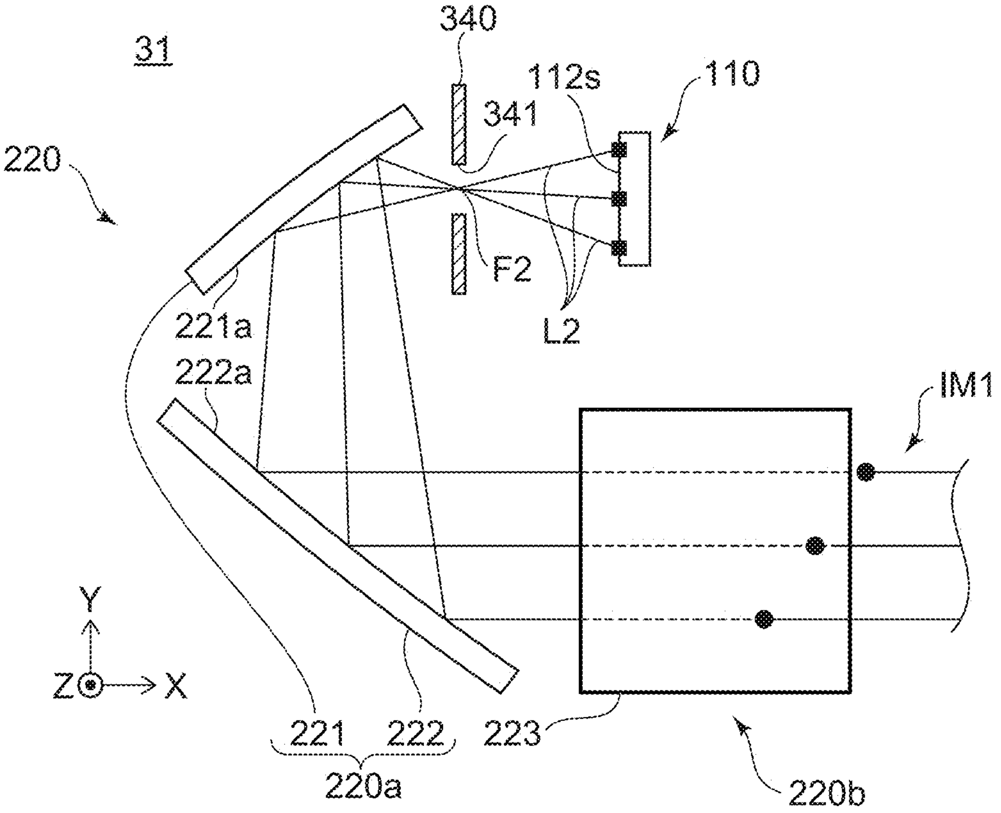
FIG. 14 is a top view showing a light source unit according to a third embodiment.

FIG. 14 is a top view showing a light source unit according to the embodiment.

The light source unit 31 according to the embodiment differs from the light source unit 21 according to the second embodiment in that a light-shielding member 340 is further included. In FIG. 14, only the light-shielding member 340 is shown in cross section.

The light-shielding member 340 is located between the display device 110 and the input element 221 of the imaging optical system 220. For example, the light-shielding member 340 has a flat plate shape substantially parallel to the ZY-plane. An aperture 341 that extends through the light-shielding member 340 in the X-direction is provided in the light-shielding member 340. The focal point F2 of the imaging optical system 220 is positioned inside the aperture 341. The light that is emitted from the display device 110 and passes through the focal point F2 and the vicinity of the focal point F2 passes through the aperture 341 of the light-shielding member 340 and is incident on the input element 221, and the greater part of the light other than the light passing through the aperture 341 is shielded by the light-shielding member 340.

As described above, the light source unit 31 according to the embodiment further includes the light-shielding member 340 that is located between the display device 110 and the imaging optical system 220, the aperture 341 that transmits a portion of the light from the display device 110 toward the imaging optical system 220 is provided in the light-shielding member 340, and the light-shielding member 340 shields another portion of the light from the display device 110 toward the imaging optical system 220. Therefore, the light that is emitted by the display device 110 and does not pass through the focal point F2, i.e., ineffective light, can be prevented from being incident on the imaging optical system 220. The occurrence of stray light can be suppressed thereby. Also, when light such as sunlight or the like from outside the light source unit 11 penetrates the light source unit 31, the light can be prevented from traveling toward the display device 110. An increase of the temperature of the display device 110 can be suppressed thereby. This is because problems such as deviation of the optical axis due to thermal expansion, etc., occur when the temperature of the display device 110 rises to become a prescribed value or more.

Fourth Embodiment

A fourth embodiment will now be described.

Figure 15:
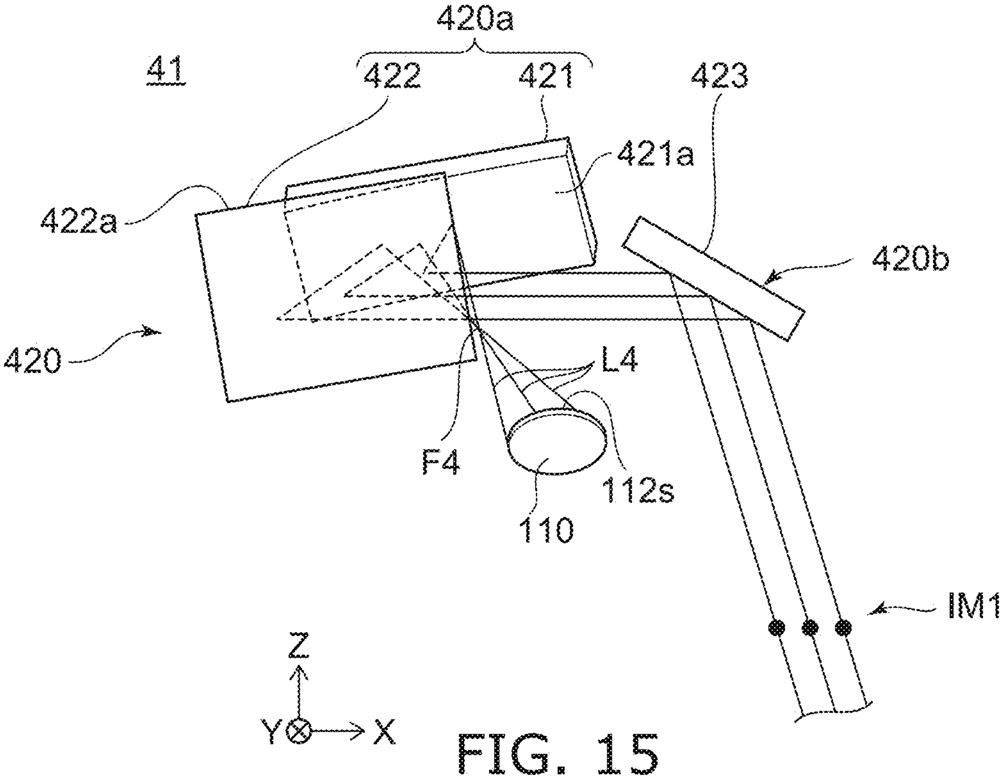
FIG. 15 is a side view showing a light source unit according to a fourth embodiment.

FIG. 15 is a side view showing a light source unit according to the embodiment.

The orientation of the display device 110 and the configuration of an imaging optical system 420 of the light source unit 41 according to the embodiment are different from those of the light source unit 11 according to the first embodiment.

According to the embodiment, the display device 110 is arranged so that the light-emitting surface 112*s* of the display device 110 faces a direction between the +Z direction and the +Y direction. However, the orientation of the display device is not limited to such an orientation.

The imaging optical system 420 includes an input element 421, an intermediate element 422, and an output element 423. The input element 421 and the intermediate element 422 are included in a bending part 420*a*, and the output element 423 is included in a direction modifying part 420*b*. A focal point F4 of the imaging optical system 420 is positioned between the display device 110 and the input element 421. In other words, the imaging optical system 420 is substantially telecentric at the first image IM1 side.

The input element 421 is a mirror that includes a concave mirror surface 421*a*. The input element 421 is located at the +Y side and +Z side of the display device 110 and faces the display device 110. The light that is emitted from the display device 110 is reflected by the input element 421. The intermediate element 422 is a mirror that includes a concave mirror surface 422*a*. The intermediate element 422 is located at the −X side and −Y side of the input element 421 and faces the input element 421. The light that is reflected by the input element 421 is further reflected by the intermediate element 422. Multiple chief rays L4 that are emitted from mutually-different positions of the display device 110 and pass through the focal point F4 are bent by being sequentially reflected by the input element 421 and the intermediate element 422 to become substantially parallel to each other.

The configuration of the output element 423 is similar to the configuration of the output element 123 according to the first embodiment, and a description is therefore omitted.

The optical path between the input element 421 and the intermediate element 422 extends in a direction crossing the XY-plane which is the horizontal plane of the vehicle 13. Also, the optical path between the intermediate element 422 and the output element 423 extends in a direction along the XY-plane. As a result, the imaging optical system 420 can be smaller in directions along the Z-direction and the XY-plane.

Fifth Embodiment

A fifth embodiment will now be described.

Figure 16:
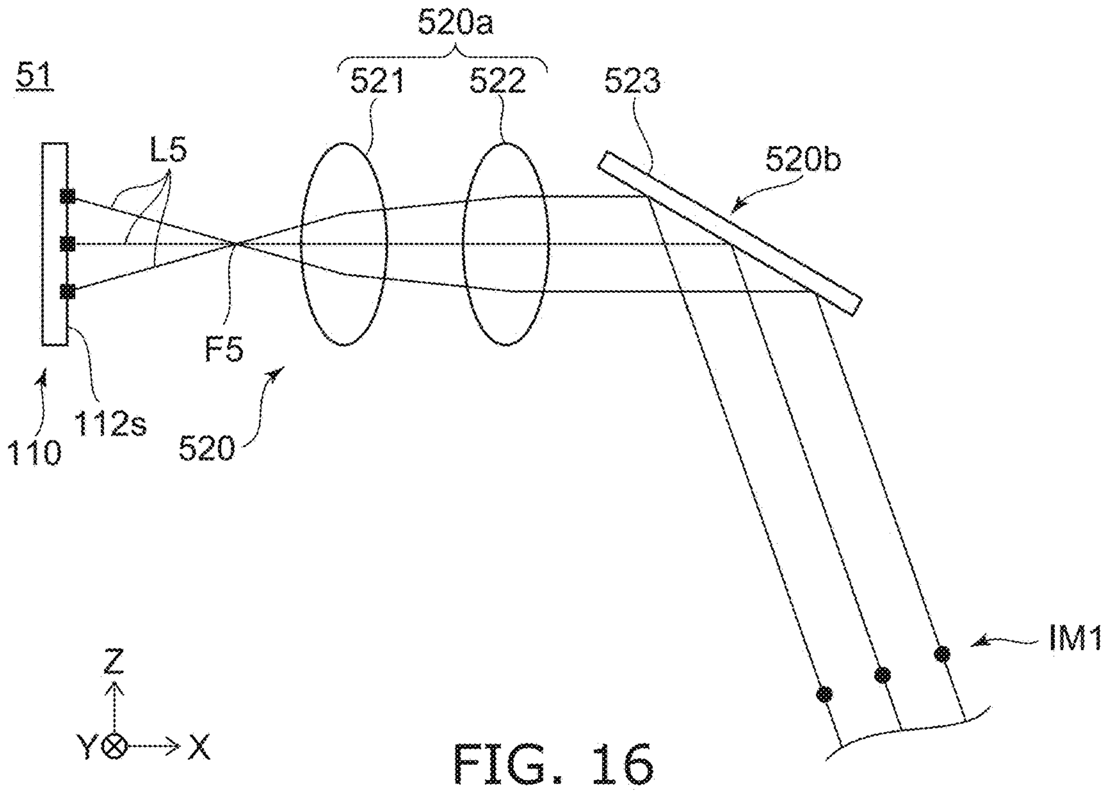
FIG. 16 is a side view showing a light source unit according to a fifth embodiment.

FIG. 16 is a side view showing a light source unit according to the embodiment.

The orientation of the display device 110 and the configuration of an imaging optical system 520 of the light source unit 51 according to the embodiment are different from those of the light source unit 11 according to the first embodiment.

According to the embodiment, the display device 110 is arranged so that the light-emitting surface 112*s* of the display device 110 faces the +X direction. However, the orientation of the display device is not limited to such an orientation.

The imaging optical system 520 includes an input element 521, an intermediate element 522, and an output element 523. The input element 521 and the intermediate element 522 are included in a bending part 520*a*, and the output element 523 is included in a direction modifying part 520*b*. A focal point F5 of the imaging optical system 520 is positioned between the display device 110 and the input element 521. In other words, the imaging optical system 520 is substantially telecentric at the first image IM1 side.

According to the embodiment, the input element 521 is a lens on which the light emitted from the display device 110 is incident. The input element 521 is located at the +X side of the display device 110 and faces the display device 110. According to the embodiment, the intermediate element 522 is a lens on which the light emitted from the input element 521 is incident. The intermediate element 522 is located at the +X side of the input element 521 and faces the display device 110. Multiple chief rays L5 are emitted from mutually-different positions of the display device 110, pass through the focal point F5, are bent by being refracted by the input element 521 and the intermediate element 522, and become substantially parallel to each other. Although an example is shown in FIG. 16 in which the input element 521 and the intermediate element 522 both are convex lenses, the lenses included in the imaging optical system may be lenses of other shapes such as concave lenses, etc.

The configuration of the output element 523 is similar to the configuration of the output element 123 according to the first embodiment, and a description is therefore omitted.

The optical path between the input element 521 and the intermediate element 522 and the optical path between the intermediate element 522 and the output element 523 extend in a direction along the XY-plane. As a result, the imaging optical system 220 can be smaller in the Z-direction.

As described above, the optical elements such as the input element 521, the intermediate element 522, etc., included in the imaging optical system 520 may be lenses. By such a configuration as well, the light source unit 51 that is small and can display a high-quality image can be provided. Also, the number of lenses included in the imaging optical system may be one, three, or more.

Sixth Embodiment

A sixth embodiment will now be described.

Figure 17:
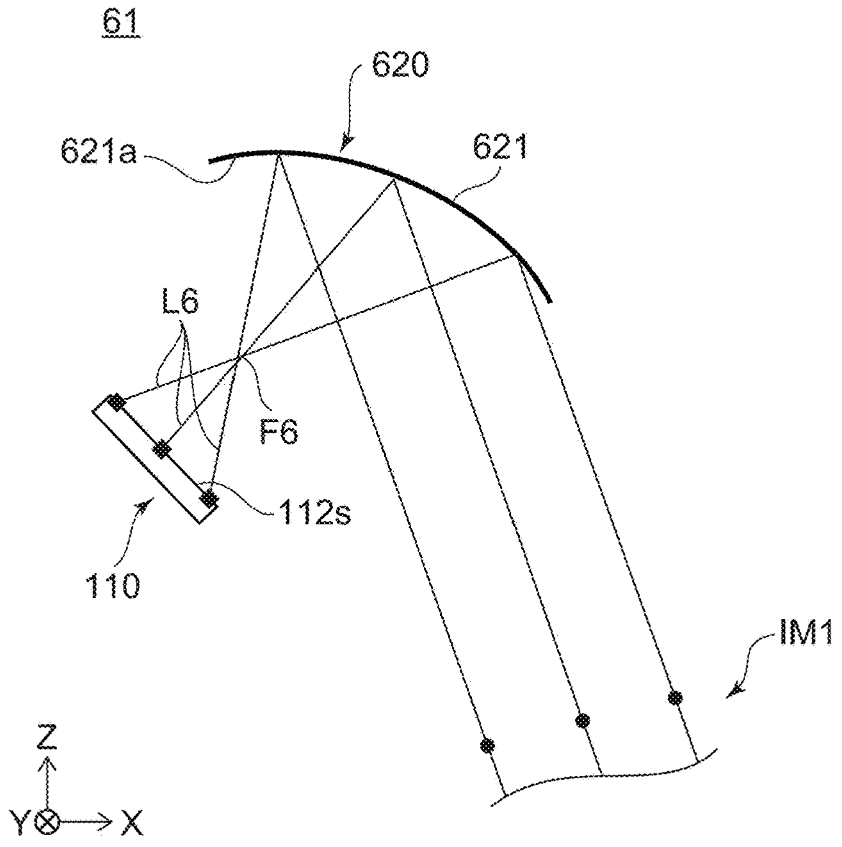
FIG. 17 is a side view showing a light source unit according to a sixth embodiment.

FIG. 17 is a side view showing a light source unit according to the embodiment.

The orientation of the display device 110 and the configuration of an imaging optical system 620 of the light source unit 61 according to the embodiment are different from those of the light source unit 11 according to the first embodiment.

According to the embodiment, the display device 110 is arranged to have an orientation such that the light-emitting surface 112*s* of the display device 110 faces a direction between the +X direction and the +Z direction. However, the orientation of the display device is not limited to such an orientation.

According to the embodiment, the imaging optical system 620 is made of one optical element 621. The optical element 621 is, for example, a mirror that includes a concave mirror surface 621*a*. The optical element 621 is located at the +Z side and +X side of the display device 110 and faces the display device 110. A focal point F6 of the optical element 621 is positioned between the display device 110 and the optical element 621. Multiple chief rays L6 that are emitted from mutually-different positions of the display device 110 and pass through the focal point F6 become substantially parallel to each other by being reflected by the optical element 621. Also, the travel directions of the multiple chief rays L6 are modified by being reflected by the optical element 621 so that the multiple chief rays L6 that are emitted from mutually-different positions of the display device 110 and pass through the focal point F6 travel toward the formation position of the first image IM1.

As described above, the imaging optical system 620 may be made from one optical element 621. By such a configuration as well, the light source unit 61 that is small and can display a high-quality image can be provided. According to the orientation and/or position of the display device, one optical element included in the imaging optical system may be a lens.

Seventh Embodiment

A seventh embodiment will now be described.

Figure 18:
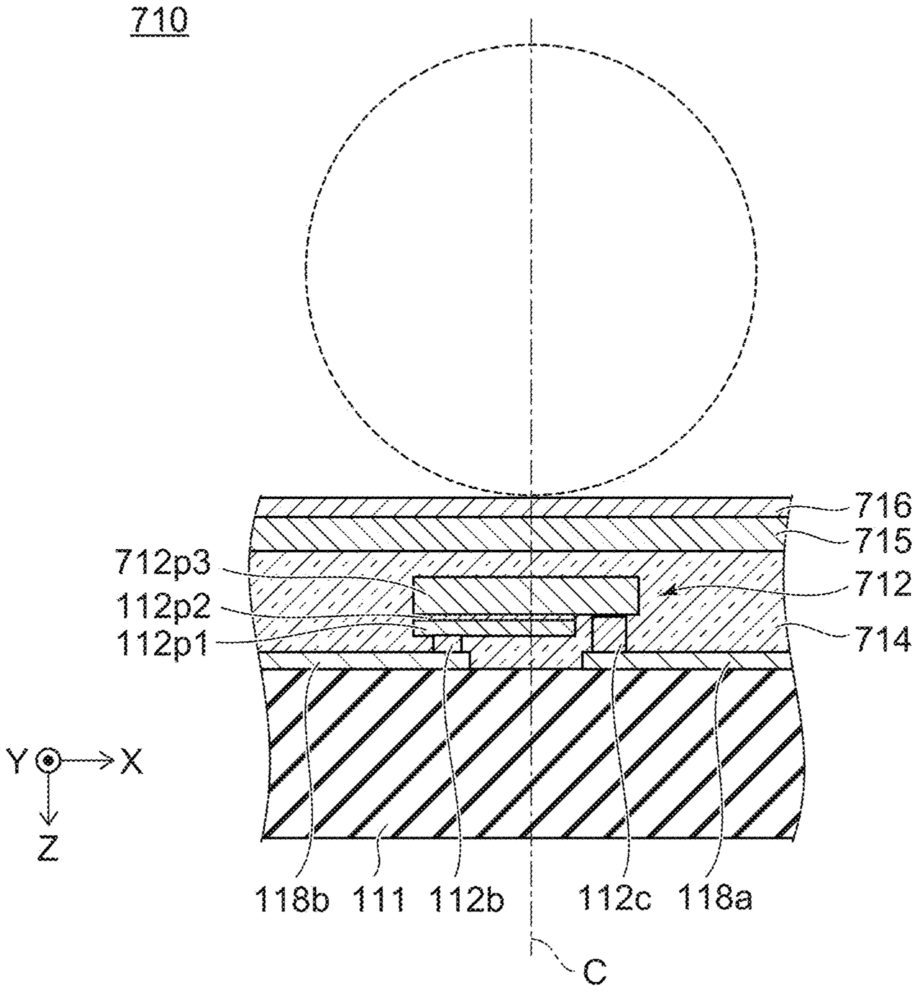
FIG. 18 is a cross-sectional view showing a display device according to a seventh embodiment.

FIG. 18 is a cross-sectional view showing a display device according to the embodiment.

The display device 710 according to the embodiment differs from the display device 110 according to the first embodiment in that the surface of an n-type semiconductor layer 712*p*3 positioned at the side opposite to the surface facing the active layer 112*p*2 is substantially flat, and a protective layer 714, a wavelength conversion member 715, and a color filter 716 are further included.

The protective layer 714 covers multiple LED elements 712 arranged in a matrix configuration. The protective layer 714 can include, for example, a light-transmitting material such as a polymer material that includes a sulfur (S)-including substituent group or a phosphorus (P) atom-including group, a high refractive index nanocomposite material in which inorganic nanoparticles having a high refractive index are introduced to a polymer matrix of polyimide, etc.

The wavelength conversion member 715 is located on the protective layer 714. The wavelength conversion member 715 includes at least one type of wavelength conversion material such as a general fluorescer material, a perovskite fluorescer material, a quantum dot (Quantum Dot: QD), etc. The light that is emitted from each LED element 712 is incident on the wavelength conversion member 715. The wavelength conversion material that is included in the wavelength conversion member 715 emits light of a different light emission peak wavelength from the light emission peak wavelength of the LED element 712 by the light emitted from the LED element 712 being incident on the wavelength conversion material. The light that is emitted by the wavelength conversion member 715 has a substantially Lambertian light distribution.

The color filter 716 is located on the wavelength conversion member 715. The color filter 716 is configured to shield the greater part of the light emitted from the LED element 712. Accordingly, the light that is emitted mainly by the wavelength conversion member 715 is emitted from each pixel 110*p*. Therefore, as illustrated by the broken line in FIG. 18, the light that is emitted from each pixel 110*p* has a substantially Lambertian light distribution. When the greater part of the light emitted from the LED element is absorbed by the wavelength conversion member, a color filter may not be included in the display device. Thus, the light that is emitted from each pixel can have a Lambertian light distribution even when multiple recesses or protrusions are not provided in the light-emitting surface of the LED element.

According to the embodiment, the light emission peak wavelength of the LED element 712 may be in the ultraviolet region or may be in the visible light region. When blue light is to be emitted from at least one pixel 110*p*, for example, blue light may be emitted from the LED element 712 of such a pixel 110*p*, and the wavelength conversion member 715 and the color filter 716 may not be provided for this pixel 110*p*. In such a case, the light that is emitted from the pixel 110*p* may have a substantially Lambertian light distribution by providing a light-scattering member including light-scattering particles to cover the LED element 712.

Eighth Embodiment

An eighth embodiment will now be described.

Figure 19A:
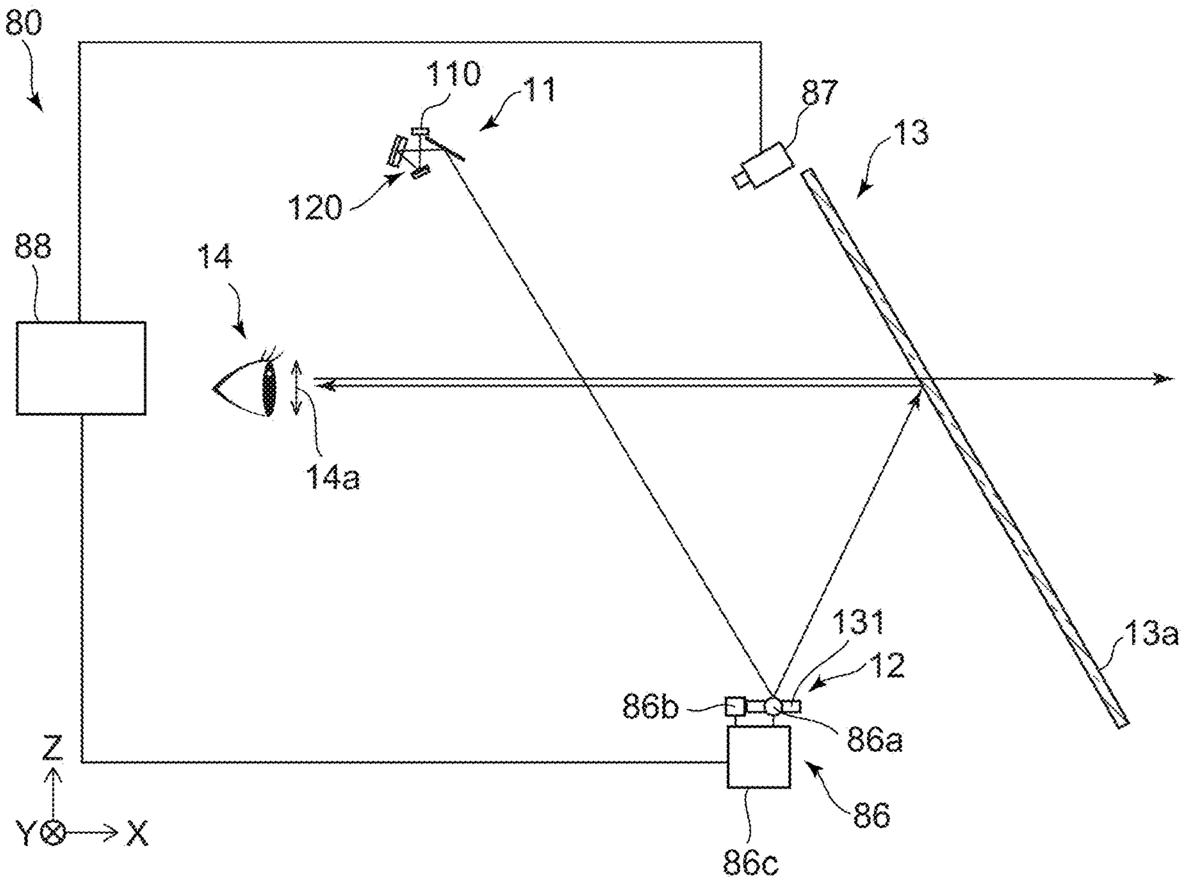
FIG. 19A is a schematic view showing an image display device according to an eighth embodiment.

FIG. 19A is a schematic view showing an image display device according to the embodiment.

Figure 19B:
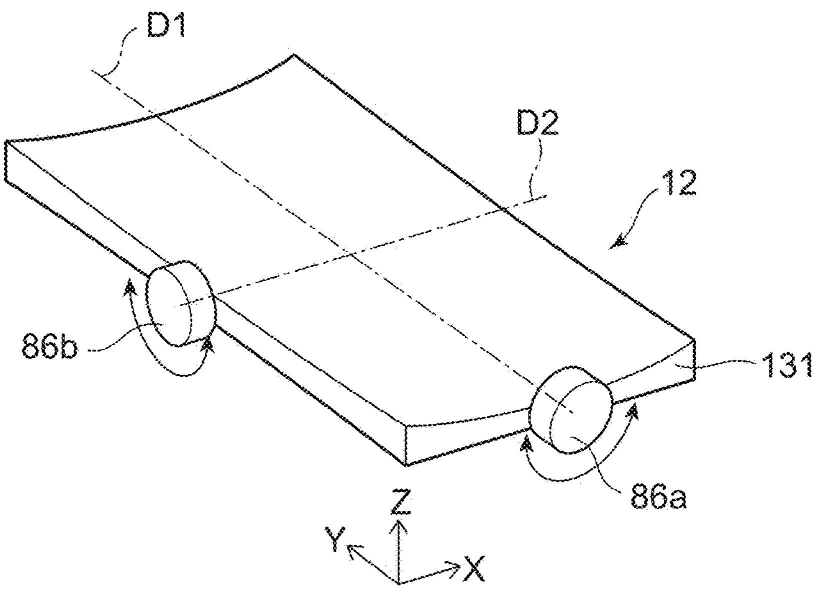
FIG. 19B is a perspective view showing a reflection unit of the image display device according to the eighth embodiment.

FIG. 19B is a perspective view showing a reflection unit of the image display device according to the embodiment.

The image display device 80 according to the embodiment differs from the image display device 10 according to the first embodiment in that the travel direction of the light reflected by the reflection unit 12 is modifiable according to the pupil position of the user 14.

The image display device 80 further includes a driver 86 configured to modify the orientation of the reflection unit 12, a camera 87 configured to image the eye of the user 14, and a controller 88 that estimates the pupil position of the user 14 and controls the driver 86 according to the image that is imaged by the camera 87.

The driver 86 includes a first motor 86*a* and a second motor 86*b* configured to modify the orientation of the mirror 131 of the reflection unit 12, and a circuit 86*c* that drives the first motor 86*a* and the second motor 86*b*. For example, the first motor 86*a* is configured to rotate the mirror 131 around a rotation axis D1 extending in the Y-direction. For example, the second motor 86*b* is configured to rotate the mirror 131 around a rotation axis D2 extending in the X-direction. The circuit 86*c* is electrically connected to the first motor 86*a*, the second motor 86*b*, and the controller 88. Gears may be provided between the motors and the mirror. Also, the number of motors included in the driver may be one. Also, the driver may modify the orientation of the reflection unit by a part other than a motor such as a solenoid, etc.

For example, the camera 87 is located at the +Z side and +X side of the user 14. However, the position of the camera is not limited to such a position as long as the eye of the user 14 can be imaged.

The controller 88 is electrically connected to the driver 86 and the camera 87. The controller 88 includes, for example, a processor such as a CPU (Central Processing Unit) or the like, memory such as ROM (Read Only Memory), RAM (Random Access Memory), etc. The controller 88 estimates the pupil position of the user 14 according to the image that is imaged by the camera 87. The controller 88 modifies the orientation of the reflection unit 12 by controlling the driver 86 according to the estimated pupil position.

For example, when the estimated pupil position is positioned at the −Z side or +Z side of the light reflected by the front windshield 13*a*, the controller 88 drives the first motor 86*a* to rotate the mirror 131 around the rotation axis D1. As a result, the irradiation position on the front windshield 13*a* of the light emitted from the mirror 131 can be modified along the Z-direction. Also, when the estimated pupil position is positioned at the −Y side or +Y side of the light reflected by the front windshield 13*a*, the controller 88 drives the second motor 86*b* to rotate the mirror 131 around the rotation axis D2. As a result, the irradiation position on the front windshield 13*a* of the light emitted from the mirror 131 can be modified along the Y-direction.

According to the embodiment as described above, the travel direction of the light emitted from the reflection unit 12 can be modified according to the pupil position of the user 14.

Ninth Embodiment

A ninth embodiment will now be described.

Figure 20:
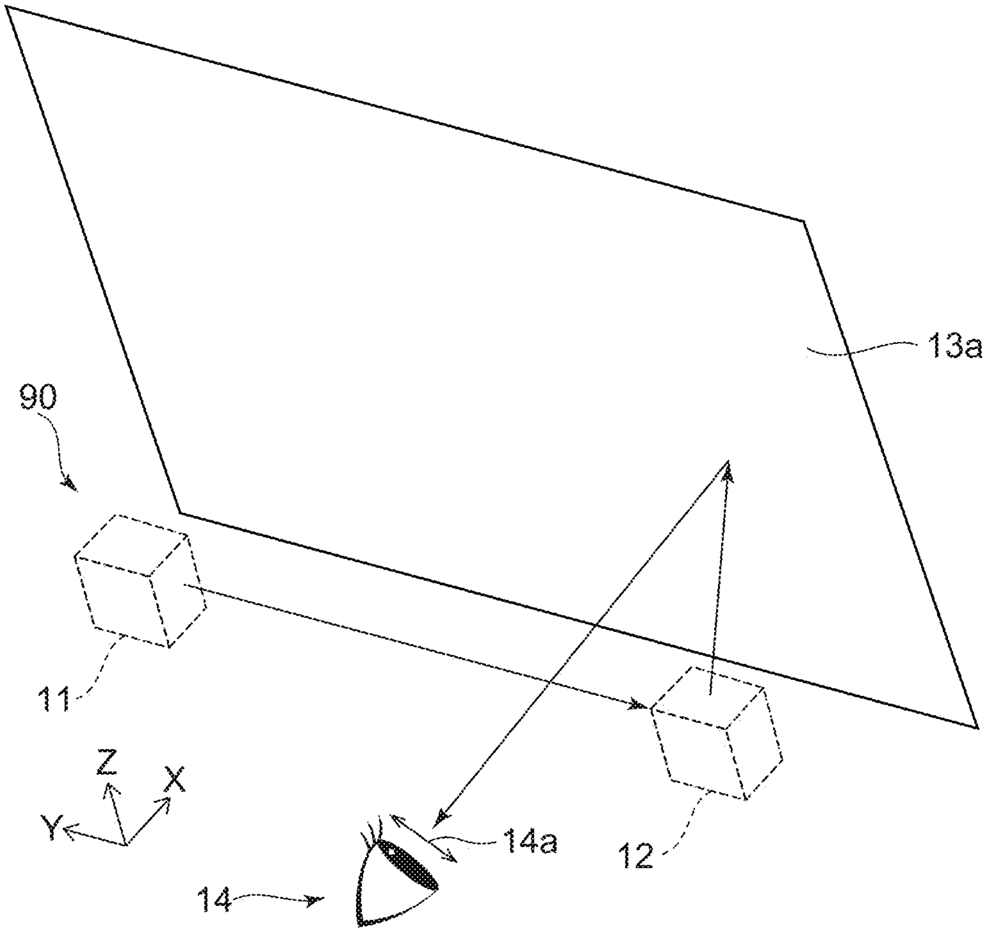
FIG. 20 is a perspective view showing an image display device according to a ninth embodiment.

FIG. 20 is a perspective view showing an image display device according to the embodiment.

The location of the light source unit 11 of the image display device 90 according to the embodiment is different from that of the image display device 10 according to the first embodiment.

In the image display device 90, the light source unit 11 is located adjacent to the reflection unit 12 in the Y-direction. For example, the light source unit 11 and the reflection unit 12 are located at the dashboard part 13*c*. However, the light source unit and the reflection unit may be located at the ceiling part.

The X-direction in which the eyebox 14*a* and the inner surface of the front windshield 13*a* face each other is taken as the first direction, and the Z-direction that is orthogonal to the first direction is taken as the second direction. The light from the inner surface of the front windshield 13*a* toward the eyebox 14*a* is positioned at the XY-plane orthogonal to the second direction (the Z-direction). The light source unit 11 and the reflection unit 12 are located in a region at one side (the −Z side) in the second direction with the XY-plane as a boundary. In other words, the light source unit 11 and the reflection unit 12 are separated in the −Z direction from the XY-plane. However, at least one of the light source unit or the reflection unit and the light from the inner surface of the front windshield toward the eyebox may be positioned at the same XY-plane orthogonal to the second direction (the Z-direction). Here, the light source unit being positioned at the XY-plane means that a portion of the light source unit is positioned at the XY-plane. This is similar for the reflection unit as well.

Tenth Embodiment

A tenth embodiment will now be described.

Figure 21:
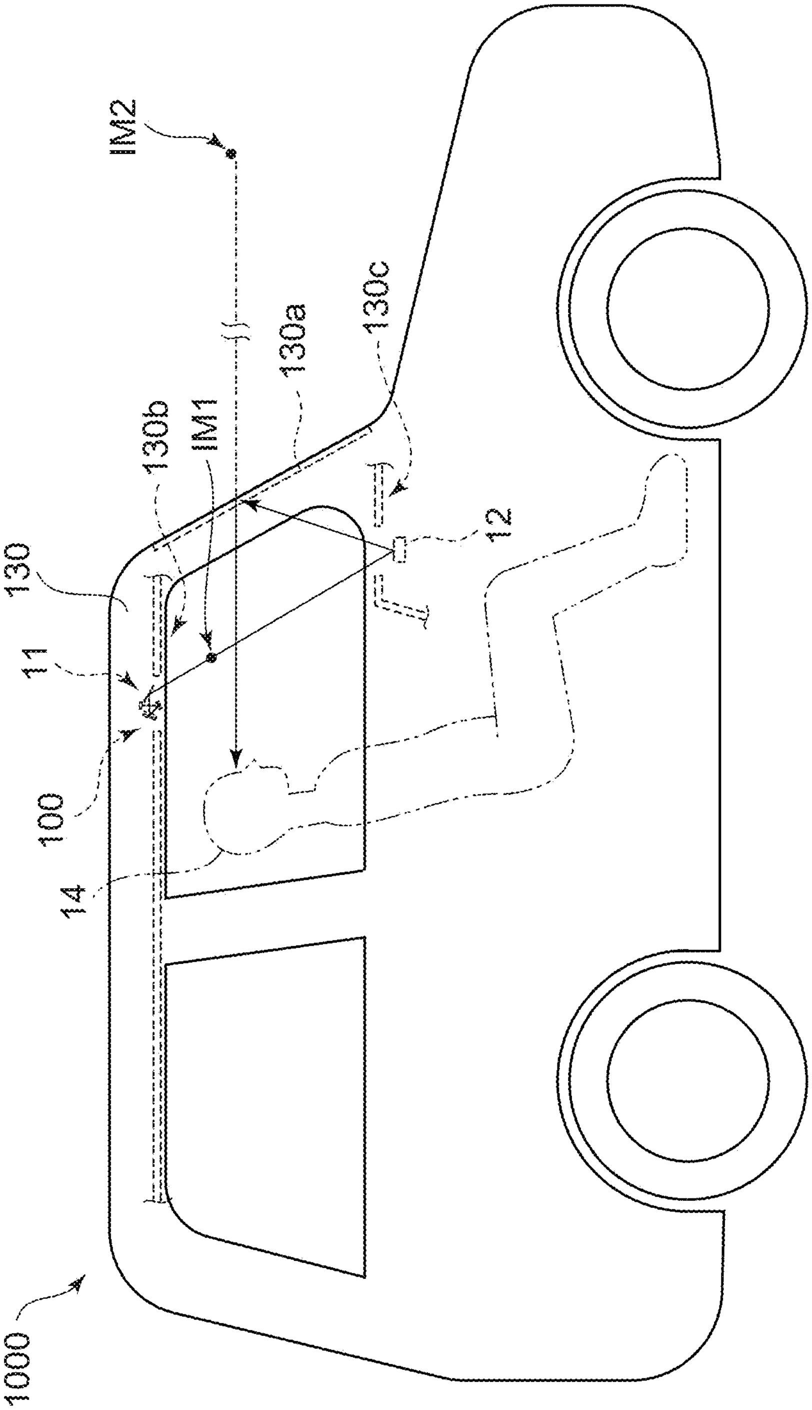
FIG. 21 is a side view showing a vehicle in which an image display device according to a tenth embodiment is mounted.

FIG. 21 is a side view showing a vehicle in which an image display device according to the embodiment is mounted.

The image display device 100 according to the embodiment can be mounted in the vehicle 130 and used as a HUD. In other words, an automobile 1000 according to the embodiment includes the vehicle 130 and the image display device 100. The image display device 100 is fixed to the vehicle 130. This is similar for other embodiments as well. The light source unit 11 of the image display device 100 is located at a ceiling part 130*b* of the vehicle 130. The reflection unit 12 of the image display device 100 is located at a dashboard part 130*c* of the vehicle 130.

The light source unit 11 that is located at the ceiling part 130*b* forms the first image IM1 between the light source unit 11 and the reflection unit 12. The reflection unit 12 reflects the light emitted from the light source unit 11. The greater part of the light reflected by the reflection unit 12 is reflected by the inner surface of a front windshield 130*a* and enters the eyebox of the user 14. As a result, the user 14 can view the second image IM2. The light source unit 11 also can be configured to have a continuous body with a rearview mirror unit (not illustrated), etc.

Eleventh Embodiment

An eleventh embodiment will now be described.

Figure 22:
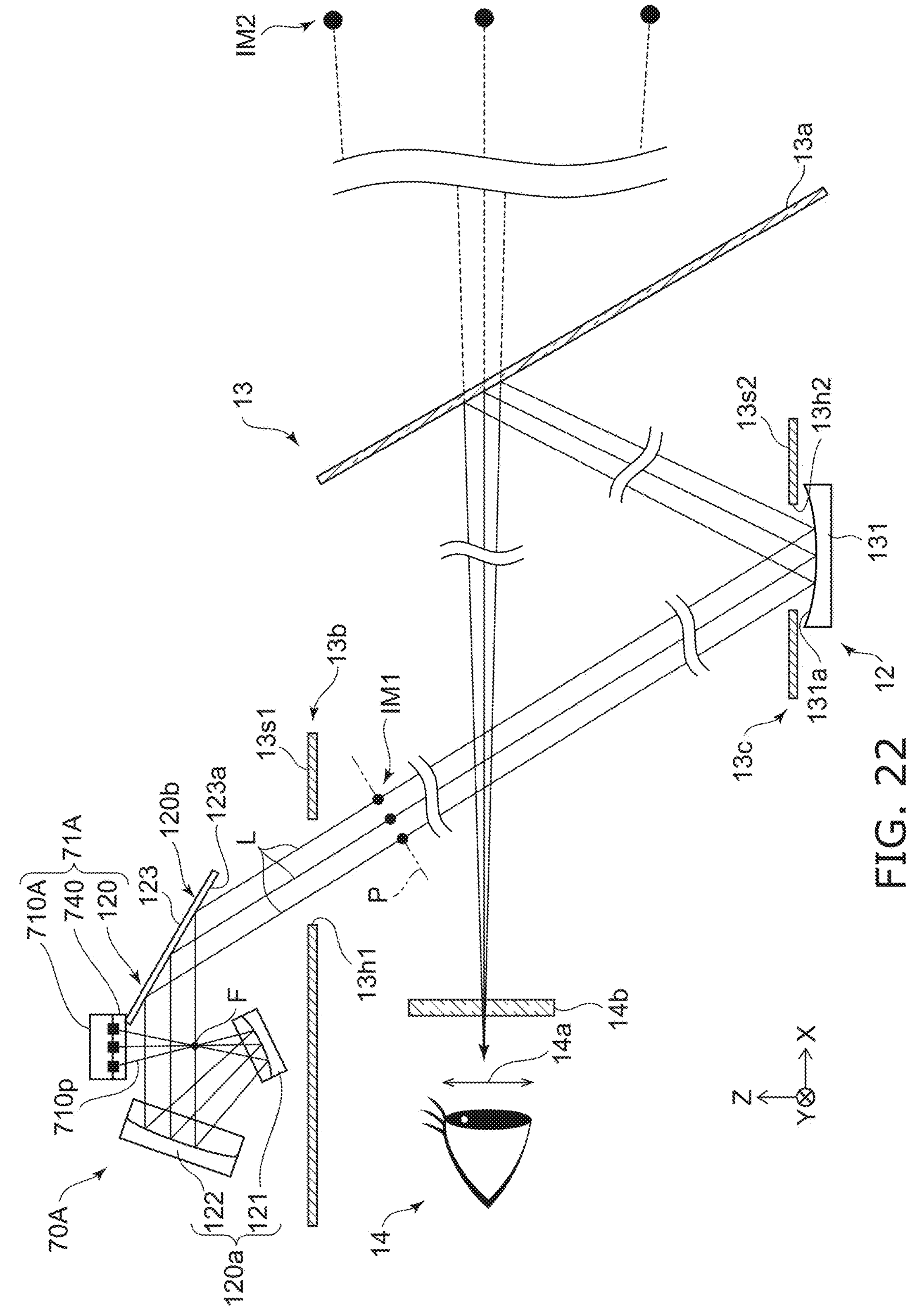
FIG. 22 is a cross-sectional view showing a head-up display in which an image display device according to an eleventh embodiment is applied.

FIG. 22 is a cross-sectional view showing a head-up display in which an image display device according to the embodiment is applied.

Figure 23:
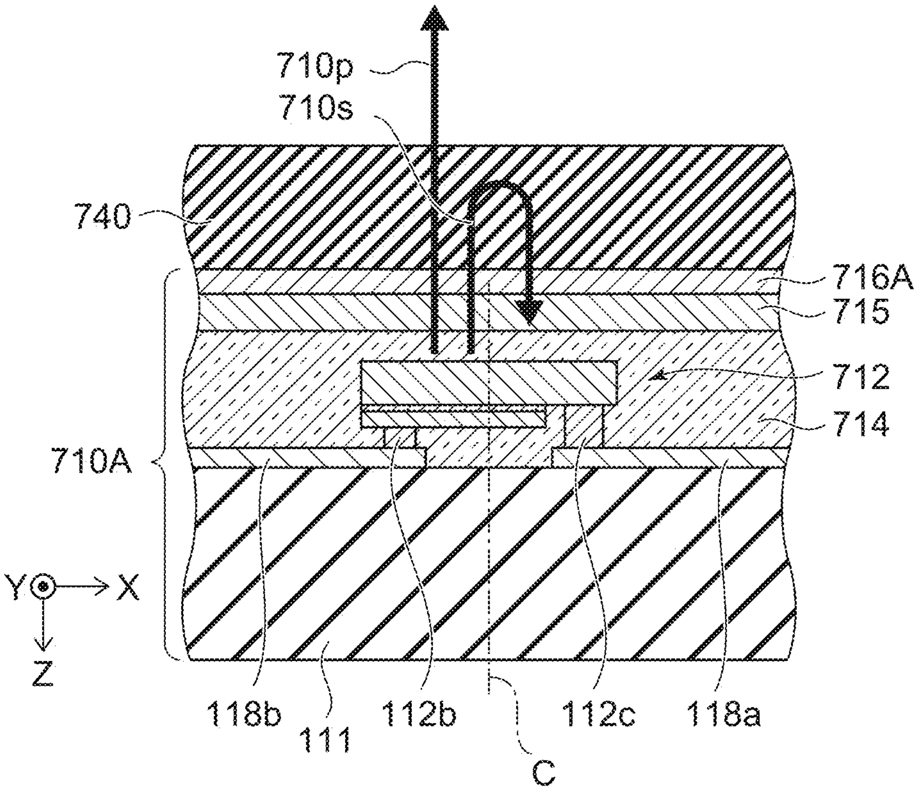
FIG. 23 is an enlarged cross-sectional view showing the display device and the reflective polarizing element shown in FIG. 22.

FIG. 23 is an enlarged cross-sectional view showing a portion of the display device and the reflective polarizing element shown in FIG. 22.

The image display device 70A according to the embodiment differs from the image display device 10 according to the first embodiment in that a display device 710A is included instead of the display device 110, and a reflective polarizing element 740 is further included.

The display device 710A differs from the display device 710 (see FIG. 18) according to the seventh embodiment in that the color filter 716 is not included, and a light-scattering member 716A is provided to cover the LED element 712. Otherwise, the configuration of the display device 710A is similar to the display device 710 according to the seventh embodiment. The light-scattering member 716A includes, for example, a light-transmitting resin member and light-scattering particles or voids located inside the resin member. Examples of the resin member include, for example, polycarbonate, etc. Examples of the light-scattering particles include, for example, materials having a refractive index difference with the resin member such as titanium oxide, etc. A light scattering effect may be obtained by providing an unevenness in the surface of the light-scattering member 716A by surface roughening.

As shown in FIG. 23, the reflective polarizing element 740 is located on the display device 710A. According to the embodiment, the reflective polarizing element 740 is located on the light-scattering member 716A. Therefore, the light that is emitted from the LED element 712 and the wavelength conversion member 715 is incident on the reflective polarizing element 740. The reflective polarizing element 740 transmits a first polarized light 710*p* of the light emitted from the display device 710A and reflects, toward the display device 710A, a second polarized light 710*s* of the light emitted from the display device 710A. The oscillation direction of the electric field of the second polarized light 710*s* is substantially orthogonal to the oscillation direction of the electric field of the first polarized light 710*p*.

According to the embodiment, the first polarized light 710*p* is P-polarized light, and the second polarized light 710*s* is S-polarized light. Herein, "P-polarized light" means light of which the oscillation direction of the electric field is substantially parallel to the XY-plane. Also, "S-polarized light" means light of which the oscillation direction of the electric field is substantially perpendicular to the XY-plane including the incident light and the reflected light.

There are cases where the user 14 of the vehicle 13 wears polarized sunglasses 14*b* to reduce glare such as sunlight reflected by a puddle in front of the vehicle 13 and transmitted by the front windshield 13*a*, etc. In such a case, the component corresponding to the P-polarized light of the sunlight reflected by the puddle or the like when reflected and viewed through the front windshield 13*a* is particularly reduced; therefore, the polarized sunglasses 14*b* are designed to shield the greater part of S-polarized light. Accordingly, when the user 14 wears the polarized sunglasses 14*b*, there is a possibility that the second image IM2 may be difficult for the user 14 to view because the polarized sunglasses 14*b* also undesirably shield the greater part of the S-polarized light included in the light emitted by the display device 710A. In the specification, P-polarized light and S-polarized light are physically defined by reflection objects such as the puddles and the like described above.

According to the embodiment, the reflective polarizing element 740 transmits the first polarized light 710*p* of the light emitted from the display device 710A and reflects the second polarized light 710*s* of the light emitted from the display device 710A. After traveling via the imaging optical system 120, the reflection unit 12, and the inner surface of the front windshield 13*a*, the greater part of the first polarized light 710*p* transmitted by the reflective polarizing element 740 enters the eyebox 14*a* without being shielded by the polarized sunglasses 14*b*. The incidence angle of the first polarized light 710*p* when incident on the inner surface of the front windshield 13*a* is set to a different angle from Brewster's angle.

Specifically, as shown in FIG. 23, the light that is emitted from the LED element 712 is irradiated on the wavelength conversion member 715. As a result, the wavelength conversion member 715 is excited and emits light of a longer light emission peak wavelength than the light emission peak wavelength of the light emitted from the LED element 712. According to the embodiment, the light that is emitted from the display device 710A includes light emitted from the LED element 712 and light emitted from the wavelength conversion member 715. Hereinbelow, the light that is emitted from the display device 710A and emitted from the LED element 712 also is called "short-wavelength light", and the light that is emitted from the wavelength conversion member 715 also is called "long-wavelength light". However, the greater part of the light emitted from the LED element 712 may be absorbed by the wavelength conversion member 715.

The greater part of the first polarized light 710*p* included in the short-wavelength light and long-wavelength light is transmitted by the reflective polarizing element 740 and emitted from the imaging optical system 120.

Also, the greater part of the second polarized light 710*s* included in the short-wavelength light and long-wavelength light is reflected by the reflective polarizing element 740. Scattering reflection of a portion of the second polarized light 710*s* reflected by the reflective polarizing element 740 is performed by components of the display device 710A such as the light-scattering member 716A, the wavelength conversion member 715, etc. A portion of the second polarized light 710*s* is converted into the first polarized light 710*p* by the scattering reflection. A portion of the first polarized light 710*p* converted from the second polarized light 710*s* is transmitted by the reflective polarizing element 740 and emitted from a light source unit 71A. Therefore, the luminance of the first image IM1 can be increased while increasing the ratio of the first polarized light 710*p* included in the light emitted from the light source unit 71A. By improving the luminance of the first image IM1, the luminance of the second image IM2 also is improved. As a result, the user 14 more easily views the second image IM2.

Also, a portion of the short-wavelength light included in the second polarized light 710*s* may be reflected by the reflective polarizing element 740 and then incident on the wavelength conversion member 715. In such a case, an effect can be expected in which the wavelength conversion member 715 absorbs the short-wavelength light of the second polarized light 710*s* and radiates new long-wavelength light. Both the scattered reflection light and the radiated light have substantially Lambertian light distributions.

Also, the reflective polarizing element 740 itself may scatter and reflect the second polarized light 710*s*. In such a case as well, a portion of the second polarized light 710*s* is converted into the first polarized light 710*p* by the scattering reflection.

For example, a multilayer stacked thin film polarizing plate in which thin film layers of different polarization characteristics are stacked, etc., can be used as the reflective polarizing element 740.

According to the embodiment, one reflective polarizing element 740 covers all of the pixels of the display device 710A. However, the light source unit may include multiple reflective polarizing elements, and the reflective polarizing elements may be located respectively on the pixels. Also, the configuration of the display device used in combination with the reflective polarizing element is not limited to the configuration described above. For example, the display device may be configured without a light-scattering member by using the light scattering reflection effect of the wavelength conversion member. Also, the display device may be configured without a wavelength conversion member by using the scattering reflection effect of the light-scattering member. Also, the display device may be configured without a wavelength conversion member or a light-scattering member by using the light scattering reflection effect of multiple recesses or multiple protrusions provided in the light-emitting surface of the LED element as in the first embodiment.

Effects of the embodiment will now be described.

The light source unit 71A according to the embodiment further includes the reflective polarizing element 740 that is located on the display device 710A, transmits the first polarized light 710*p* of the light emitted from the display device 710A, and reflects the second polarized light 710*s* of the light emitted from the display device 710A. Therefore, the luminance of the first image IM1 can be increased while increasing the ratio of the first polarized light 710*p* included in the light emitted from the light source unit 71A.

Also, the light that is emitted from the reflective polarizing element 740 has a substantially Lambertian light distribution. Therefore, according to the embodiment as well, the light source unit 71A that is small and can form a high-quality first image IM1 can be provided. Because the multiple LED elements 712 are discretely mounted on the substrate 111, the first image IM1 may have a grainy appearance. The wavelength conversion member 715 has the effect of relaxing the grainy appearance. Also, the light-scattering member 716A can further reinforce the effect of relaxing the grainy appearance.

Twelfth Embodiment

Figure 24:
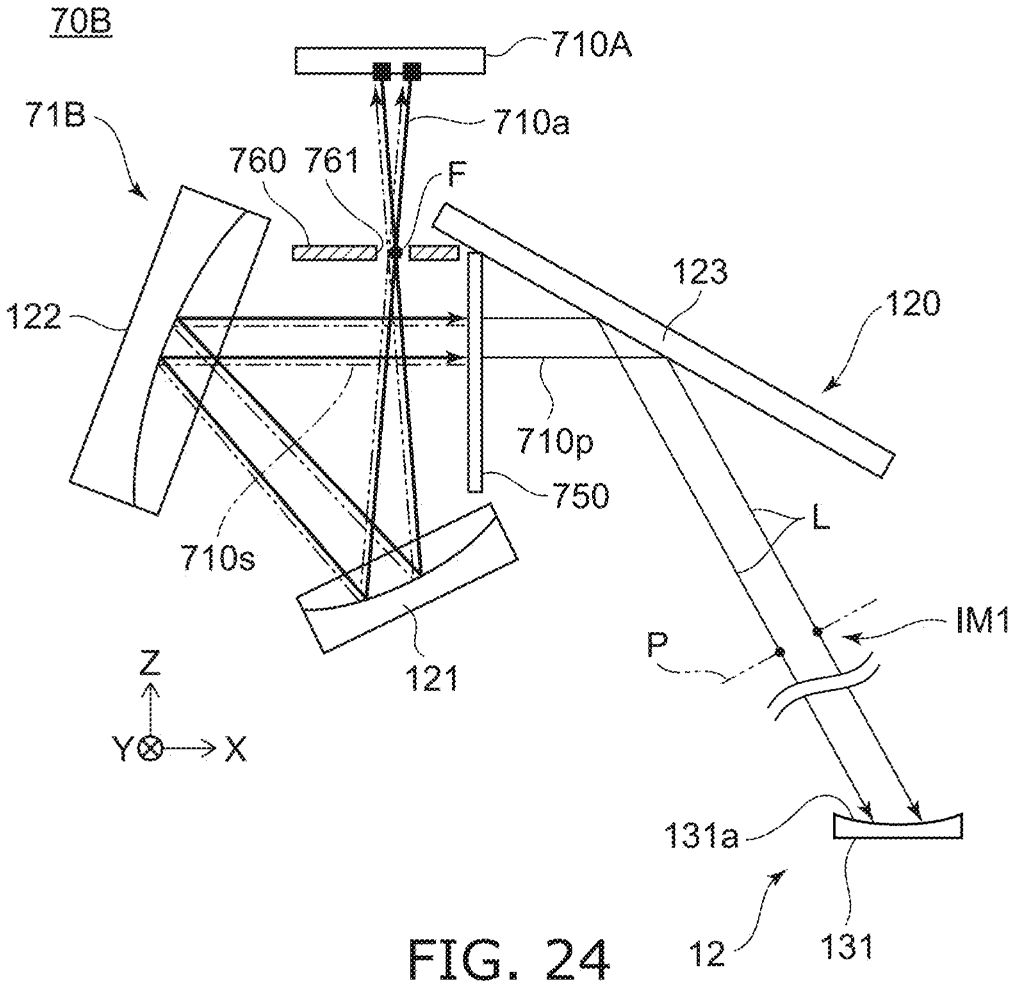
FIG. 24 is a side view showing a light source unit according to a twelfth embodiment.

FIG. 24 is a side view showing a light source unit according to the embodiment.

Figure 25:
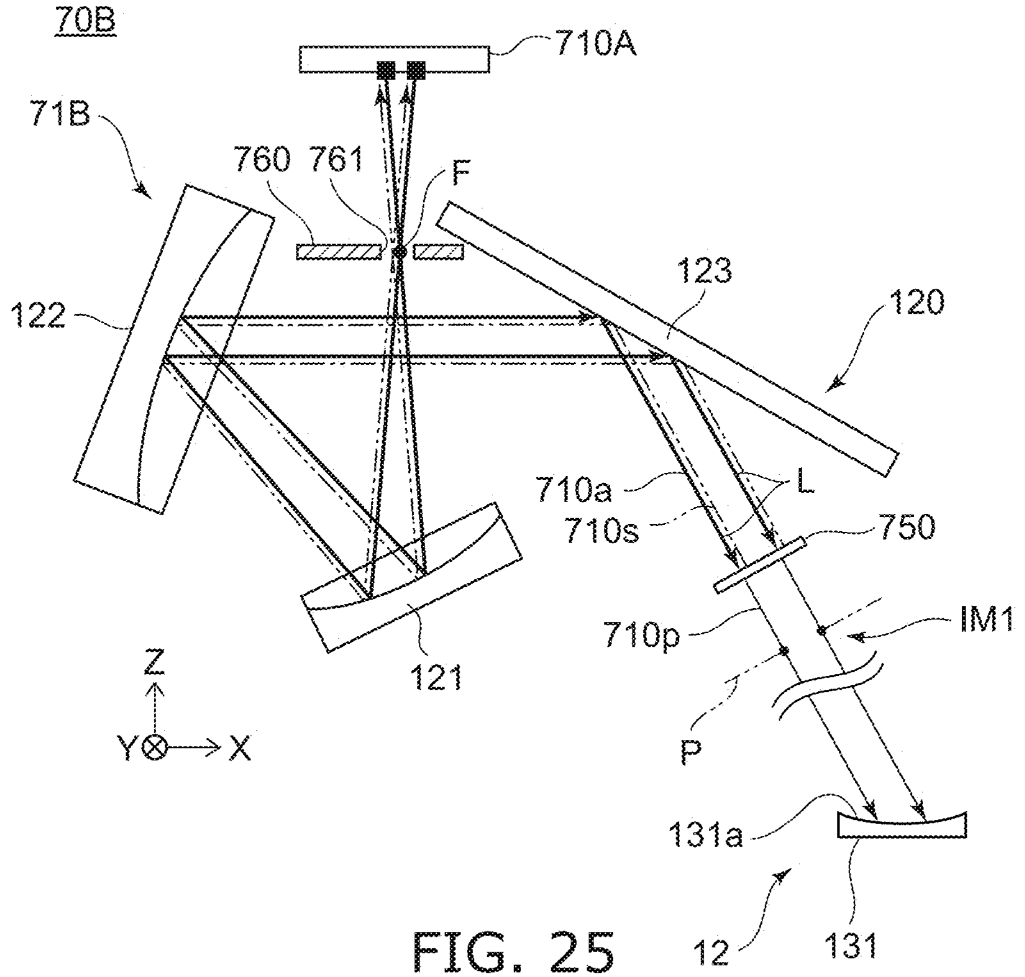
FIG. 25 is a side view showing a modification of the light source unit shown in FIG. 24.

FIG. 25 is a side view showing a modification of the light source unit shown in FIG. 24.

An image display device 70B according to the embodiment differs from the image display device 10 according to the first embodiment in that a light source unit 71B includes the display device 710A having a configuration similar to that of the eleventh embodiment instead of the display device 110, and a reflective polarizing element 750 and a light-shielding member 760 are further included. In FIGS. 24 and 25, only the light-shielding member 760 is shown in cross section.

The reflective polarizing element 750 is located at a part of the optical path from the display device 710A to the reflection unit 12 at which the multiple chief rays L are substantially parallel to each other. According to the embodiment, the multiple chief rays L are substantially parallel to each other in the optical path between the intermediate element 122 and the reflection unit 12, and the reflective polarizing element 750 is located between the intermediate element 122 and the output element 123.

The reflective polarizing element 750 transmits the first polarized light 710*p*, which is P-polarized light, and reflects the second polarized light 710*s*, which is S-polarized light, to return the second polarized light 710*s* to the display device 710A. Specifically, the display device 710A emits light 710*a* that includes the first and second polarized light 710*p* and 710*s*. The light 710*a* travels via the input element 121 and the intermediate element 122 and then is incident on the reflective polarizing element 750.

The reflective polarizing element 750 transmits the greater part of the first polarized light 710*p* included in the light 710*a*. The greater part of the first polarized light 710*p* transmitted by the reflective polarizing element 750 travels via the output element 123 and then is emitted from the reflection unit 12.

The reflective polarizing element 750 reflects the greater part of the second polarized light 710*s* included in the light 710*a* and returns the greater part of the second polarized light 710*s* along the optical path from the display device 710A to the reflective polarizing element 750. Specifically, the reflective polarizing element 750 has a flat plate shape. The reflective polarizing element 750 is arranged to be substantially orthogonal to the chief rays L. The reflective polarizing element 750 specularly reflects the greater part of the second polarized light 710*s*. Therefore, the greater part of the second polarized light 710*s* reflected by the reflective polarizing element 750 travels via the intermediate element 122 and the input element 121 in this order and then returns to the display device 710A.

Similarly to the eleventh embodiment, a portion of the second polarized light 710*s* returning to the display device 710A is scattered and reflected by the components of the display device 710A such as the light-scattering member 716A, the wavelength conversion member 715, etc. A portion of the second polarized light 710*s* converted into the first polarized light 710*p* by the scattering reflection. A portion of the first polarized light 710*p* converted from the second polarized light 710*s* travels via the input element 121 and the intermediate element 122 and then is transmitted by the reflective polarizing element 750. The greater part of the first polarized light 710*p* transmitted by the reflective polarizing element 750 travels via the output element 123 and then is emitted from the reflection unit 12. Therefore, the luminance of the second image IM2 can be increased while increasing the ratio of the first polarized light 710*p* included in the light emitted from the image display device 70B. As a result, the user 14 more easily views the second image IM2.

Also, similarly to the eleventh embodiment, a portion of the short-wavelength light included in the second polarized light 710*s* returning to the display device 710A may be irradiated on the wavelength conversion member 715. In such a case as well, similarly to the eleventh embodiment, the wavelength conversion member 715 absorbs the short-wavelength light of the second polarized light 710*s*, and an effect of radiating new long-wavelength light can be expected.

The reflective polarizing element 750 can include, for example, a wire-grid reflective polarizing element using multiple metal nanowires.

The light-shielding member 760 is located between the display device 710A and the input element 121 of the imaging optical system 120. For example, the light-shielding member 760 has a flat plate shape substantially parallel to the XY-plane. An aperture 761 that extends through the light-shielding member 760 in the Z-direction is provided in the light-shielding member 760. The focal point F of the imaging optical system 120 is positioned inside the aperture 761.

The light emitted from the display device 710A and passing through the focal point F and the vicinity of the focal point F passes through the aperture 761 of the light-shielding member 760 and is incident on the input element 121, and the greater part of the light other than the light passing through the aperture 761 is shielded by the light-shielding member 760. Also, the second polarized light 710*s* that is reflected by the reflective polarizing element 750 and travels along the optical path, i.e., the light that passing through the focal point F and the vicinity of the focal point F, passes through the aperture 761 of the light-shielding member 760 and returns to the display device 710A. On the other hand, the greater part of the second polarized light 710*s* that is reflected by the reflective polarizing element 750 and travels toward the display device 710A and not along the optical path is shielded by the light-shielding member 760.

Effects of the embodiment will now be described.

The image display device 70B according to the embodiment further includes the reflective polarizing element 750. The reflective polarizing element 750 is located at a part of the optical path from the display device 710A to the reflection unit 12 at which the multiple chief rays L that are emitted from mutually-different positions of the display device 710A and pass through the first image IM1 are substantially parallel to each other, transmits the first polarized light 710*p* of the light emitted from the display device 710A, and reflects the second polarized light 710*s* of the light emitted from the display device 710A to return the second polarized light 710*s* to the display device 710A. Therefore, the luminance of the second image IM2 can be increased while increasing the ratio of the first polarized light 710*p* included in the light emitted from the image display device 70B.

Also, the light-shielding member 760 is located between the display device 710A and the input element 121. The aperture 761 that transmits the second polarized light 710*s* returning to the display device 710A along the optical path is provided in the light-shielding member 760. Therefore, the second polarized light 710*s* that is reflected by the reflective polarizing element 750, does not travel along the optical path, and becomes stray light can be prevented from traveling toward the display device 710A while permitting the second polarized light 710*s* that is reflected by the reflective polarizing element 750 and travels along the optical path to return to the display device 710A. The quality of the first and second images IM1 and IM2 can be increased thereby. Also, the light that is emitted from the display device 710A, does not travel along the optical path, and becomes stray light can be prevented by the light-shielding member 760 from being reflected by the reflective polarizing element 750 and/or optical elements of the imaging optical system 120, traveling toward the display device 710A, and being re-excited and/or scattered and reflected at unexpected locations.

The position of the reflective polarizing element 750 is not limited to the position shown in FIG. 24. For example, as shown in FIG. 25, the reflective polarizing element 750 may be located between the output element 123 and the reflection unit 12. Although an example is shown in FIG. 25 in which the reflective polarizing element 750 is positioned between the output element 123 and the first image IM1, the reflective polarizing element 570 may be located between the first image IM1 and the reflection unit 12.

Also, the light-shielding member 760 may not be included in the image display device 70B. Also, according to the eleventh embodiment, the reflective polarizing element 740 may be further provided on the display device 710A of the image display device 70B. In such a case, the second polarized light 710*s* that could not be reflected by the reflective polarizing element 740 on the display device 710A can be reflected by the reflective polarizing element 750. Therefore, the luminance of the second image IM2 can be increased while increasing the ratio of the first polarized light 710*p* included in the light emitted from the image display device 70B.

Thirteenth Embodiment

A thirteenth embodiment will now be described.

Figure 26A:
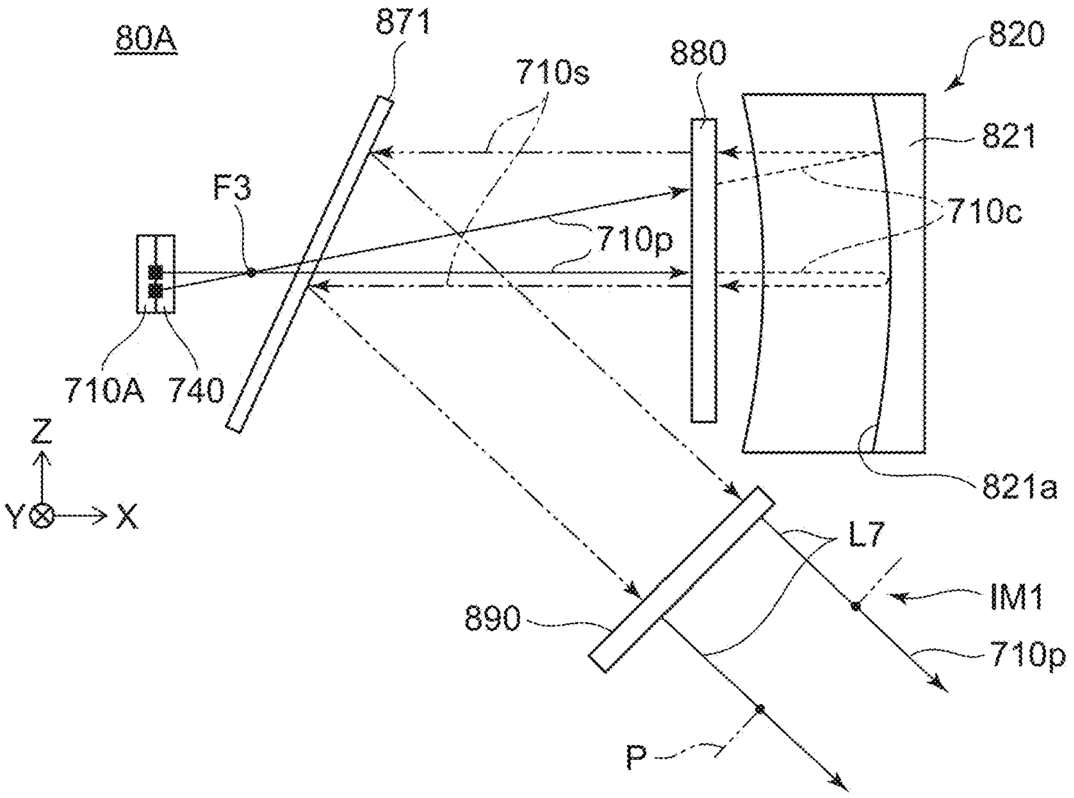
FIG. 26A is a side view showing a light source unit according to a thirteenth embodiment.

FIG. 26A is a side view showing a light source unit according to the embodiment.

The light source unit 80A according to the embodiment includes the display device 710A similar to that of the eleventh embodiment, the reflective polarizing element 740 similar to that of the eleventh embodiment, an imaging optical system 820, a reflective polarizing element 871, a first waveplate 880, and a second waveplate 890. The display device 710A, the reflective polarizing element 871, the first waveplate 880, and the imaging optical system 820 are arranged in the X-direction in this order. However, the direction in which the display device, the reflective polarizing element, the first waveplate, and the imaging optical system are arranged is not particularly limited to the X-direction.

According to the embodiment, the display device 710A is arranged so that the light-emitting surface of the display device 710A faces the +X direction. However, the orientation of the display device is not limited to such an orientation.

The reflective polarizing element 740 is located on the display device 710A. According to the embodiment, the reflective polarizing element 740 transmits the first polarized light 710*p*, which is the P-polarized light emitted from the display device 710A, and reflects the second polarized light 710*s*, which is the S-polarized light emitted from the display device 710A, toward the display device 710A.

The imaging optical system 820 is made of one mirror 821. The mirror 821 includes a concave mirror surface 821*a*. The mirror 821 reflects the light emitted from the display device 710A and forms the first image IM1 corresponding to the image displayed by the display device 710A. The mirror 821 is substantially telecentric at the first image IM1 side. In other words, multiple chief rays L7 that are emitted from mutually-different positions on the display device 710A and reach the first image IM1 cross each other at a focal point F3 between the display device 710A and the mirror 821. Also, the multiple chief rays L7 that are emitted from the mirror 821 are substantially parallel to each other.

The reflective polarizing element 871 is located between the display device 710A and the mirror 821. The reflective polarizing element 871 transmits the first polarized light 710*p* and reflects the second polarized light 710*s*. For example, the reflective polarizing element 871 can include a beam splitter. For example, the reflective polarizing element 871 has a flat plate shape. For example, the reflective polarizing element 871 is tilted in the +X direction toward the +Z direction. However, the shape and orientation of the reflective polarizing element are not limited to such a shape and orientation.

The first waveplate 880 is located between the reflective polarizing element 871 and the mirror 821. According to the embodiment, the first waveplate 880 is a quarter-wave plate. The first waveplate 880 has a flat plate shape. For example, the first waveplate 880 is arranged to be substantially orthogonal to the chief rays L7 reflected by the mirror 821. In other words, the first waveplate 880 is arranged to be substantially parallel to the YZ-plane. However, the orientation of the first waveplate is not limited to such an orientation. For example, the first waveplate may be tilted with respect to a plane orthogonal to the chief rays reflected by the mirror.

The second waveplate 890 is located at the −Z side of the first waveplate 880. According to the embodiment, the second waveplate 890 is a half-wave plate. The second waveplate 890 has a flat plate shape. For example, the second waveplate 890 is arranged to be substantially orthogonal to the chief rays L7 that are reflected by the mirror 821, transmitted by the first waveplate 880, and then reflected by the reflective polarizing element 871. Accordingly, the second waveplate 890 is arranged to be tilted in the +X direction toward the +Z direction. However, the orientation of the second waveplate is not limited to such an orientation. For example, the second waveplate may be tilted with respect to a plane orthogonal to the chief rays.

The greater part of the first polarized light 710*p* of the light emitted from the display device 710A is transmitted by the reflective polarizing element 740, and the greater part of the second polarized light 710*s* of the light emitted from the display device 710A is reflected by the reflective polarizing element 740 and returns to the display device 710A.

The greater part of the first polarized light 710*p* transmitted by the reflective polarizing element 740 is transmitted by the reflective polarizing element 871 and then incident on the first waveplate 880. The first waveplate 880 is arranged to convert the greater part of the incident first polarized light 710*p* into a circularly polarized light 710*c*. The greater part of the circularly polarized light 710*c* emitted from the first waveplate 880 is reflected by the mirror surface 821*a* of the mirror 821.

The greater part of the circularly polarized light 710*c* reflected by the mirror surface 821*a* is incident on the first waveplate 880. The first waveplate 880 converts the greater part of the incident circularly polarized light 710*c* into the second polarized light 710*s*. The greater part of the second polarized light 710*s* emitted from the first waveplate 880 is reflected by the reflective polarizing element 871 toward the formation position P of the first image IM1.

The greater part of the second polarized light 710*s* reflected by the reflective polarizing element 871 is incident on the second waveplate 890. The second waveplate 890 is arranged to convert the greater part of the incident second polarized light 710*s* into the first polarized light 710*p*.

Effects of the embodiment will now be described.

The light source unit 80A according to the embodiment includes the display device 710A configured to display an image, the mirror 821 reflecting the light emitted from the display device 710A to form the first image IM1 corresponding to the image, the reflective polarizing element 871 located between the display device 710A and the mirror 821, and the first waveplate 880 located between the reflective polarizing element 871 and the mirror 821. The reflective polarizing element 871 transmits the first polarized light 710*p* of the light emitted from the display device 710A. The first waveplate 880 converts the first polarized light 710*p* transmitted by the reflective polarizing element 871 into the circularly polarized light 710*c*. The mirror 821 reflects, toward the first waveplate 880, the circularly polarized light 710*c* emitted from the first waveplate 880. The first waveplate 880 converts the circularly polarized light 710*c* reflected by the mirror 821 into the second polarized light 710*s*. The reflective polarizing element 871 reflects, toward the formation position P of the first image IM1, the second polarized light 710*s* emitted from the first waveplate 880.

The mirror 821 is substantially telecentric at the first image IM1 side, and the light that is emitted from the display device 710A has a substantially Lambertian light distribution. Therefore, according to the embodiment as well, the light source unit 80A that is small and can display a high-quality image can be provided.

Also, the light source unit 80A can be even smaller because the first image IM1 can be formed by one mirror 821.

Also, because the light reflected by the mirror 821 is reflected toward the formation position P of the first image IM1 by the reflective polarizing element 871 located between the display device 710A and the mirror 821, the light source unit 80A can be even smaller while forming the first image IM1 at the desired formation position P.

Also, the light source unit 80A further includes the second waveplate 890 that converts the second polarized light 710*s* reflected by the reflective polarizing element 871 into the first polarized light 710*p*. Therefore, the ratio of the first polarized light 710*p* included in the light emitted from the light source unit 80A can be increased.

Also, the light source unit 80A further includes the reflective polarizing element 740 that is located on the display device 710A, transmits the first polarized light 710*p* of the light emitted from the display device 710A, and reflects, toward the display device 710A, the second polarized light 710*s* of the light emitted from the display device 710A. Therefore, the luminance of the first image IM1 can be increased while increasing the ratio of the first polarized light 710*p* included in the light emitted from the light source unit 80A.

Figure 26B:
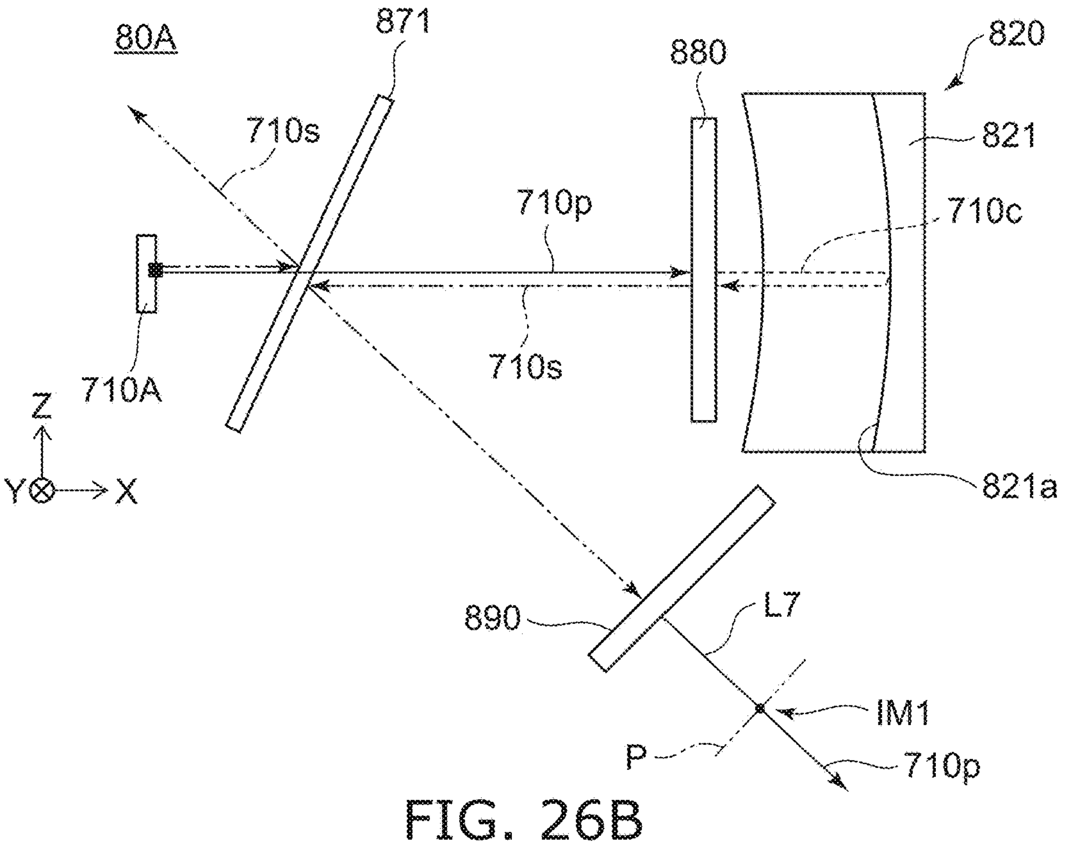
FIG. 26B is a side view showing a modification of the light source unit shown in FIG. 26A.

FIG. 26B is a side view showing a modification of the light source unit shown in FIG. 26A.

As shown in FIG. 26B, the reflective polarizing element 740 may not be provided on the light source unit 80A. In such a case, the greater part of the second polarized light 710*s* included in the light emitted from the light source unit 80A is reflected by the reflective polarizing element 871. In such a light source unit 80A as well, the light source unit 80A can be small while increasing the ratio of the first polarized light 710*p* included in the light emitted from the light source unit 80A.

Fourteenth Embodiment

A fourteenth embodiment will now be described.

Figure 27A:
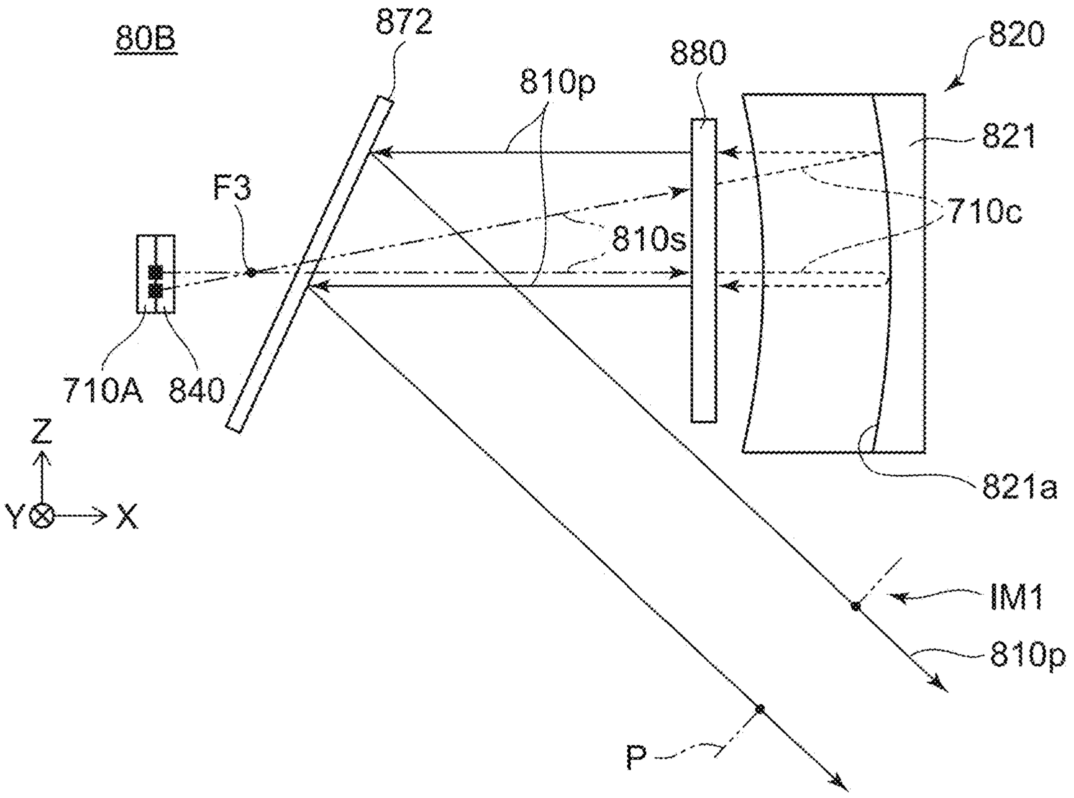
FIG. 27A is a side view showing a light source unit according to a fourteenth embodiment.

FIG. 27A is a side view showing a light source unit according to the embodiment.

The light source unit 80B according to the embodiment differs from the light source unit 80A according to the thirteenth embodiment in that a reflective polarizing element 840 is included instead of the reflective polarizing element

740, a reflective polarizing element 872 is included instead of the reflective polarizing element 871, and the second waveplate 890 is not included.

The reflective polarizing element 840 is located on the display device 710A. According to the embodiment, the reflective polarizing element 840 transmits a first polarized light 810*s*, which is the S-polarized light emitted from the display device 710A, and reflects, toward the display device 710A, a second polarized light 810*p*, which is the P-polarized light emitted from the display device 710A.

The reflective polarizing element 872 is located between the display device 710A and the mirror 821. The reflective polarizing element 872 transmits the first polarized light 810*s*, which is the S-polarized light, and reflects the second polarized light 810*p*, which is the P-polarized light. The reflective polarizing element 872 can include, for example, a beam splitter. For example, the reflective polarizing element 872 has a flat plate shape. For example, the reflective polarizing element 872 is tilted in the +X direction toward the +Z direction. However, the shape and orientation of the reflective polarizing element are not limited to such a shape and orientation.

The greater part of the first polarized light 810*s* of the light emitted from the display device 710A is transmitted by the reflective polarizing element 840, and the greater part of the second polarized light 810*p* of the light emitted from the display device 710A is reflected by the reflective polarizing element 840 and returns to the display device 710A.

The greater part of the first polarized light 810*s* transmitted by the reflective polarizing element 840 is transmitted by the reflective polarizing element 872 and incident on the first waveplate 880. The first waveplate 880 converts the greater part of the incident first polarized light 810*s* into the circularly polarized light 710*c*. The greater part of the circularly polarized light 710*c* emitted from the first waveplate 880 is reflected by the mirror surface 821*a* of the mirror 821.

The greater part of the circularly polarized light 710*c* reflected by the mirror surface 821*a* is incident on the first waveplate 880. The first waveplate 880 converts the greater part of the incident circularly polarized light 710*c* into the second polarized light 810*p*. The greater part of the second polarized light 810*p* emitted from the first waveplate 880 is reflected by the reflective polarizing element 872 toward the formation position P of the first image IM1.

Effects of the embodiment will now be described.

In the light source unit 80B according to the embodiment, the reflective polarizing element 872 transmits the first polarized light 810*s*, which is S-polarized light, and reflects the second polarized light 810*p*, which is P-polarized light. It is therefore unnecessary to include the second waveplate 890 of the thirteenth embodiment. Therefore, the light source unit 80B can be small while increasing the ratio of the P-polarized light included in the light emitted from the light source unit 80B.

Figure 27B:
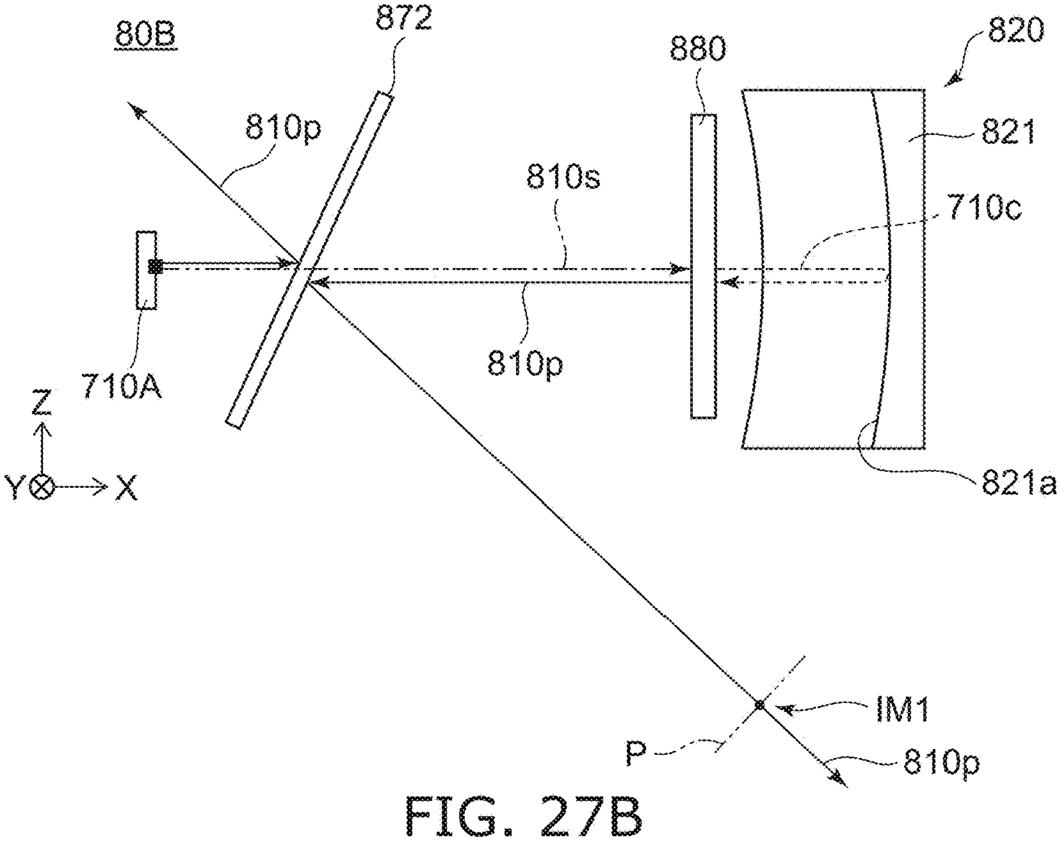
FIG. 27B is a side view showing a modification of the light source unit shown in FIG. 27A.

FIG. 27B is a side view showing a modification of the light source unit shown in FIG. 27A.

As shown in FIG. 27B, the reflective polarizing element 840 may not be included in the light source unit 80B. In such a case, the greater part of the second polarized light 810*p* included in the light emitted from the display device 710A is reflected by the reflective polarizing element 872. In such a light source unit 80B as well, the light source unit 80B can be small while increasing the ratio of the P-polarized light included in the light emitted from the light source unit 80B.

The light source units 80A and 80B described above are applicable to an image display device in combination with the reflection unit 12. Also, such an image display device is applicable to a head-up display.

Examples are described in the eleventh to fourteenth embodiments in which the ratio of the P-polarized light included in the light emitted from the light source unit or the image display device is increased. However, according to the eleventh to fourteenth embodiments described above, the ratio of the S-polarized light included in the light emitted from the light source unit or the image display device may be increased by reversing the P-polarized light and the S-polarized light. S-polarized light is easily reflected by the inner surface of the front windshield 13*a*. Therefore, for example, in an environment in which the frequency of use of the polarized sunglasses 14*b* is low, the user 14 can more easily view the second image IM2 by increasing the ratio of the S-polarized light included in the light emitted from the light source unit or the image display device.

<Modifications of Display Device>

Modifications of the display device 110 of the light source unit 11 according to the first embodiment will now be described.

Figure 28A:
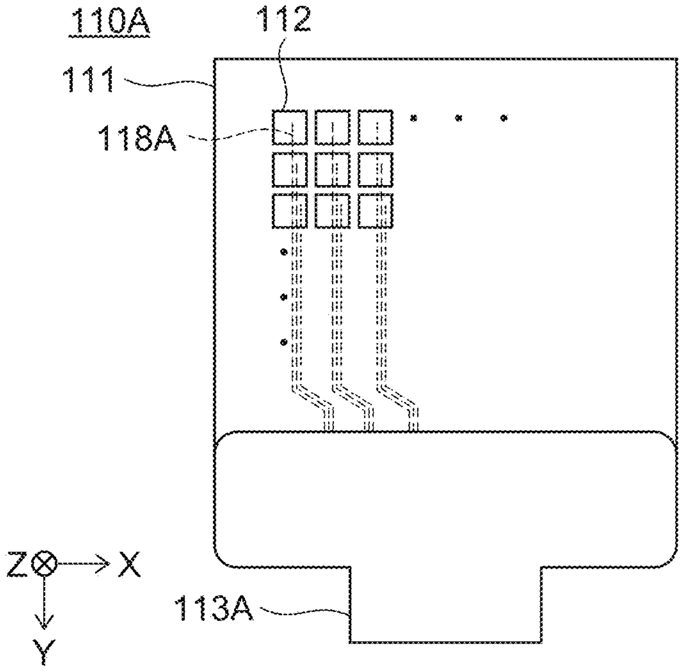
FIG. 28A is a bottom view showing a modification of the display device.

FIG. 28A is a bottom view showing a modification of the display device.

As shown in FIG. 28A, a display device 110A may not include the scanning circuit 113, the driver circuit 116, the individual circuit 118, etc., according to the first embodiment, and may include a power supply circuit 113A. Specifically, the power supply circuit 113A is, for example, an FPC (Flexible printed circuits). Multiple wiring parts 118A are provided in the substrate 111. The wiring parts 118A are electrically connected to the corresponding LED elements 112 on the substrate 111. Also, for example, the multiple wiring parts 118A extend to the end portion of the substrate 111. The power supply circuit 113A is mounted to the end portion of the substrate 111. For example, the power supply circuit 113A is electrically connected to the multiple wiring parts 118A by solder, an anisotropic conductive film, etc. The LED elements 112 may be caused to emit light by using the power supply circuit 113A to supply power to the LED elements 112. According to the first embodiment, the display device 110A is an active-matrix display device in which active elements such as transistors and the like are included in a drive circuit. In contrast, the display device 110A may be a passive-matrix display device in which active elements are not included in a drive circuit as described above.

Figure 28B:
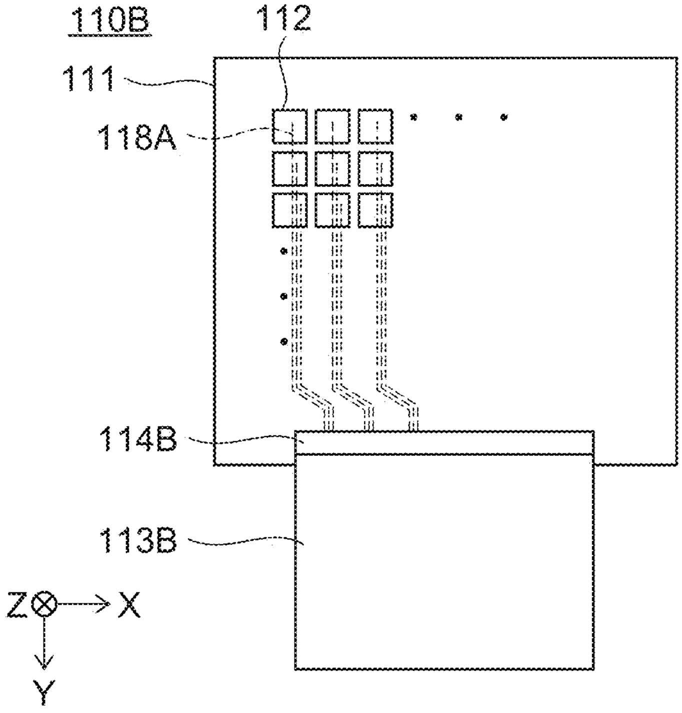
FIG. 28B is a bottom view showing a modification of the display device.

FIG. 28B is a bottom view showing a modification of the display device.

In a display device 110B as shown in FIG. 28B, a connector 114B may be connected to the end portion of the substrate 111. Also, a power supply circuit 113B may be electrically connected to the multiple wiring parts 118A via the connector 114B.

Figure 29:
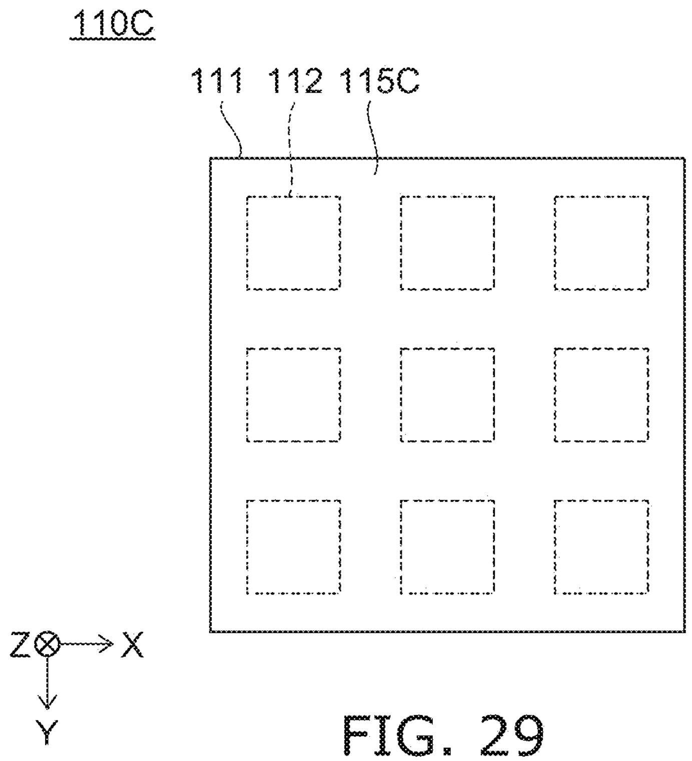
FIG. 29 is a bottom view showing a modification of the display device.

FIG. 29 is a bottom view showing a modification of the display device.

As shown in FIG. 29, a display device 110C may include one wavelength conversion member 115C, and the one wavelength conversion member 115C may be located on multiple LED elements 112. The wavelength conversion member 115C includes a wavelength conversion substance that emits light of a different light emission peak wavelength from the light emission peak wavelength of the light emitted by the LED elements 112 when the light emitted by the LED elements 112 is incident. The wavelength conversion substance can include, for example, a fluorescer, a quantum dot, etc. This is similar for other wavelength conversion members described below as well.

FIGS. 30A to 30D are drawings showing examples of cross sections of the display device shown in FIG. 29.

For easier understanding of the description in FIGS. 30A to 30D, the LED element 112 is shown as a quadrilateral, and the wiring parts on the substrate 111 are not illustrated. This is similar for the other cross-sectional views described below as well.

Figure 30A:
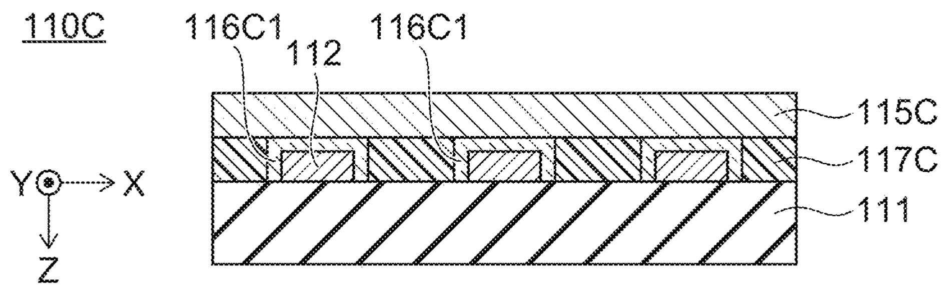
FIG. 30A is a drawing showing an example of the cross section of the display device shown in FIG. 29.

As shown in FIG. 30A, the display device 110C may include multiple light-transmitting members 116C1, and the light-transmitting members 116C1 may be located on the LED elements 112. Also, the light-emitting surface of the light-transmitting member 116C1 positioned at the side opposite to the surface facing the substrate 111 may be flat. Also, a light-shielding member 117C may be located between the adjacent light-transmitting members 116C1. Also, the wavelength conversion member 115C may be located on the multiple light-transmitting members 116C1 and the light-shielding member 117C.

The light-shielding member 117C may include a resin member and light-reflective particles located inside the resin member, and may shield by reflecting the light. Also, the light-shielding member 117C may include a resin member and light-absorbing particles located inside the resin member, and may shield by absorbing the light. The resin member can include a thermosetting resin such as a silicone resin, an epoxy resin, etc. The light-reflective particles can include silicon oxide ($SiO_2$), titanium oxide ($TiO_2$), aluminum (Al), silver (Ag), etc. Carbon particles made of carbon powder, etc., can be used as the light-absorbing particles. This is similar for other light-shielding members described below as well.

Figure 30B:
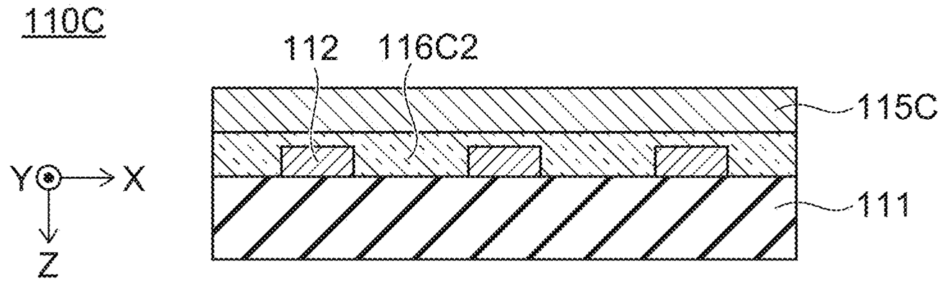
FIG. 30B is a drawing showing an example of the cross section of the display device shown in FIG. 29.

Also, as shown in FIG. 30B, the display device 110C may include one light-transmitting member 116C2, and the one light-transmitting member 116C2 may be located on multiple LED elements 112. Also, the wavelength conversion member 115C may be located on the light-transmitting member 116C2.

Figure 30C:
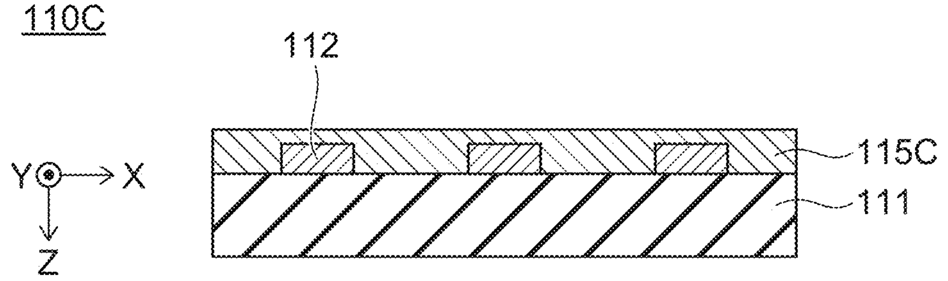
FIG. 30C is a drawing showing an example of the cross section of the display device shown in FIG. 29.
Figure 30D:
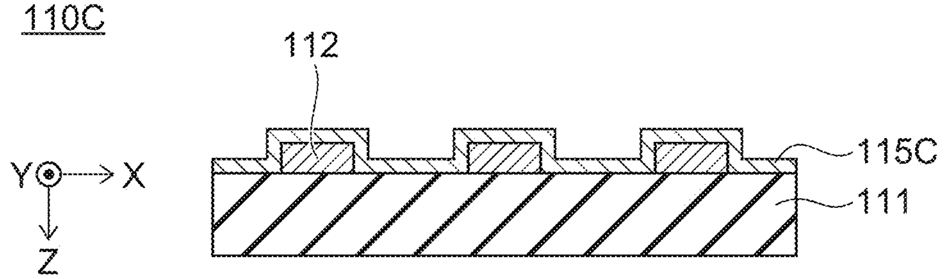
FIG. 30D is a drawing showing an example of the cross section of the display device shown in FIG. 29.

Also, as shown in FIGS. 30C and 30D, the display device 110C may not include the light-transmitting members 116C1 and 116C2, and one wavelength conversion member 115C may be located on multiple LED elements 112 to contact the multiple LED elements 112. In such a case, the light-emitting surface of the wavelength conversion member 115C positioned at the side opposite to the surface facing the substrate 111 may be flat as shown in FIG. 30C, or may include an unevenness corresponding to the multiple LED elements 112 as shown in FIG. 30D.

Figure 31:
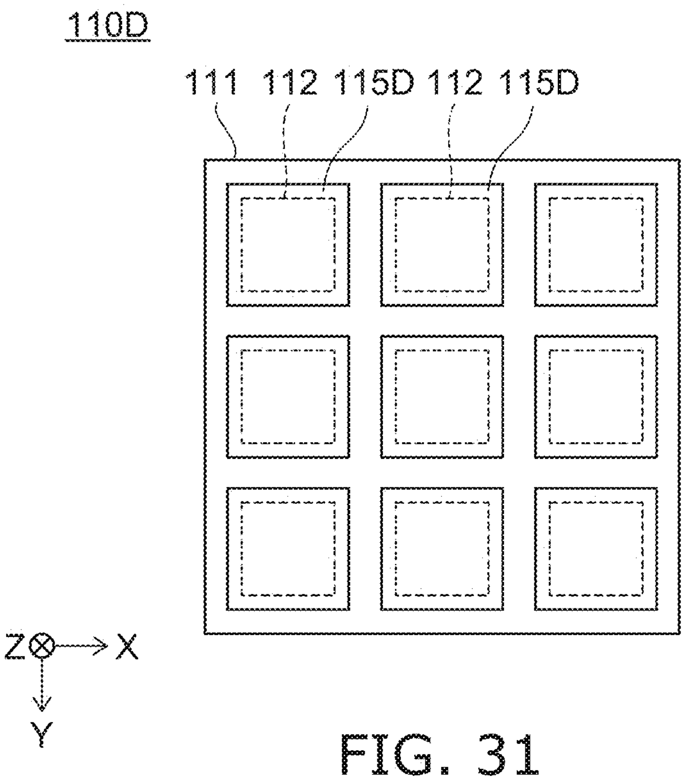
FIG. 31 is a bottom view showing a modification of the display device.

FIG. 31 is a bottom view showing a modification of the display device.

As shown in FIG. 31, a display device 110D may include multiple wavelength conversion members 115D, and the wavelength conversion members 115D may cover the LED elements 112.

Figure 32A:
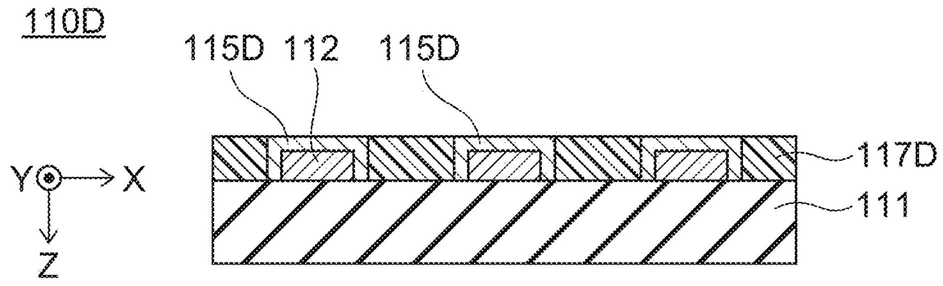
FIG. 32A is a drawing showing an example of the cross section of the display device shown in FIG. 31.
Figure 32B:
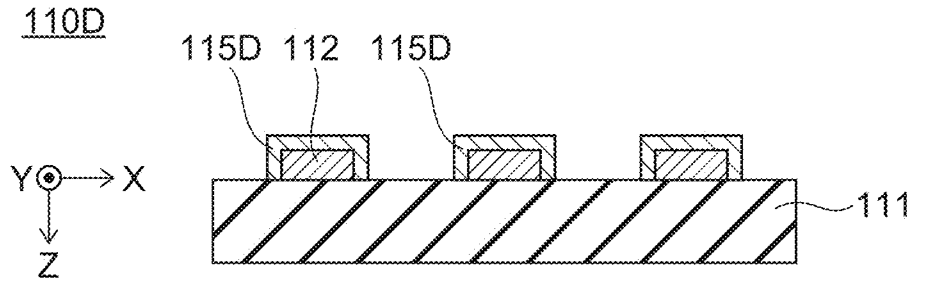
FIG. 32B is a drawing showing an example of the cross section of the display device shown in FIG. 31.
Figure 32C:
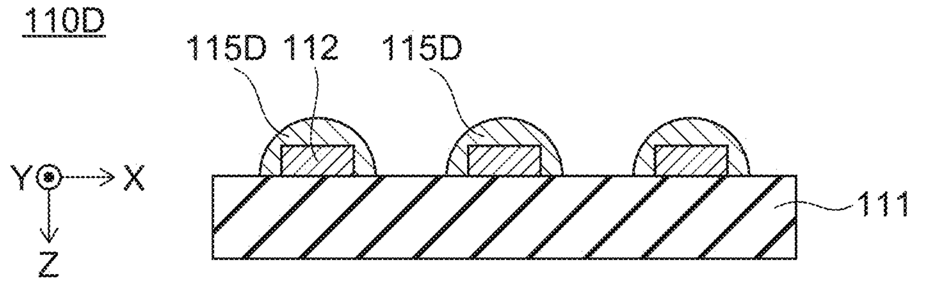
FIG. 32C is a drawing showing an example of the cross section of the display device shown in FIG. 31.

FIGS. 32A to 32C are drawings showing examples of cross sections of the display device shown in FIG. 31.

As shown in FIG. 32A, a light-shielding member 117D may be located between the adjacent wavelength conversion members 115D. Also, the light-emitting surfaces of the wavelength conversion members 115D may be flat.

Also, as shown in FIG. 32B, the light-shielding member 117D may not be provided between the adjacent wavelength conversion members 115D.

Also, as shown in FIG. 32C, the light-emitting surface of each wavelength conversion member 115D may be curved to be convex. The light distribution of the light emitted from the display device 110D can be controlled by adjusting the shape of the convex light-emitting surface. The light distribution of the light emitted from the display device 110D can be controlled not only by adjusting the shape of the convex light-emitting surface, but also by shifting the position of the light-emitting surface in the opposite direction of the direction from the LED element 112 toward the substrate 111. This is similar for the display devices 110E, 110F, and 110G shown in FIG. 33C, FIG. 35C, FIG. 35D, FIG. 36C, etc., described below.

Figure 33A:
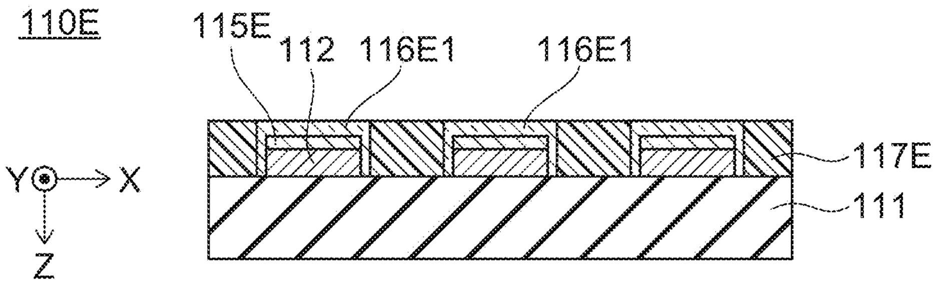
FIG. 33A is a cross-sectional view showing a modification of the display device.
Figure 33B:
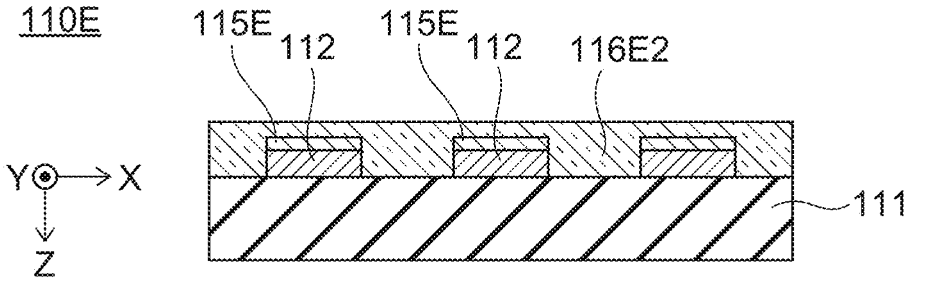
FIG. 33B is a cross-sectional view showing a modification of the display device.
Figure 33C:
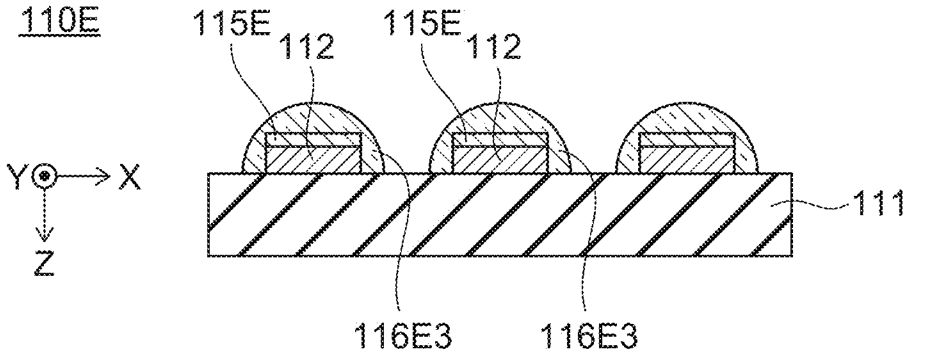
FIG. 33C is a cross-sectional view showing a modification of the display device.

FIGS. 33A to 33C are cross-sectional views showing modifications of the display device.

In a display device 110E as shown in FIG. 33A, a wavelength conversion member 115E may be located on each LED element 112, and a light-transmitting member 116E1 may be located on the LED element 112 and the wavelength conversion member 115E. Also, the light-emitting surfaces of the light-transmitting members 116E1 may be flat. Also, a light-shielding member 117E may be located between the adjacent light-transmitting members 116E1.

As shown in FIG. 33B, one light-transmitting member 116E2 may be located on the multiple LED elements 112 and the multiple wavelength conversion members 115E.

As shown in FIG. 33C, the light-emitting surface of a light-transmitting member 116E3 on each LED element 112 and wavelength conversion member 115E may be curved to be convex.

Hereinbelow, an LED element that emits blue light also is called a "blue LED element," an LED element that emits green light also is called a "green LED element," and an LED element that emits red light also is called a "red LED element." Also, a wavelength conversion substance that emits yellow light also is called a "yellow wavelength conversion substance," a wavelength conversion substance that emits green light also is called a "green wavelength conversion substance," and a wavelength conversion substance that emits red light also is called a "red wavelength conversion substance." Herein, blue light is, for example, light having a light emission peak wavelength of not less than 450 nm and not more than 495 nm. Yellow light is, for example, light having a light emission peak wavelength of not less than 570 nm and not more than 620 nm. Green light is, for example, light having a light emission peak wavelength of not less than 495 nm and not more than 570 nm. Red light is, for example, light having a light emission peak wavelength of not less than 620 nm and not more than 750 nm. Yellow light also can be obtained by mixed light of green light and red light.

According to the modifications described with reference to FIGS. 29 to 33C, the LED element may be a blue LED element, and the wavelength conversion member may include a yellow wavelength conversion substance. Also, the LED element may be a blue LED element, and the wavelength conversion member may include a green wavelength conversion substance and a red wavelength conversion substance. Also, a wavelength conversion member that includes a green wavelength conversion substance and a wavelength conversion member that includes a red wavelength conversion substance may be located on a blue LED element. The LED element can be, for example, a violet light LED element or near-ultraviolet light LED element having a wavelength of about 410 nm, and the wavelength conversion substance can be a blue wavelength conversion substance, a yellow wavelength conversion substance, a green wavelength conversion substance, a red wavelength conversion substance, etc.

Also, the LED element may include a semiconductor stacked body in which a first n-type semiconductor layer, a first active layer, a first p-type semiconductor layer, a second n-type semiconductor layer, a second active layer, and a second p-type semiconductor layer are stacked, and the light emission peak wavelength of the light emitted by the first active layer and the light emission peak wavelength of the light emitted by the second active layer may be different. Hereinbelow, such an LED element is called a two-color LED element. The LED element may be a two-color LED element of blue light and green light, and the wavelength conversion member may include a red wavelength conversion substance.

Also, a blue LED element and a green LED element may be located in one pixel, and a wavelength conversion member that includes a red wavelength conversion substance may be located on the blue LED element and the green LED element. Similarly, a blue LED element and a red LED element may be located in one pixel, and a wavelength conversion member that includes a green wavelength conversion substance may be located on the blue LED element.

The wavelength conversion member may include a light-transmitting resin member, and a wavelength conversion substance located inside the resin member. Also, the wavelength conversion member may be a sintered body of a wavelength conversion substance. Also, the wavelength conversion member may have a sheet-like shape, layer shape, or plate shape.

The wavelength conversion substance can include an yttrium-aluminum-garnet-based fluorescer (e.g., $Y_3(Al, Ga)_5O_{12}$:Ce), a lutetium-aluminum-garnet-based fluorescer (e.g., $Lu_3(Al, Ga)_5O_{12}$:Ce), a terbium-aluminum-garnet-based fluorescer (e.g., $Tb_3(Al, Ga)_5O_{12}$:Ce), a CCA-based fluorescer (e.g., $Ca_{10}(PO_4)_6Cl_2$:Eu), an SAE-based fluorescer (e.g., $Sr_4Al_{14}O_{25}$:Eu), a chlorosilicate-based fluorescer (e.g., $Ca_8MgSi_4O_{16}Cl_2$:Eu), an oxynitride-based fluorescer such as a β-sialon-based fluorescer (e.g., $(Si, Al)_3(O, N)_4$:Eu), an α-sialon-based fluorescer (e.g., $Ca(Si, Al)_{12}(O, N)_{16}$:Eu), or the like, a nitride-based fluorescer such as an SLA-based fluorescer (e.g., $SrLiAl_3N_4$:Eu), a CASN-based fluorescer (e.g., $CaAlSiN_3$:Eu), a SCASN-based fluorescer (e.g., $(Sr, Ca)AlSiN_3$:Eu), or the like, a fluoride-based fluorescer such as a KSF-based fluorescer (e.g., $K_2SiF_6$:Mn), a KSAF-based fluorescer (e.g., $K_2Si_{0.99}Al_{0.01}F_{5.99}$:Mn), a MGF-based fluorescer (e.g., $3.5\ MgO\cdot 0.5\ MgF_2\cdot GeO_2$:Mn), or the like, a fluorescer having a perovskite structure (e.g., $CsPb(F, Cl, Br, I)_3$), a quantum dot fluorescer (e.g., CdSe, InP, $AgInS_2$, or $AgInSe_2$), etc.

White light can be emitted from each pixel by combining any of the LED elements and wavelength conversion members described above. However, the color of the light emitted from each pixel is not limited to white.

Figure 34A:
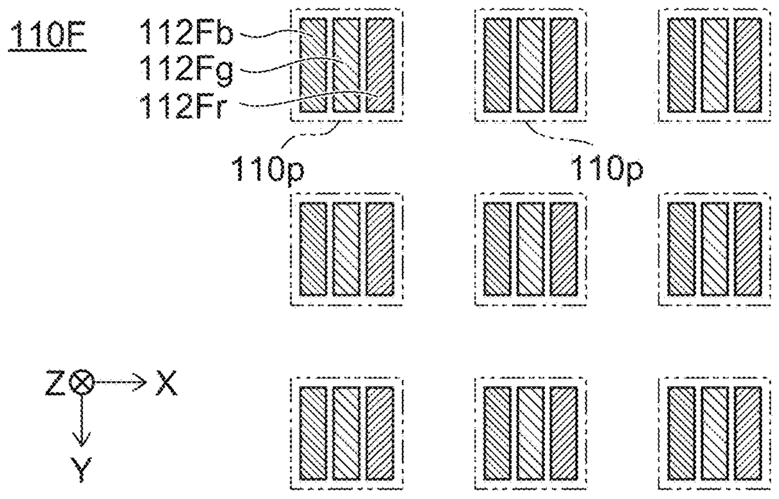
FIG. 34A is a bottom view showing a modification of the display device.
Figure 34B:
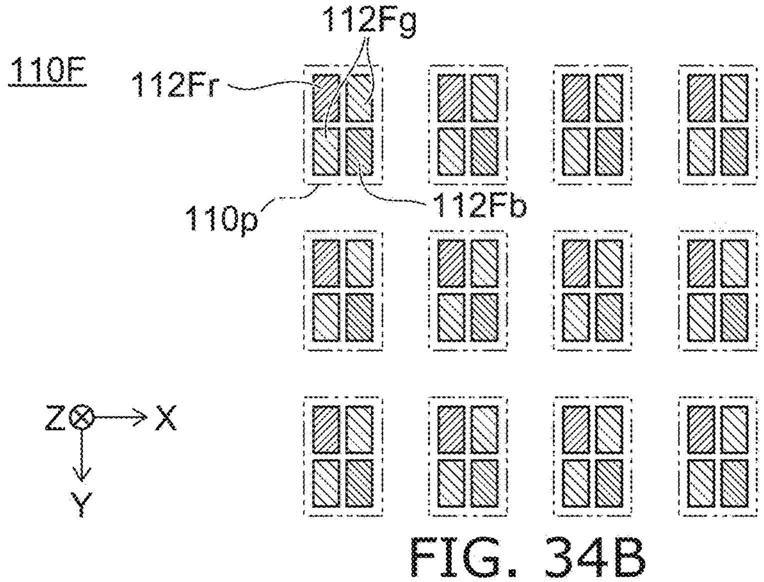
FIG. 34B is a bottom view showing a modification of the display device.
Figure 34C:
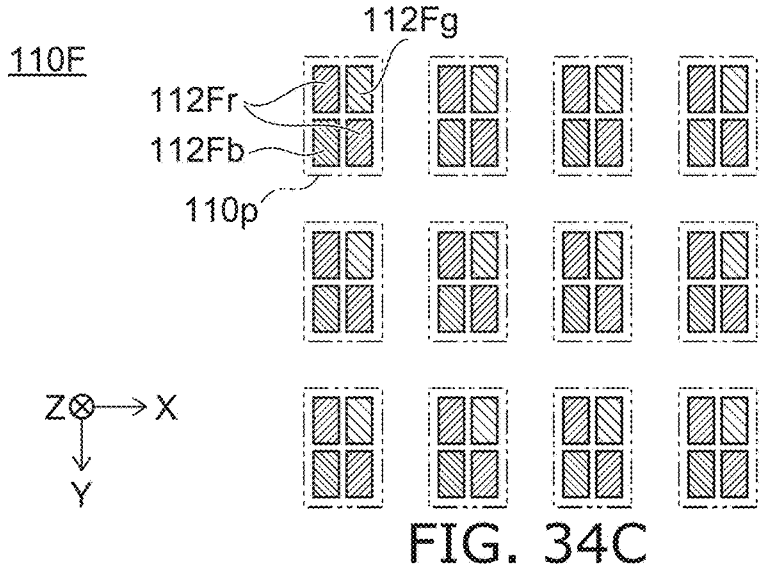
FIG. 34C is a bottom view showing a modification of the display device.

FIGS. 34A to 34C are bottom views showing modifications of the display device.

In FIGS. 34A to 34C, a blue LED element 112Fb and a green LED element 112Fg are illustrated by mutually-different hatching for easier understanding of the description.

As shown in FIG. 34A, one blue LED element 112Fb, one green LED element 112Fg, and one red LED element 112Fr may be located in each pixel 110*p* of the display device 110F. For example, one blue LED element 112Fb, one green LED element 112Fg, and one red LED element 112Fr may be arranged in one direction inside each pixel 110*p*.

Also, as shown in FIG. 34B, one blue LED element 112Fb, two green LED elements 112Fg, and one red LED element 112Fr may be located in each pixel 110*p* of the display device 110F. One blue LED element 112Fb, two green LED elements 112Fg, and one red LED element 112Fr may be arranged in a matrix of two rows and two columns inside one pixel 110*p*.

Also, as shown in FIG. 34C, one blue LED element 112Fb, one green LED element 112Fg, and two red LED elements 112Fr may be located in each pixel 110*p* of the display device 110F. One blue LED element 112Fb, one green LED element 112Fg, and two red LED elements 112Fr may be arranged in a matrix of two rows and two columns inside each pixel 110*p*.

FIGS. 35A to 35D are drawings showing examples of cross sections of the display device shown in FIG. 34A.

Figure 35A:
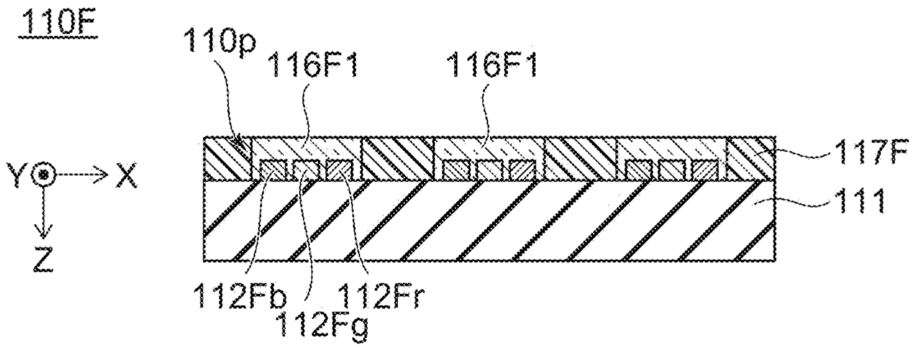
FIG. 35A is a drawing showing an example of the cross section of the display device shown in FIG. 34A.

As shown in FIG. 35A, light-transmitting members 116F1 may be provided individually for the multiple pixels 110*p*, and each light-transmitting member 116F1 may be located on the multiple LED elements 112Fb, 112Fg, and 112Fr of the corresponding pixel 110*p*. The light-emitting surfaces of the light-transmitting members 116F1 may be flat. Also, a light-shielding member 117F may be located between the adjacent light-transmitting members 116F1.

Figure 35B:
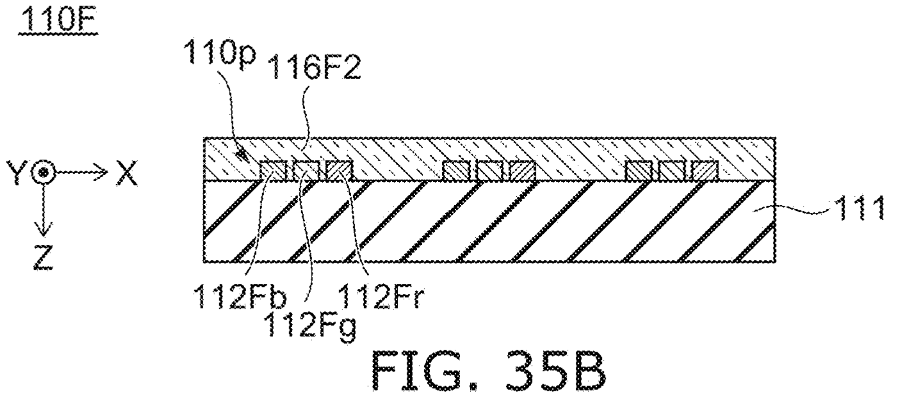
FIG. 35B is a drawing showing an example of the cross section of the display device shown in FIG. 34A.

As shown in FIG. 35B, one light-transmitting member 116F2 may be arranged to straddle multiple pixels 110*p*.

Figure 35C:
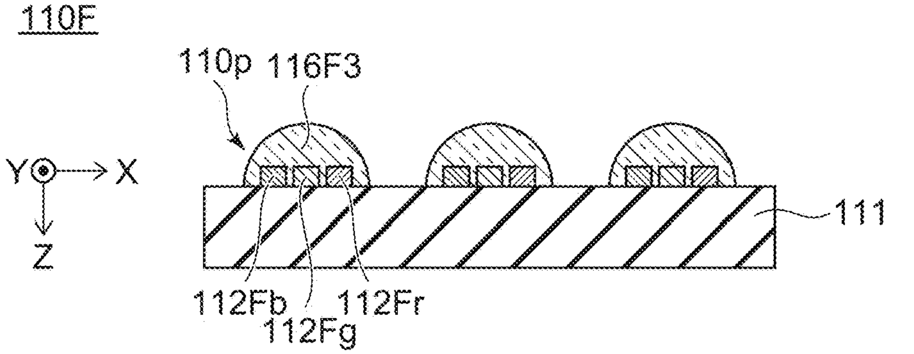
FIG. 35C is a drawing showing an example of the cross section of the display device shown in FIG. 34A.

As shown in FIG. 35C, the light-emitting surface of a light-transmitting member 116F3 located in each pixel 110*p* may be curved to be convex.

Figure 35D:
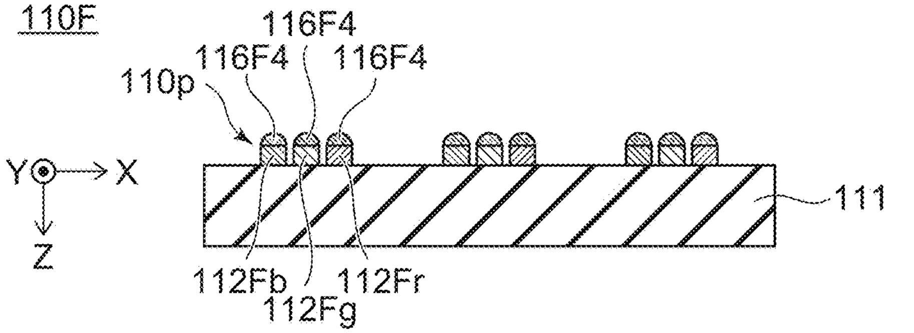
FIG. 35D is a drawing showing an example of the cross section of the display device shown in FIG. 34A.

As shown in FIG. 35D, multiple light-transmitting members 116F4 may be located inside each pixel 110*p*, and the light-transmitting members 116F4 may be located respectively on the LED elements 112Fb, 112Fg, and 112Fr.

Figure 36A:
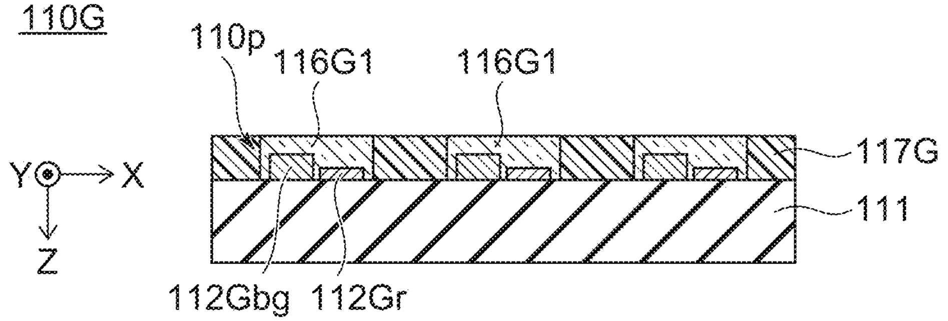
FIG. 36A is a cross-sectional view showing a modification of the display device.
Figure 36B:
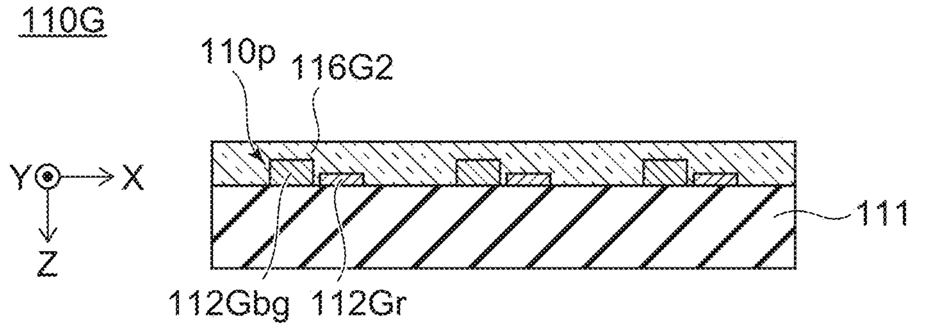
FIG. 36B is a cross-sectional view showing a modification of the display device.
Figure 36C:
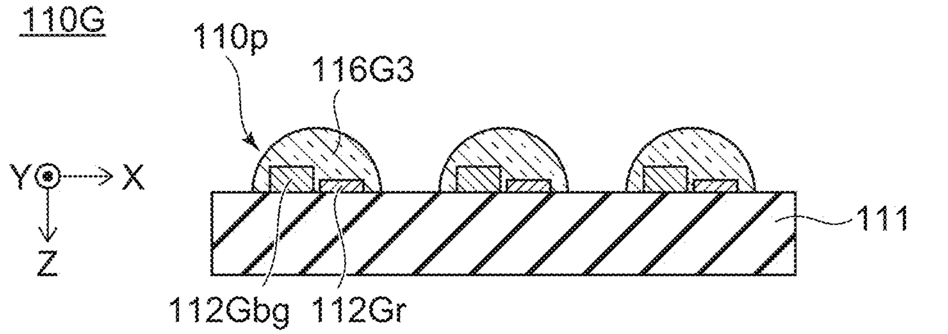
FIG. 36C is a cross-sectional view showing a modification of the display device.

FIGS. 36A to 36C are cross-sectional views showing modifications of the display device.

As shown in FIG. 36A, a two-color LED element 112Gbg of blue and green and a red LED element 112Gr may be located inside one pixel 110*p*. Also, the light-transmitting members 116G1 may be individually provided in the multiple pixels 110*p*, and each light-transmitting member 116G1 may be located on the two-color LED element 112Gbg and the red LED element 112Gr inside the corresponding pixel 110*p*. Also, the light-emitting surfaces of the light-transmitting members 116G1 may be flat. Also, a light-shielding member 117G may be located between the adjacent light-transmitting members 116G1.

As shown in FIG. 36B, one light-transmitting member 116G2 may be arranged to straddle multiple pixels 110*p*.

As shown in FIG. 36C, the light-emitting surface of a light-transmitting member 116G3 located in each pixel 110*p* may be a convex curved surface.

The display device 110F can display a color image by any of the configurations described above. The number of blue LED elements and the number and arrangement of green LED elements, red LED elements, and/or two-color LED elements located in one pixel are not limited to those described above. Also, the areas of the light-emitting surfaces of the different types of LED elements may be the same, and the areas of the light-emitting surfaces of two or more types of LED elements may be different from each other.

Figure 37A:
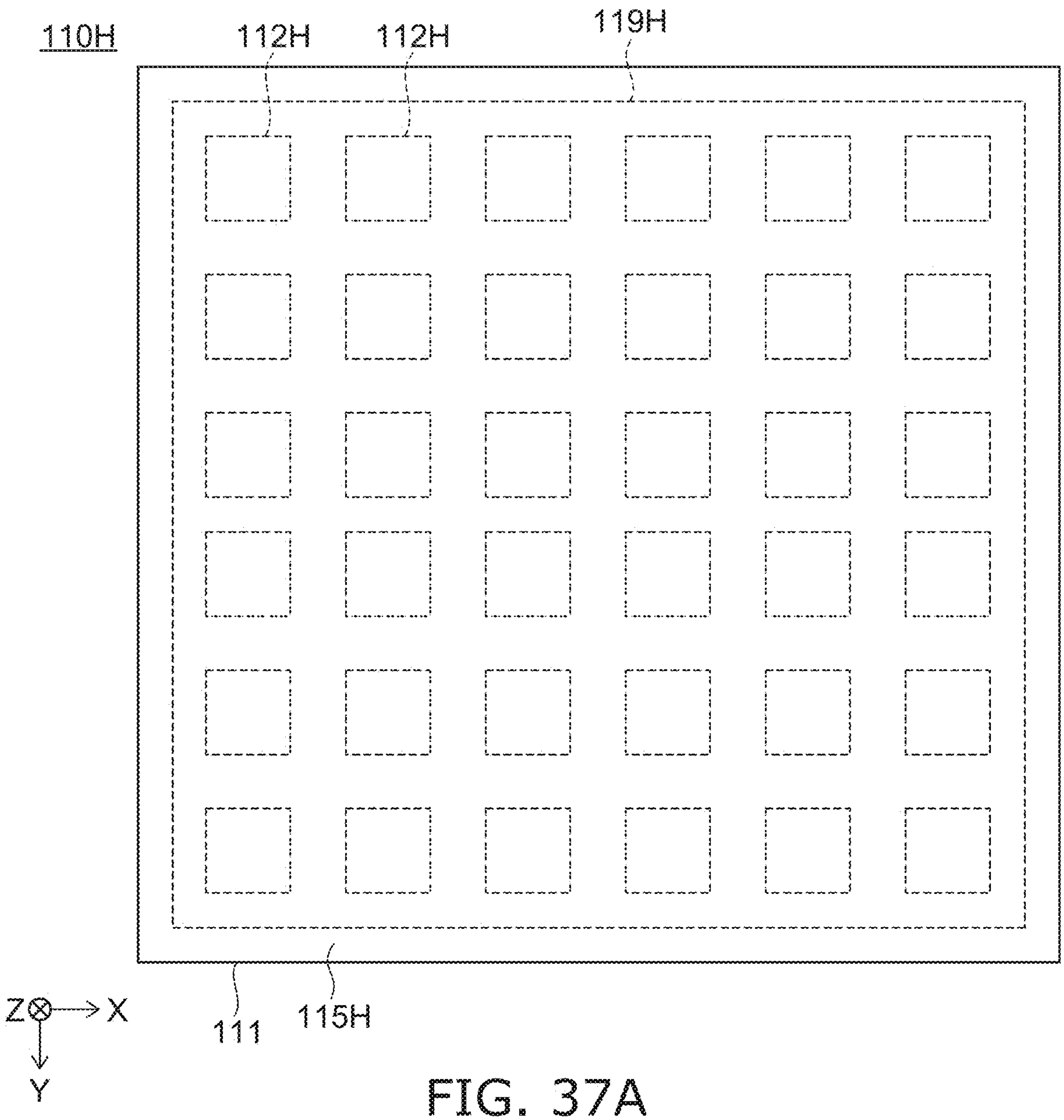
FIG. 37A is a bottom view showing a modification of the display device.

FIG. 37A is a bottom view showing a modification of the display device.

Figure 37B:
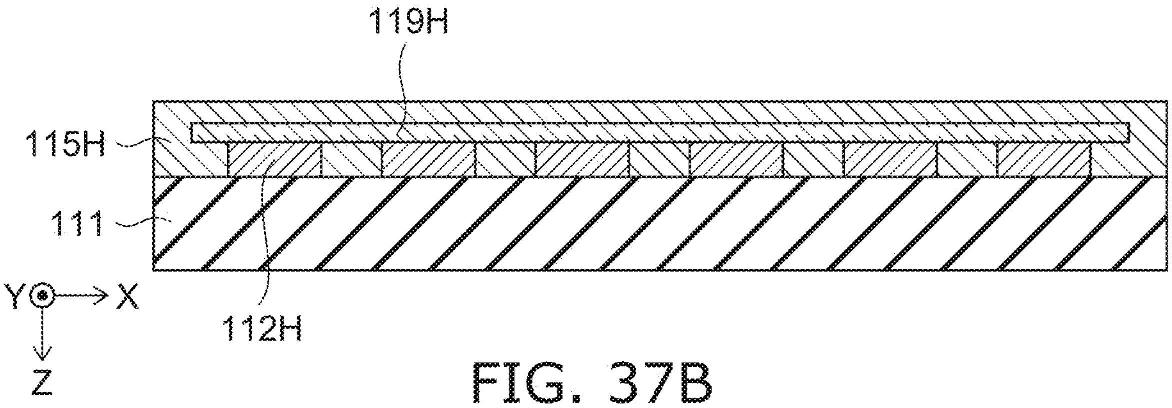
FIG. 37B is a cross-sectional view of the display device shown in FIG. 37A.

FIG. 37B is a cross-sectional view of the display device shown in FIG. 37A.

In the display device 110H, the multiple LED elements 112H may be formed on one growth substrate 119H. The growth substrate 119H is, for example, a light-transmitting sapphire substrate. Also, a wavelength conversion member 115H may be located around the LED element 112H and/or on the growth substrate 119H.

Figure 38A:
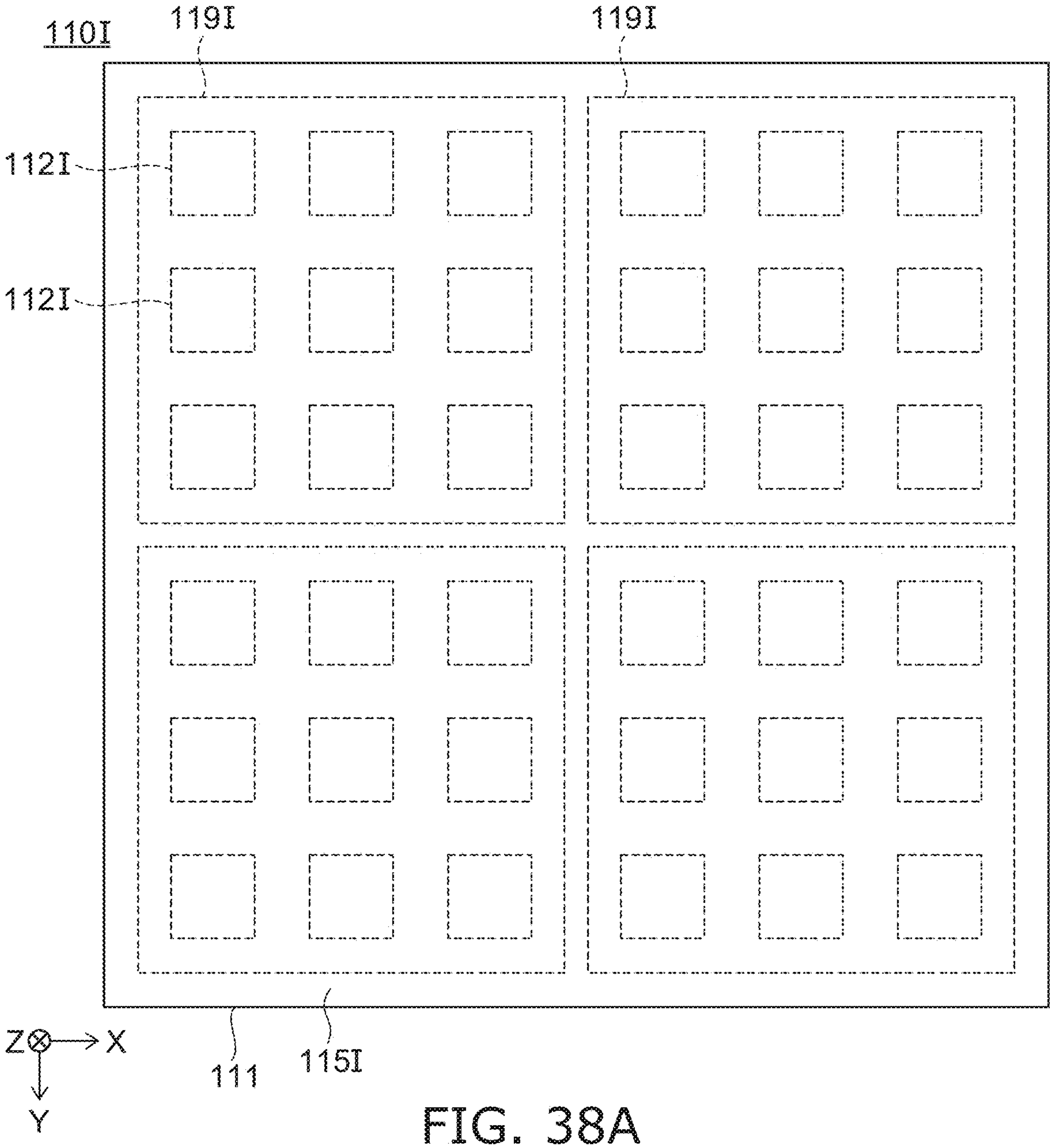
FIG. 38A is a bottom view showing a modification of the display device.

FIG. 38A is a bottom view showing a modification of the display device.

Figure 38B:
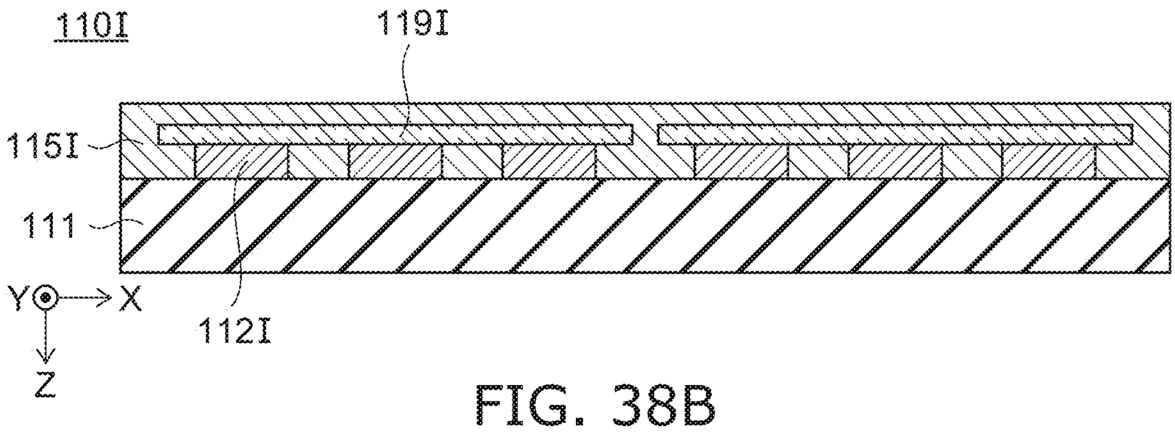
FIG. 38B is a cross-sectional view of the display device shown in FIG. 38A.

FIG. 38B is a cross-sectional view of the display device shown in FIG. 38A.

The display device 110I may include multiple growth substrates 119I, and the multiple LED elements 112I may be formed on each growth substrate 119I. Also, a wavelength conversion member 115I may be located around the LED element 112I and/or on the multiple growth substrates 119I.

Figure 39:
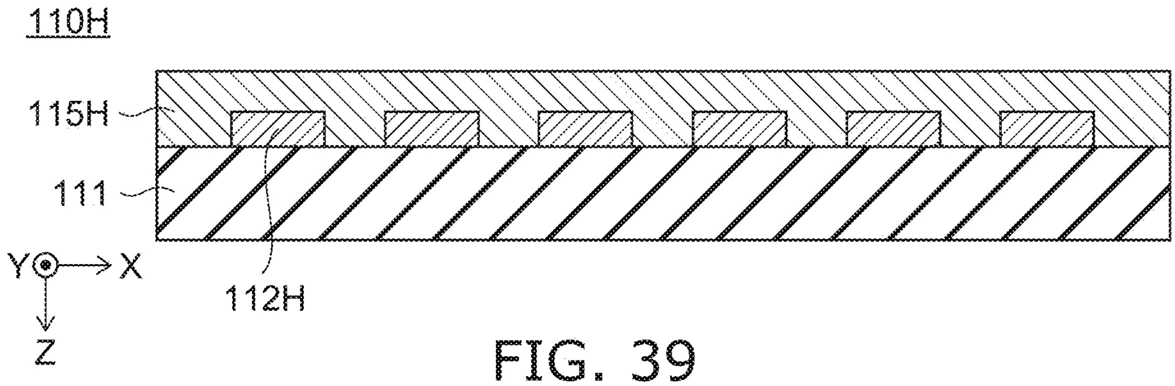
FIG. 39 is a cross-sectional view showing a modification of the display device.

FIG. 39 is a cross-sectional view showing a modification of the display device.

As shown in FIG. 39, the growth substrate 119H may be removed from the multiple LED elements 112H after the multiple LED elements 112H are formed in the manufacturing process of the display device 110H shown in FIG. 37. Then, the wavelength conversion member 115H may be formed. Similarly, the multiple growth substrates 119I may be removed from the LED elements 112I in the manufacturing process the display device 110I shown in FIGS. 38A and 38B.

Fifteenth Embodiment

A fifteenth embodiment will now be described.

Figure 40:
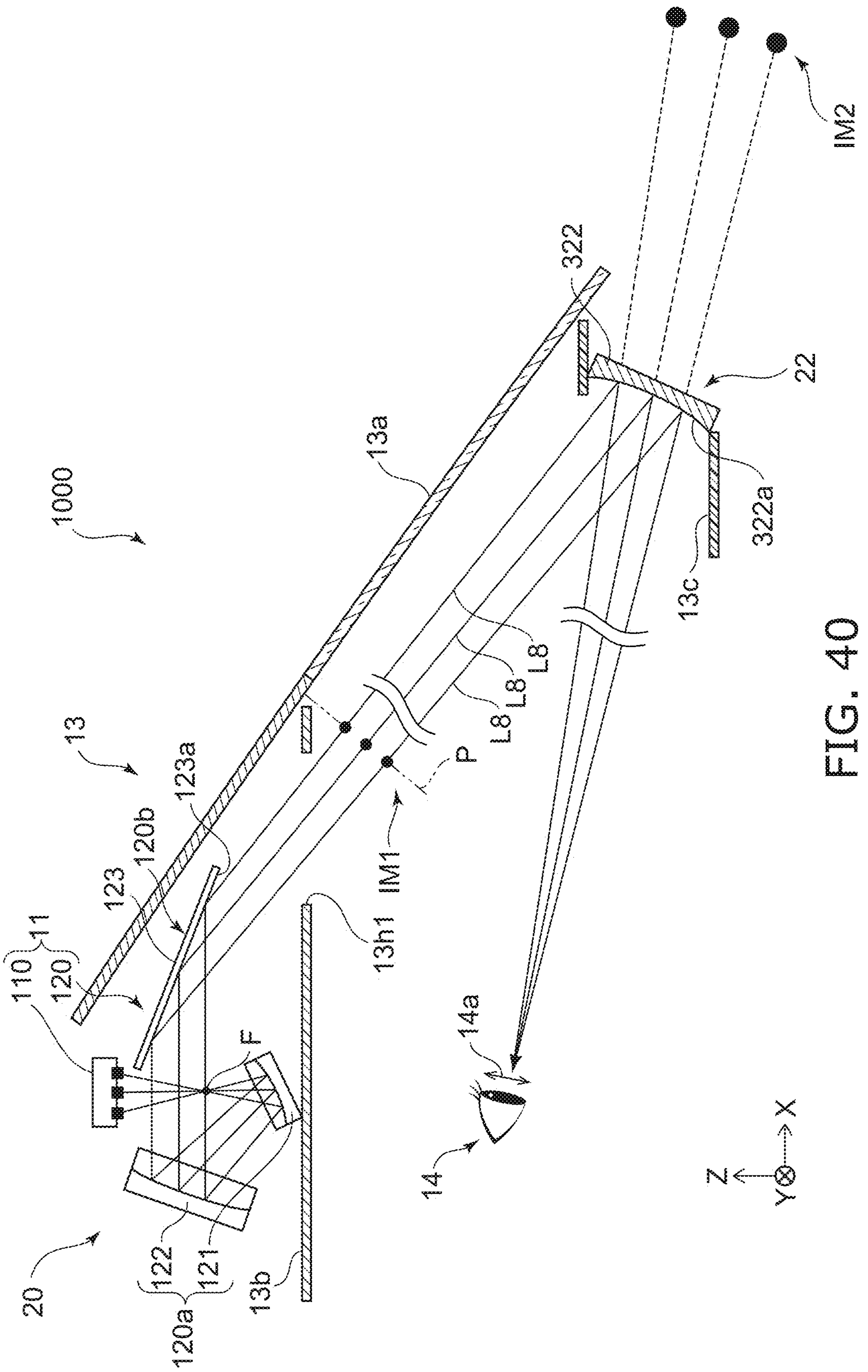
FIG. 40 is a cross-sectional view showing an image display device according to a fifteenth embodiment.

FIG. 40 is a cross-sectional view showing an image display device according to the embodiment.

Figure 41:
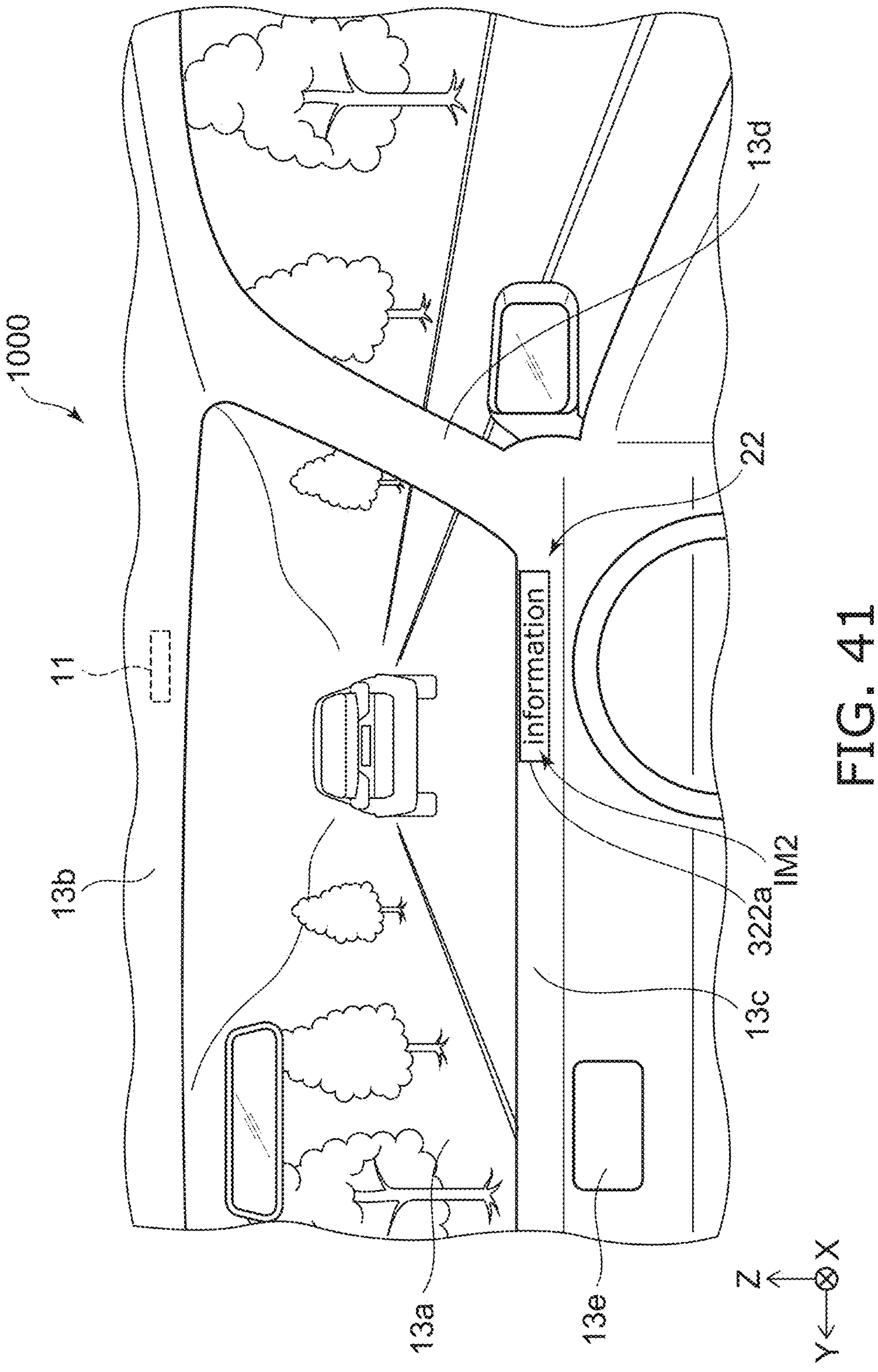
FIG. 41 is a schematic view showing a scenery when viewed by a user in a driver's seat.

FIG. 41 is a schematic view showing a scenery when viewed by a user in a driver's seat.

The automobile 1000 includes the vehicle 13, and an image display device 20 fixed to the vehicle 13. The image display device 20 includes the light source unit 11 and a reflection unit 22. The image display device 20 according to the embodiment differs from the image display device 10 according to the first embodiment in that a mirror surface 322*a* of a mirror 322 of the reflection unit 22 also is used as a reflecting surface causing the user 14 to view the second image IM2.

The configuration of the light source unit 11 of the image display device 20 is similar to that of the first embodiment. The light source unit 11 is located at the ceiling part 13*b* of the vehicle 13. The reflection unit 22 is located at the dashboard part 13*c* of the vehicle 13. The reflection unit 22 includes the mirror 322. The mirror surface 322*a* of the mirror 322 is, for example, a concave surface. The mirror surface 322*a* is arranged at a position and angle facing the eyebox 14*a* of the user 14 when the user 14 is in the driver's seat of the vehicle 13. For example, the mirror surface 322*a* faces a direction between the −X direction (the back side of the vehicle) and the +Z direction (the upper side of the vehicle). The angle of the mirror surface 322*a* can be finely adjusted according to the position of the eyebox 14*a* of the user 14.

An operation of the embodiment will now be described.

Chief rays L8 that are emitted from the light source unit 11 travel in a direction between the +X direction (the front side of the vehicle) and the −Z direction (the lower side of the vehicle), are reflected by the mirror surface 322*a* of the mirror 322 of the reflection unit 22, travel in a direction between the −X direction (the back side of the vehicle) and the +Z direction (the upper side of the vehicle), and enter the eyebox 14*a* of the user 14. The path of the chief rays L8 from the light source unit 11 toward the reflection unit 12 is positioned inward of the front windshield 13*a* of the vehicle 13 and is substantially along the front windshield 13*a*. The chief rays L8 form the first image IM1 at a position P between the light source unit 11 and the reflection unit 22.

As a result, as shown in FIGS. 40 and 41, the user 14 can view the second image IM2, which is a virtual image, depthward of the mirror surface 322*a* of the dashboard part 13*c*. The second image IM2 is formed distant to, e.g., 3 m in front of, the mirror surface 322*a*. Therefore, the user 14 can view the second image IM2 without greatly moving the focal length of the eyes from the state of viewing the distant scenery via the front windshield 13*a*. Although the character string "information" is shown as the second image IM2 in FIG. 41, the second image IM2 is not limited to a character string and may be a figure, etc.

Effects of the embodiment will now be described.

Similarly to the first embodiment, the image display device 20 according to the embodiment is divided into the two units of the light source unit 11 and the reflection unit 22 fixed at separate positions in the vehicle 13. Although the image display device 20 requires a long optical path length to form the second image IM2 at a position several meters frontward, by separating the light source unit 11 and the reflection unit 22, a portion of the optical path length can be formed by utilizing the internal space of the vehicle 13. As a result, it is unnecessary to form the necessary optical path length entirely inside the image display device 20, and the image display device 20 can be smaller.

Also, in the image display device 20, the reflection unit 22 includes only the mirror 322. The configuration of the reflection unit 22 can be simplified thereby, and the reflection unit 22 can be smaller. Otherwise, the configuration, operations, and effects according to the embodiment are similar to those of the first embodiment.

The mirror 322 of the reflection unit 22 may include a half mirror or a transparent plate. In such a case as well, the user 14 can be prevented from undesirably viewing the interior of the dashboard part 13*c* by making the interior of the dashboard part 13*c* dark. Or, the mirror surface 322*a* of the mirror 322 may be black enough to sufficiently reflect the chief rays L8 emitted from the light source unit 11. As a result, degradation of the visibility due to external light or the like reflected by the mirror surface 322*a* of the mirror 322 can be suppressed. Also, the mirror 322 may be arranged to be continuous with the surface of the dashboard part 13*c*. As a result, it is unnecessary to make a hole in the dashboard part 13*c*, and the designability of the interior of the automobile 1000 is improved.

Also, instead of the mirror surface 322*a* located at the dashboard part 13*c*, the front windshield 13*a* or a combiner may be used as the reflecting surface causing the user 14 to view the second image IM2. However, by using the mirror surface 322*a* located at the dashboard part 13*c* as the reflecting surface, the user 14 can reliably view the second image IM2 without being affected by the background of the reflecting surface.

Sixteenth Embodiment

A sixteenth embodiment will now be described.

Figure 42:
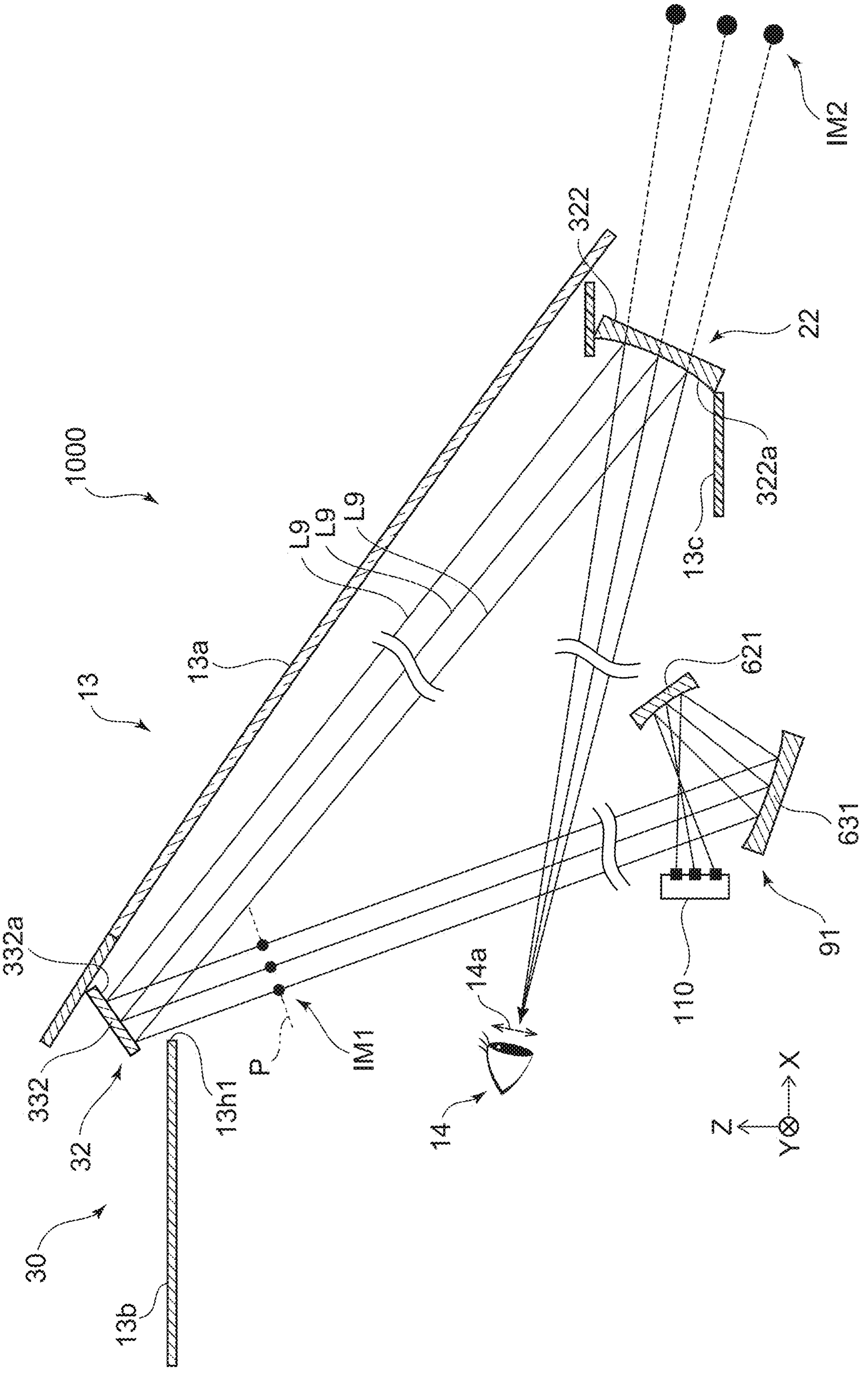
FIG. 42 is a cross-sectional view showing an image display device according to a sixteenth embodiment.

FIG. 42 is a cross-sectional view showing an image display device according to the embodiment.

The image display device 30 according to the embodiment differs from the image display device 10 according to the first embodiment in that three units located at different positions in the vehicle 13 are included. Namely, the image display device 30 includes a light source unit 91, an optical path modifying unit 32, and the reflection unit 22.

For example, the light source unit 91 is located inside an A-pillar 13*d* or at the backside of a car navigation device 13*e* of the vehicle 13 shown in FIG. 41. For example, the optical path modifying unit 32 is located at the ceiling part 13*b* of the vehicle 13. For example, the reflection unit 22 is located at the dashboard part 13*c* of the vehicle 13.

The light source unit 91 includes the display device 110, an input element 621, and an output element 631. The configuration of the display device 110 is as described in the first embodiment. The input element 621 and the output element 631 are, for example, concave mirrors.

The optical path modifying unit 32 includes a mirror 332. The mirror 332 may be a plane mirror, may be a concave mirror, or may be a convex mirror. The type of mirror used as the mirror 332 is set according to how the optical path of the image display device 30 is set inside the vehicle 13. The configuration of the reflection unit 22 is similar to that of the reflection unit 22 of the fifteenth embodiment.

As shown in FIG. 41, it is assumed that the driver's seat is located at the right side of the vehicle 13, the user 14 sits in the driver's seat, the eyebox 14*a* faces substantially the +X direction (the front of the vehicle), and the light source unit 91 is located inside the A-pillar 13*d*. In such a case, a mirror surface 332*a* of the mirror 332 faces a direction between the +X direction (the front side of the vehicle), the −Z direction (the lower side of the vehicle), and the −Y direction (the right side of the vehicle). When the driver's seat is located at the right side of the vehicle 13, and the light source unit 91 is located at the backside of the car navigation device 13*e*, the mirror surface 332*a* of the mirror 332 faces a direction between the +X direction (the front side of the vehicle), the −Z direction (the lower side of the vehicle), and the +Y direction (the left side of the vehicle).

An operation of the embodiment will now be described.

In the following description, it is taken that the driver's seat is located at the right side of the vehicle 13, and the light source unit 91 is located inside the A-pillar 13*d*.

Chief rays L9 that are emitted from the light source unit 91 travel in the −X direction (the back side of the vehicle), the +Z direction (the upper side of the vehicle) and the +Y direction (the left side of the vehicle), form the first image IM1 at the position P between the light source unit 91 and the optical path modifying unit 32, and reach the mirror 332 of the optical path modifying unit 32.

The chief rays L9 that are incident on the mirror 332 are reflected by the mirror surface 332*a*, travel in a direction between the +X direction (the front side of the vehicle) and the −Z direction (the lower side of the vehicle), are reflected by the mirror surface 322*a* of the mirror 322 of the reflection unit 22, travel in a direction between the −X direction (the back side of the vehicle) and the +Z direction (the upper side of the vehicle), and enter the eyebox 14*a* of the user 14. The path of the chief rays L9 from the optical path modifying unit 32 toward the reflection unit 12 is positioned inward of the front windshield 13*a* of the vehicle 13 and is substantially along the front windshield 13*a*.

As a result, the user 14 can view the second image IM2 depthward of the mirror surface 322*a* of the dashboard part 13*c*. The appearance of the second image IM2 is similar to that of the fifteenth embodiment.

Effects of the embodiment will now be described.

The image display device 30 according to the embodiment is subdivided into the three units of the light source unit 91, the optical path modifying unit 32, and the reflection unit 22; therefore, each unit can be smaller. As a result, the arrangement of the image display device 30 in the vehicle 13 is even easier.

In particular, the volume of the optical path modifying unit 32 located at the ceiling part 13*b* can be greatly reduced because the optical path modifying unit 32 can include mainly the mirror 332. The mirror 332 may be a portion of the ceiling board of the ceiling part 13*b*. Also, the volume of the reflection unit 22 located at the dashboard part 13*c* can be greatly reduced because the reflection unit 22 also can include mainly the mirror 322. Furthermore, because the light source unit 91 that has a relatively large volume can be located inside the A-pillar 13*d* or at the backside of the car navigation device 13*e* in the vehicle 13, the dead space of the vehicle 13 can be effectively utilized. Otherwise, the configuration, operations, and effects according to the embodiment are similar to those of the first embodiment.

Seventeenth Embodiment

A seventeenth embodiment will now be described.

Figure 43:
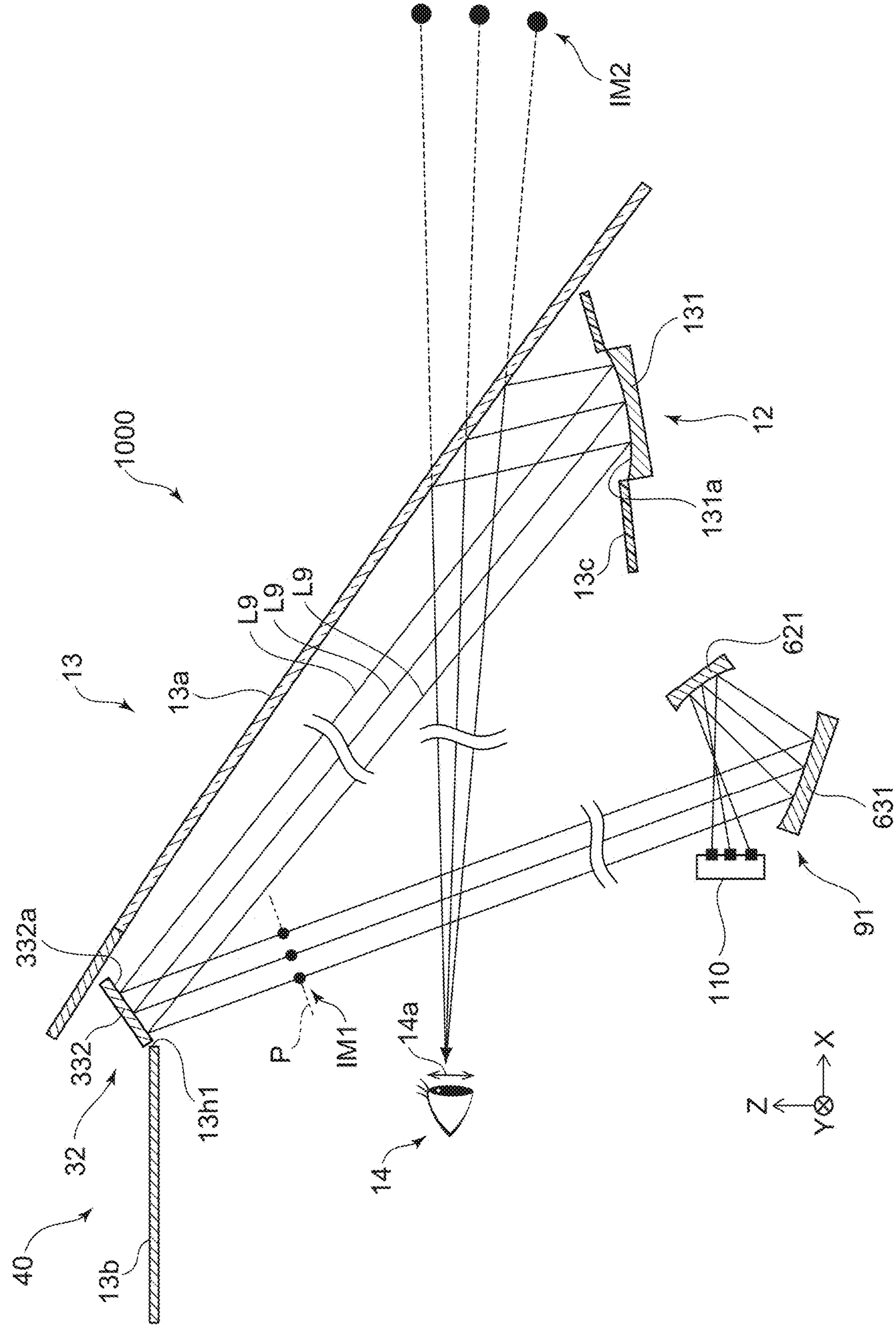
FIG. 43 is a cross-sectional view showing an image display device according to a seventeenth embodiment.

FIG. 43 is a cross-sectional view showing an image display device according to the embodiment.

Figure 44:
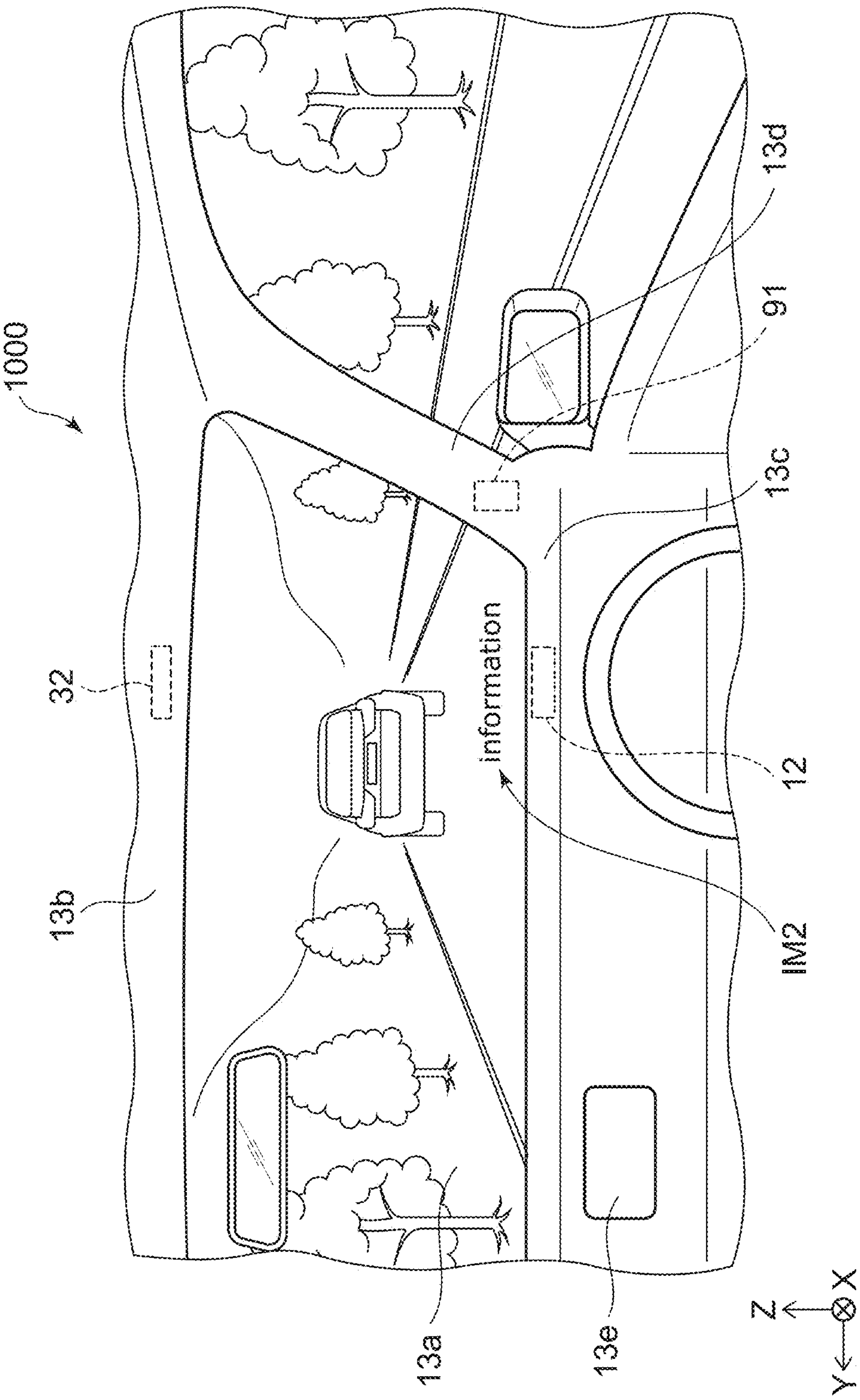
FIG. 44 is a schematic view showing a scenery when viewed by a user in a driver's seat.

FIG. 44 is a schematic view showing a scenery when viewed by a user in a driver's seat.

Similarly to the image display device 30 according to the sixteenth embodiment, the image display device 40 according to the embodiment includes three units. The image display device 40 differs from the image display device 30 in that the front windshield 13*a* is utilized as a reflecting surface causing the user 14 to view the second image IM2. The image display device 40 includes the light source unit 91, the optical path modifying unit 32, and the reflection unit 12.

For example, the light source unit 91 is located inside the A-pillar 13*d* of the vehicle 13 or at the backside of the car navigation device 13*e*. The configuration of the light source unit 91 is as described in the sixteenth embodiment. For example, the optical path modifying unit 32 is located at the ceiling part 13*b* of the vehicle 13. The configuration of the optical path modifying unit 32 is as described in the sixteenth embodiment. For example, the reflection unit 12 is located at the dashboard part 13*c* of the vehicle 13. The configuration of the reflection unit 12 is as described in the first embodiment.

The light source unit 91 is not visible to the user 14 sitting on the driver's seat. The mirror 332 of the optical path modifying unit 32 and the mirror 131 of the reflection unit 12 may be visible or may not be visible to the user 14 sitting on the driver's seat. It is favorable for the mirror 332 and the mirror 131 not to be visible to the user 14 to improve the designability of the interior of the automobile 1000. FIG. 44 shows an example of being invisible.

An operation of the embodiment will now be described.

The chief rays L9 that are emitted from the light source unit 91 form the first image IM1 at the position P, subsequently are reflected by the mirror surface 332*a* of the mirror 332 of the optical path modifying unit 32, and reach the reflection unit 12. The trajectory of the chief rays L9 from the light source unit 91 to the reflection unit 12 is similar to that of the sixteenth embodiment. The chief rays L9 that reached the reflection unit 12 are reflected by the mirror surface 131*a* of the mirror 131 of the reflection unit 12, travel in substantially the +Z direction (the upper side of the vehicle), and reach the front windshield 13*a*. The chief rays L9 that reached the front windshield 13*a* are reflected by the inner surface of the front windshield 13*a*, travel in the −X direction (the back side of the vehicle), and enter the eyebox 14*a* of the user 14.

As a result, the user 14 can view the second image IM2, which is a virtual image, beyond the front windshield 13*a*. For example, the second image IM2 is viewed at a position 3 m in front of the front windshield 13*a*.

Effects of the embodiment will now be described.

According to the embodiment as well, similarly to the sixteenth embodiment, the image display device 40 is subdivided into the three units of the light source unit 91, the optical path modifying unit 32, and the reflection unit 12; therefore, each unit can be smaller. Otherwise, the configuration, operations, and effects according to the embodiment are similar to those of the sixteenth embodiment.

The configurations of the multiple embodiments and multiple modifications described above can be combined as appropriate to the extent of technical feasibility.

As described above, the arrangement of the light source unit and the reflection unit can be set freely as long as the first image can be formed between the light source unit and the reflection unit, and the light emitted from the reflection unit can be irradiated on the reflecting surfaces such as the inner surface of the front windshield, etc.

For example, the invention can be utilized in a head-up display.

REFERENCE NUMERAL LIST

10, 20, 30, 70A, 70B, 80, 90, 100: image display device
11, 21, 31, 41, 51, 61, 71A, 71B, 80A, 80B, 91: light source unit
12, 22: reflection unit
13, 130: vehicle
13*a*, 130*a*: front windshield
13*b*, 130*b*: ceiling part
13*c*, 130*c*: dashboard part
13*d*: A-pillar
13*e*: car navigation device
13*h*1, 13*h*2: through-hole
13*s*1, 13*s*2: wall
14: user
14*a*: eyebox
14*b*: polarized sunglasses
32: optical path modifying unit
86: driver
86*a*, 86*b*: motor
86*c*: circuit
87: camera
88: controller
110, 110A, 110B, 110C, 110D, 110E, 110F, 110H, 110I, 710: display device
110*p*: pixel
111: substrate
112, 112Fb, 112Fb, 112Fg, 112Fg, 112Fr, 112Fr, 112Gbg, 112Gr,
112H, 112I, 712: LED element
112*a*: semiconductor stacked body
112*b*, 112*c*: electrode
112*i*: row
112*p*1: p-type semiconductor layer
112*p*2: active layer
112*p*3, 712*p*3: n-type semiconductor layer
112*s*: light-emitting surface
112*t*: recess
113: scanning circuit
114: scanning line
115: lighting control line
116: driver circuit
117: signal line
118: individual circuit
118*a*, 118A: wiring part
119*a*: ground line
119*b*: power supply line
113A, 113B: power supply circuit
114B: connector
120, 220, 420, 520, 620, 720, 820: imaging optical system
120*a*, 220*a*, 420*a*, 520*a*: bending part
120*b*, 220*b*, 420*b*, 520*b*: direction modifying part
121, 221, 421, 521, 621: input element
122, 222, 422, 522: intermediate element
123, 223, 423, 523, 631: output element
121*a*, 122*a*, 123*a*, 221*a*, 222*a*, 223*a*, 322*a*, 332*a*, 421*a*, 422*a*, 621*a*,
821*a*: mirror surface
131, 322, 332, 821: mirror
340, 760: light-shielding member
341, 761: aperture
621: optical element
714: protective layer
115C, 115D, 115E, 115H, 115I, 715: wavelength conversion member
116C1, 116C2, 116E1, 116E2, 116E3, 116F1, 116F2, 116F3, 116F4,
116G1, 116G2, 116G3: light-transmitting member
117C, 117D, 117E, 117F, 117G: light-shielding member
119H, 119I: growth substrate
716: color filter
750, 770, 840, 871, 872: reflective polarizing element
880: first waveplate
890: second waveplate
1000: automobile
2011: light source unit
2110: display device
2110*p*: pixel
2110*s*: light-emitting surface
2120: imaging optical system
C: optical axis
Cm: capacitor
D1, D2: rotation axis
F, F2, F3, F4, F5, F6: focal point
IM1: first image
IM2: second image
L, L2, L4, L5, L6, L7, L8, L9: chief ray
T1, T2, T3: transistor
θ: angle
710*a*: light
710*c*: circularly polarized light
710*p*, 810*s*: first polarized light
710*s*, 810*p*: second polarized light

The invention claimed is:

1. A light source unit comprising:

a display device configured to emit light having a substantially Lambertian light distribution and to display an image; and an imaging optical system comprising:

a light bending part comprising an input element on which light emitted from the display device is incident, and an output element on which light traveling via the input element is incident, the output element being configured to emit light forming a first image corresponding to the image, wherein:

the imaging optical system is substantially telecentric at a first image side, the light bending part is configured to bend a plurality of chief rays of the light, which are emitted from mutually different positions of the display device, cross each other before being incident on the input element, and reach the first image, the light bending part is configured to bend the plurality of chief rays to be substantially parallel before and after the first image, and the plurality of chief rays converge at a single point between the display device and the input element.

2. The light source unit according to claim 1, wherein: the light emitted from the display device has a light distribution pattern in which a luminous intensity in a direction of an angle θ with respect to an optical axis of the light emitted from the display device is approximated by $\cos^n \theta$ times a luminous intensity at the optical axis, where n is a value greater than 0.

3. The light source unit according to claim 2, wherein: n is not more than 11.

4. The light source unit according to claim 1, wherein: the display device is an LED display, the LED display comprises a plurality of pixels, and LED elements are located in the pixels.

5. The light source unit according to claim 4, wherein: light emitted from each LED element has a substantially Lambertian light distribution.

6. The light source unit according to claim 4, wherein: the display device further comprises a substrate, the LED elements are mounted to the substrate, and a plurality of recesses or a plurality of protrusions is provided in a light-emitting surface of each LED element.

7. The light source unit according to claim 4, wherein: the display device further comprises a wavelength conversion member located on the LED element, and light emitted from the LED element is incident on the wavelength conversion member.

8. The light source unit according to claim 1, further comprising:

a reflective polarizing element located on the display device, wherein:

the reflective polarizing element is configured to transmit a first polarized light of the light emitted from the display device and to reflect a second polarized light of the light emitted from the display device.

9. The light source unit according to claim 1, wherein: the imaging optical system further comprises a direction modifying part that comprises the output element, and the direction modifying part is configured to modify a travel direction of the plurality of chief rays so that the plurality of chief rays traveling via the light bending part are oriented toward a formation position of the first image.

10. The light source unit according to claim 1, wherein: the input element is a first mirror configured to reflect the light emitted from the display device.

11. The light source unit according to claim 10, wherein: the first mirror comprises a mirror surface configured to reflect the light emitted from the display device, and the mirror surface is concave.

12. The light source unit according to claim 1, wherein: the input element is a lens on which the light emitted from the display device is incident.

13. The light source unit according to claim 1, wherein: the output element is a second mirror configured to reflect light traveling via the input element toward a formation position of the first image.

14. The light source unit according to claim 1, further comprising:

a first light-shielding member located between the display device and the imaging optical system, wherein:

the first light-shielding member comprises an aperture, a portion of light from the display device toward the imaging optical system passes through the aperture, another portion of the light from the display device toward the imaging optical system is shielded by the first light-shielding member.

15. An image display device, comprising:

a light source unit comprising:

a display device configured to emit light having a substantially Lambertian light distribution and to display an image, and an imaging optical system comprising:

an input element on which light emitted from the display device is incident, and an output element on which light traveling via the input element is incident, the output element being configured to emit light forming a first image corresponding to the image, wherein:

the imaging optical system is substantially telecentric at the first image side; and a reflection unit separated from the light source unit, the reflection unit being configured to reflect light emitted from the imaging optical system such that the first image is formed between the light source unit and the reflection unit.

16. The image display device according to claim 15, further comprising:

a reflective polarizing element located in a part of an optical path from the display device to the reflection unit, wherein:

a plurality of chief rays are emitted from mutually different positions of the display device, pass through the first image, and are substantially parallel to each other at the part of the optical path, and the reflective polarizing element is configured to transmit a first polarized light of the light emitted from the display device, and to reflect a second polarized light of the light emitted from the display device so that the second polarized light returns to the display device.

17. The image display device according to claim 16, wherein:

a second light-shielding member is located between the display device and the input element, an aperture is provided in the second light-shielding member, and the second polarized light returning to the display device along the optical path passes through the aperture.

18. A light source unit comprising:

a display device configured to emit light having a substantially Lambertian light distribution and to display an image;

a mirror configured to reflect light emitted from the display device and to form a first image corresponding to the image;

a reflective polarizing element located between the display device and the mirror; and a first waveplate located between the reflective polarizing element and the mirror; and a second waveplate, wherein:

the reflective polarizing element is configured to transmit a first polarized light of the light emitted from the display device, the first waveplate is configured to convert the first polarized light transmitted by the reflective polarizing element into a circularly polarized light, the mirror is configured to reflect, toward the first waveplate, the circularly polarized light emitted from the first waveplate, the first waveplate is configured to convert, into a second polarized light, the circularly polarized light reflected by the mirror, the reflective polarizing element is configured to reflect, toward a formation position of the first image, the second polarized light emitted from the first waveplate, the mirror is substantially telecentric at the first image side, and the second waveplate is configured to convert, into the first polarized light, the second polarized light reflected by the reflective polarizing element.

* * * * *